United States Patent [19]

Bardotti et al.

[11] 4,041,473
[45] Aug. 9, 1977

[54] COMPUTER INPUT/OUTPUT CONTROL APPARATUS

[75] Inventors: Angelo Bardotti, Cesano Boscone (Milan); Renzo Pederzini, Melegnano (Milan), both of Italy

[73] Assignee: Honeywell Information Systems Italia, Minneapolis, Minn.

[21] Appl. No.: 576,523

[22] Filed: May 12, 1975

[30] Foreign Application Priority Data

May 16, 1974 Italy .................................22812/74

[51] Int. Cl.² ............................................. G06F 3/00
[52] U.S. Cl. .................................................. 364/900
[58] Field of Search ........................ 340/172.5; 445/1

[56] References Cited

U.S. PATENT DOCUMENTS

| | | | |
|---|---|---|---|
| 3,413,613 | 11/1968 | Bahrs et al. | 340/172.5 |
| 3,416,139 | 12/1968 | Marx | 340/172.5 |
| 3,419,852 | 12/1968 | Marx et al. | 340/172.5 |
| 3,514,758 | 5/1970 | Bennett | 340/172.5 |
| 3,581,286 | 5/1971 | Beausdeil | 340/172.5 |
| 3,753,236 | 8/1973 | Flynn et al. | 340/172.5 |
| 3,854,125 | 12/1974 | Ehling et al. | 340/172.5 |

Primary Examiner—Mark E. Nusbaum

[57] ABSTRACT

Apparatus for the flexible coupling of peripheral units to a digital computer system, wherein any input/output port of the system is capable of communicating with a peripheral unit over various forms of interface.

16 Claims, 23 Drawing Figures

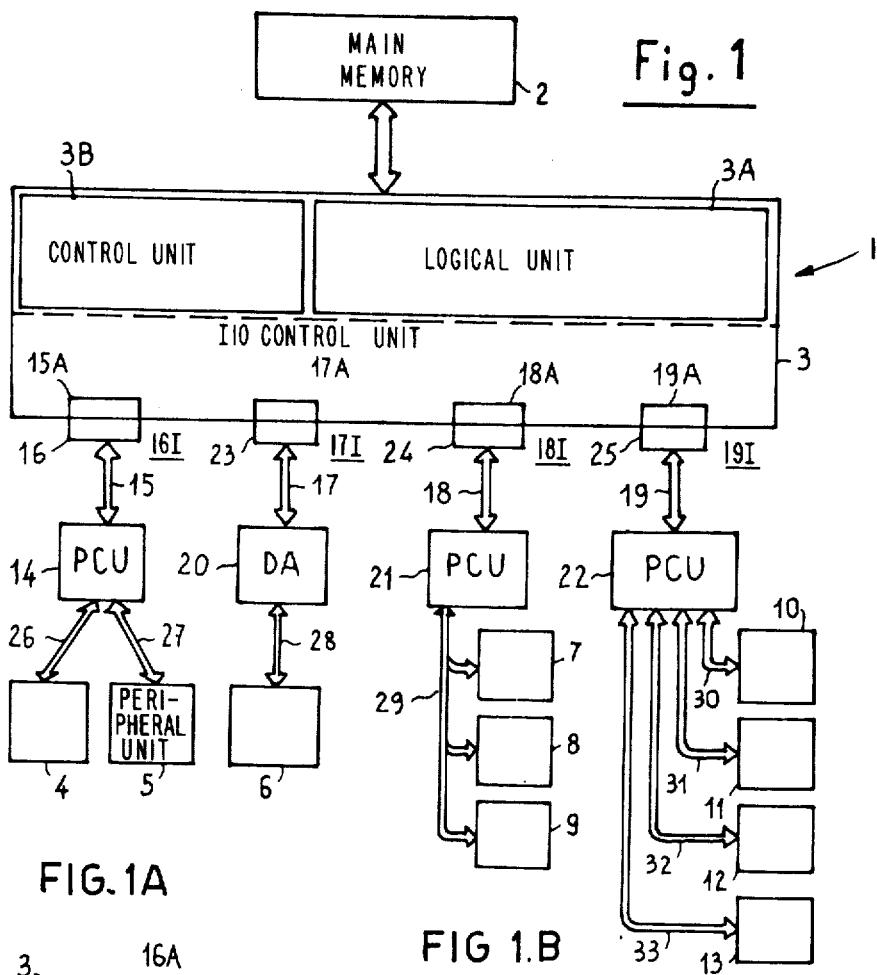
Fig. 1
FIG. 1A
FIG. 1.B
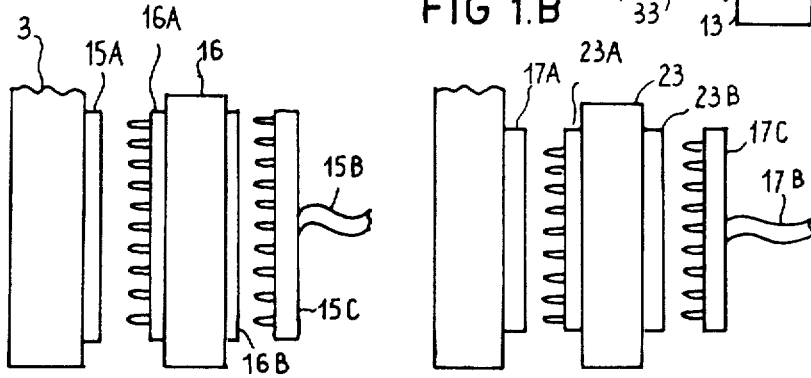

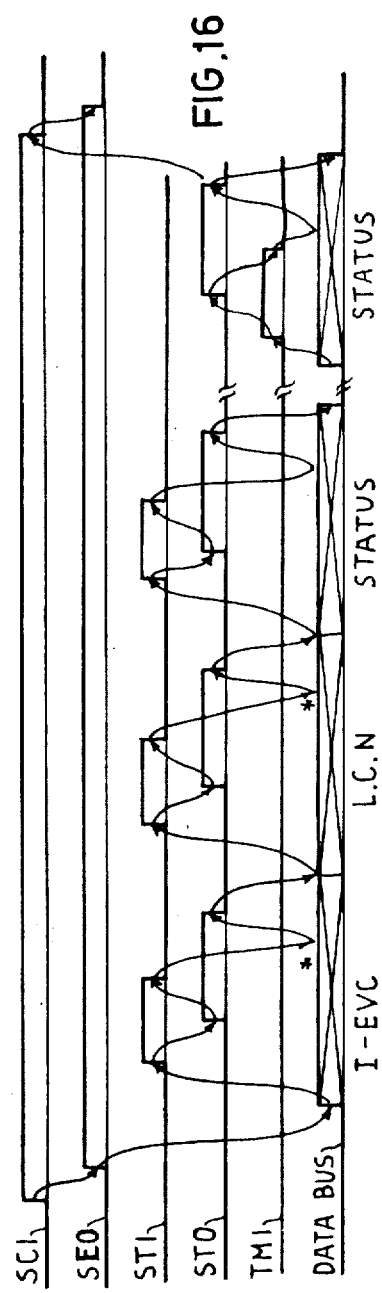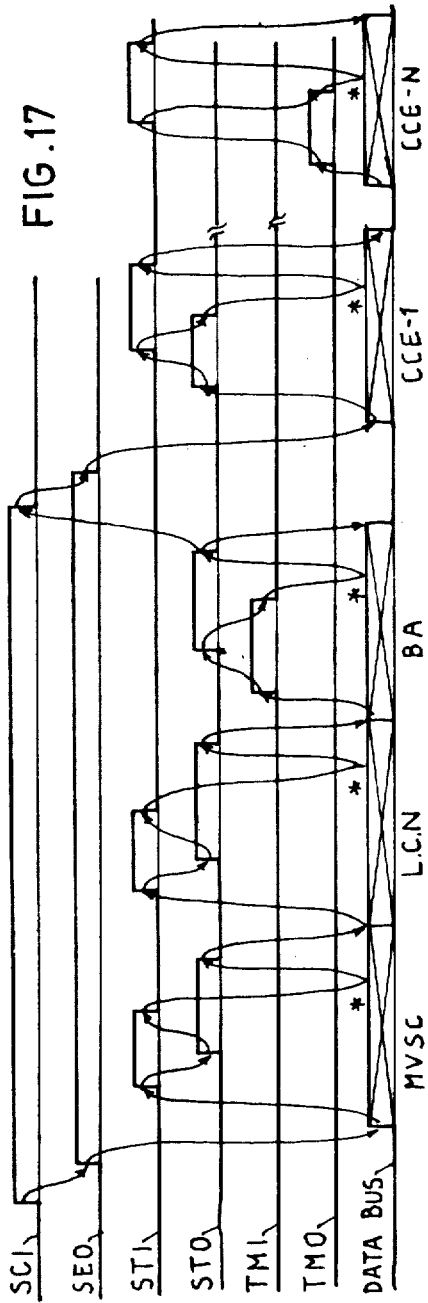

COMPUTER INPUT/OUTPUT CONTROL APPARATUS

BACKGROUND OF THE INVENTION

This invention relates to input/output apparatus for a digital computer system, and more particularly to such a system in which the central processor is adapted to communicate with the peripheral units through both integrated and standard interfaces.

Communication between the central processor of a digital computer system and a peripheral unit thereof is accomplished through an interface. Such an interface comprises a group of lines and related circuits which generate signals on the lines. In general, the term "interface" is used to describe a physical connection where interrelated equipment is connected and disconnected by means of plugs, connectors and the like.

In the prior art computer systems, often different types of interfaces are used to provide a communication link between a peripheral unit, which stores data, and the central processor, which processes such data. One form of interface is known as the "integrated" interface. The integrated interface provides a peripheral unit to central processor communication link by which the major portion of the control functions required to control the peripheral unit is performed by the central processor. Each such function is defined by a channel control word. A series of channel control words forms a channel program which carries out a macroinstruction; for example, an operation to read data stored in the peripheral unit.

The execution of a channel program by the central processor occupies a considerable amount of the time of the processor, thereby reducing the time of the processor available for productive computation. However, the integrated interface enables reducing to a minimum the complexity and cost of the associated peripheral unit.

Another form of interface is known as the "standard" interface. The standard interface provides a peripheral unit to central processor communication link by which channel programs are transferred to and interpreted by a peripheral control unit. A peripheral control unit is a device which controls peripheral units. Such use of a standard interface and peripheral control unit relieves the central processor of its burden of controlling the associated peripheral units, thereby freeing processor time for productive computation. Accordingly, the productive computational capacity of a particular central processor can be increased by replacing integrated interfaces with standard interfaces and peripheral control units.

Because the requirements imposed on a digital computer system may vary from time to time, it would be advantageous to provide a central processor with the feature of having interfaces which are readily convertible between the integrated and standard forms in order that a particular peripheral unit could be controlled either directly from the central processor or from a peripheral control unit. With a central processor of this type, the system could be quickly and economically converted from control of the peripheral units directly by the central processor to their control through peripheral control units when a requirement arose to allocate more of the time of the central processor to productive computation. By providing a system with such feature, the amount of productive computation could be increased with minimum increase in cost.

The prior art computer systems have not provided the capability of ready convertibility of the interfaces between the integrated and standard forms. Thus, such systems embodied a fixed number of physical interfaces of a particular type. For example, if such computer systems were provided with two integrated interfaces, such interfaces could not be converted to the standard form in an economically feasible manner.

Accordingly, it is the principal object of the present invention to provide an interface for a computer system which is readily convertible from one form to another.

Another object of the present invention is to provide a computer system in which an interface is readily convertible between the integrated and standard forms.

Another object of the present invention is to provide a computer system in which the control circuits associated with an interface are mounted on an easily removable member, such as a printed circuit board.

Another object of the present invention is to provide integrated and standard interfaces in which the associated circuits are mounted on removable modules, wherein such modules can replace one another in order to convert an interface from the integrated form to the standard form and vice versa.

It is yet another object of the present invention to provide, in the integrated form of interface of a digital computer system, for changing the state of a binary digital information signal transmitted to a peripheral unit to provide an appropriate instruction and thereby eliminate the need for a corresponding line to the interface.

SUMMARY OF THE INVENTION

The apparatus of the present invention is embodied in the central processor of a computer system and in modules pluggable into universal ports of such system. The central processor is provided with a plurality of identical ports, each of which provides the leads and signals necessary to provide communication with a peripheral unit through an integrated interface or with a peripheral control unit through a standard interface. One kind of such module is an integrated interface module, which is coupled to a peripheral unit for controlling and timing information flow between the central processor and the peripheral unit over an integrated form of interface. Another kind of such module is a standard interface module, which is coupled to a peripheral control unit for controlling and timing information flow between the central processor and the peripheral control unit over a standard form of interface.

BRIEF DESCRIPTION OF THE DRAWING

The invention will be described with reference to the accompanying drawing, wherein:

FIG. 1 is a block diagram of a preferred embodiment of digital computer system implemented according to the present invention;

FIG. 1A is a schematic diagram of a preferred form of removable standard interface module implemented according to the present invention;

FIG. 1B is a schematic diagram of a preferred form of removable integrated interface module implemented according to the present invention;

FIGS. 11-17 are timing diagrams of various types of dialogue sequence for the standard interface.

DESCRIPTION OF THE PREFERRED EMBODIMENT

Figure 2:
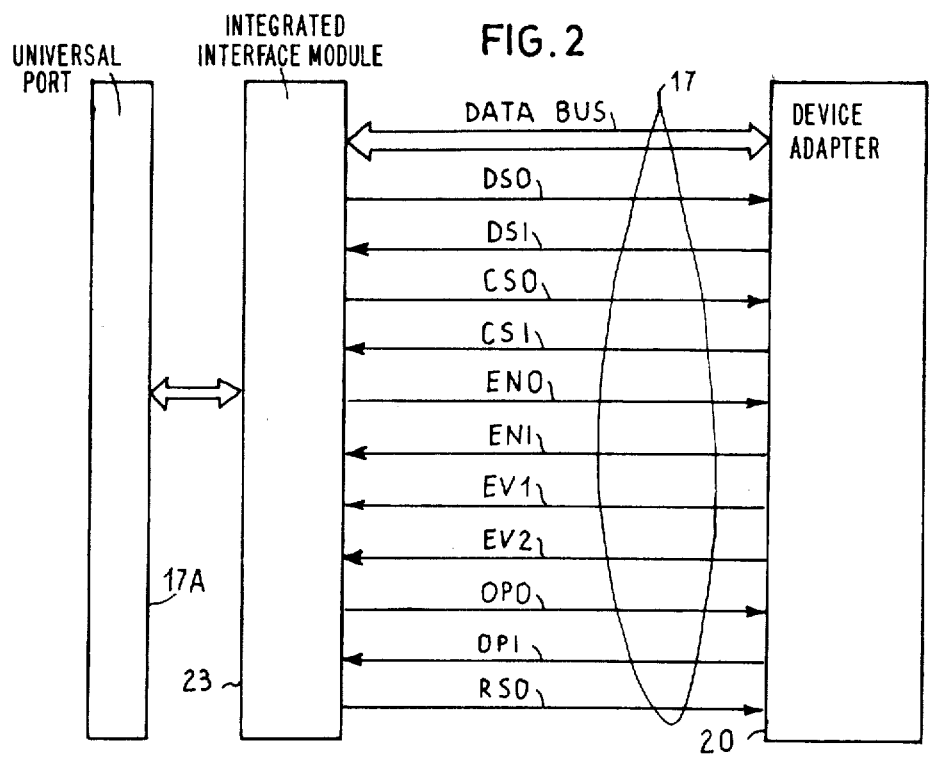
FIG. 2 is a schematic diagram of an integrated interface.

General Structure of a Computer System with which the Preferred Embodiment Can Be Used:

The computer system of FIG. 1 comprises a central processor 1, a main memory 2, and a plurality of peripheral units 4-13. Central processor 1 is functionally divided into an input/output (I/O) control unit 3, a logical unit 3A, and a control unit 3B.

Central processor 1 is provided with a plurality of interfaces, which comprise plugs, channels and subchannels. For example, channels 15, 18 and 19 couple respective peripheral control units 14, 21 and 22 to central processor 1, through respective standard interface modules 16, 24 and 25 and respective identical universal ports 15A, 18A and 19A, providing respective standard interfaces 16I, 18I and 19I. A channel 17 couples a device adapter (DA) 20 to central processor 1, through an integrated interface module 23 and a universal port 17A, providing an integrated interface 17I.

Peripheral control unit (PCU) 14 provides communication between peripheral units 4 and 5 and central processor 1. Peripheral control unit 14 is coupled to central processor 1 through standard interface 16I, which comprises information exchange channel 15, a cable 15B, a plug 15C and removable standard interface module 16, FIG. 1A. A receptacle 16B, which is a part of module 16, mates with plug 15C. A plug 16A of module 16 removably connects module 16 to universal port 15A of I/O control unit 3. The number of pins of plugs 15C and 16A and the physical size of module 16 varies according to the technology by which the interface is implemented.

Channel 15 is employed as an information exchange channel for both peripheral units 4 and 5, providing communication on a time multiplex basis. Therefore, channel 15 may be considered as comprising two subchannels (or logical channels), each of which provides separate communication, at different times, for a respective one of peripheral units 4 and 5.

Device adapter 20 controls a peripheral unit 6. Device adapter 20 is coupled to central processor 1 through integrated interface 17I, which comprises channel 17, a cable 17B, a plug 17C and removable integrated interface module 23, FIG. 1B. A receptacle 23B, which is a part of module 23, mates with plug 17C. A plug 23A of module 23 removably connects module 23 to universal port 17A.

Peripheral units 4 and 5 are coupled to peripheral control unit 14 by respective channels 26 and 27. Peripheral unit 6 is coupled to device adapter 20 by a channel 28. Peripheral units 7-9 are coupled to peripheral control unit 21 by a common channel 29. Peripheral units 10-13 are coupled to peripheral control unit 22 by respective channels 30-33.

To transfer data between a peripheral unit and main memory 2 or central processor 1, a communication path for such peripheral unit is established within central processor 1 and within the corresponding peripheral control unit or device adapter. Within central processor 1, such communication path is provided by I/O control unit 3. I/O control unit 3, as well as the general structure of central processor 1, including logical unit 3A and control unit 3B, and of main memory 2, is more fully described in the U.S. patent application for *DATA HANDLING SYSTEM HAVING A PLURALITY OF INPUT/OUTPUT CHANNELS AND PHYSICAL RESOURCES DEDICATED TO DISTINCT AND INTERRUPTIBLE SERVICE LEVELS* by A. Bardotti, Ser. No. 534,963 filed Dec. 12, 1974, and assigned to the assignee of the present application. Although such referenced application describes a particular form of computer system and is oriented toward the disclosure of a specific invention, it provides all information required for an understanding of how a microprogrammed central processor is made and operates. Accordingly, such referenced application provides information useful for complementing the description of the present application, which description is limited to the specific features of the subject invention. Thus, in such referenced application and in the description provided herein, the computer system described is provided with a plurality of input/output (I/O) channels.

A variety of peripheral units can be employed for storing data to be processed by the above-described computer system. The particular peripheral unit selected depends on the quantity of data to be processed, the processing speed required and the cost. However, a substantial amount of processing time is required to control a peripheral unit. In many instances, the processing for such control can be performed either by the central processor or by a peripheral control unit which relieves the central processor of most of its processing burden for the peripheral unit associated with such peripheral control unit.

A system which requires only a small amount of computation time can control peripheral units directly from the central processor through integrated interfaces which enable the central processor to control the peripheral units directly. In such a system, investment in expensive peripheral control units is not required. However, as the requirement on the system to perform productive computation expands, some of its peripheral units can then be controlled from peripheral control units through standard interfaces. Because such peripheral control units perform most of the processing required to control their associated peripheral units, the central processor is correspondingly freed from some of its processing burden and can perform more productive, or substantive, computation.

Because the processing requirement imposed on a system may vary from time to time, it is advantageous to provide a central processor in which the interfaces are easily converted between the integrated and standard forms so that a peripheral unit can be controlled either directly by the central processor or by a peripheral control unit. Such a system enables the quick and economical conversion from direct control of peripheral units to their control by peripheral control units when the need arises to provide additional data processing time.

The instant application describes such a computer system, one in which integrated interfaces can be readily converted to standard interfaces and vice versa. Such a capability is achieved by providing a suitable functional relationship between the control lines of the interfaces and the associated control circuits. More specifically, the control circuits which characterize the behavior of an interface are located in modular removable and interchangeable elements, which enable the adoption of a particular form of interface, such as a standard interface or an intergrated interface, to a universal port or universal interface.

In order to fully describe the preferred embodiment of the invention, the functional relationships and circuits will be described for both the integrated and standard interfaces.

Integrated Interface

The integrated interface of FIG. 2, according to the invention, comprises channel 17, universal port 17A and integrated interface module 23. Module 23 is adapted to be plugged into any one of the universal ports to convert such port to an integrated interface. Channel 17 comprises a plurality of data and control lines, as follows:

Data Bus - The Data Bus comprises a group of nine bidirectional lines, of which eight lines carry signals representing binary digital (bit) information and one line carries a signal representing an odd parity bit. Thus, the Data Bus provides a one-byte path through the interface. The information signals transferred over the Data Bus primarily represent the following:

Data-out information (write data and I/O commands);
Data-in information (read data and peripheral subsystem status);
Control-out information (I/O instructions to the device adapter and destination of data transmitted from the I/O control unit (IOC) to the device adapter);
Control-in information (interface errors reported from the device adapter).

The meaning to be attributed to the byte present on the Data Bus is defined by timing signals present concurrently on the interface, as follows (the same identifier or mnemonic is used for a signal and the line which carries the signal):

Data Strobe In (DSI) - The DSI line performs two functions: (1) transmits a timing signal from device adapter 20 to interface module 23 which characterizes the byte then present on the Data Bus as data, when data is being transferred from the associated peripheral unit to central processor 1; and (2) transmits a signal representing a response to a timing signal DSO received from interface module 23 during the transfer of data from central processor 1 to the peripheral unit.

Data Strobe Out (DSO) - The DSO line performs two functions: (1) transmits a timing signal from interface module 23 to device adapter 20 which characterizes the byte then present on the Data Bus as data, when data is being transferred from central processor 1 to the associated peripheral unit; and (2) transmits a signal representing a response to a timing signal DSI received from device adapter 20 during the transfer of data from the peripheral unit to central processor 1.

Control Strobe In (CSI) - The CSI line performs two functions: (1) transmits a timing signal from device adapter 20 to interface module 23 which characterizes the byte then present on the Data Bus as control information, when control or service information is being transferred from device adapter 20 to central processor 1; and (2) transmits a signal representing a response to a timing signal CSO received from interface module 23 during the transfer of control information from central processor 1 to the associated peripheral unit.

Control Strobe Out (CSO) - The CSO line performs two functions: (1) transmits a timing signal from interface module 23 to device adapter 20 which characterizes the byte then present on the Data Bus as control information, when control information is being transferred from central processor 1 to device adapter 20; and (2) transmits a signal representing a response to a timing signal CSI received from device adapter 20 during the transfer of control information from device adapter 20 to central processor 1.

Operational Our (OPO) - The OPO line provides notification from interface module 23 to device adapter 20 of the status of interface module 23 and central processor 1. When the signal OPO represents a binary 1 (is in the "1-state"), it denotes that central processor 1 and interface module 23 are operational and in condition to communicate with device adapter 20, whereas when the signal OPO represents a binary O (is in the "0-state"), it denotes that central processor 1 and interface module 23 either are not energized by the power supply, or for some other reason are not operational.

Operational In (OPI) - The OPI line provides notification from device adapter 20 to interface module 23 of the status of device adapter 20. When the signal OPI is in the 1-state, it denotes that device adapter 20 is operational and in condition to communicate with central processor 1, whereas when the signal OPI is in the 0-state, it denotes that device adapter 20 either is not energized by the power supply, or for some other reason is not operational.

Reset Our (RSO) - The RSO line tranmists a signal, in pulse form, from central processor 1 to device adapter 20 to reset the device adapter to its initial state. When not in such pulse form, the signal RSO is in the 0-state.

Enable In (ENI) - The ENI line is a control line, transmitting a control signal from device adapter 20 to interface module 23 to perform two functions: (1) when the signal ENI is in the 1-state, it denotes that the direction of information (data or control information) being transferred on the Data Bus is from device adapter 20 to central processor 1; and (2) when it transfers from the 0-state to the 1-state, it initiates acquisition of control of the integrated interface in order to put the interface at the service of device adapter 20 so as to provide for the transfer of information to central processor 1.

When device adapter 20 is in its initial, or reset, state, the signal ENI must be in the 0-state. Except for the signal RSO, described above, central processor 1 cannot transfer the signal ENI to the 0-state, the signal ENI being so transferable only under sole control of device adapter 20, at such time as the device adapter relinquishes control of the integrated interface to central processor 1.

Enable Out (ENO) - The ENO line is a control line, transmitting a control signal from interface module 23 to device adapter 20 to denote that the direction of information (data or control information) being transferred on the Data Bus is from interface module 23 to device adapter 20.

When interface module 23 detects the transfer of the signal ENI to its 0-state, it transfers the signal ENO to the 1-state. The concurrence of the signal ENO in the 1-state and the signal ENI in the 0-state denotes that the integrated interface is either ready for or is then transferring information from interface module 23 to device adapter 20. Conversely, when interface module 23 detects the transfer of the signal ENI to the 1-state, it transfers the signal ENO to the 0-state. Thus, the concurrence of the signal ENO in the 0-state and the signal ENI in the 1-state denotes that the integrated interface is either ready for or is then transferring information from device adapter 20 to interface module 23.

Accordingly, the main purpose of the signals ENO and ENI is to provide a representation of the direction of flow of data or control information on the Data Bus. An auxiliary function of these two signals is to denote that a transfer of data on the interface occurred properly.

As will be described hereinafter, all dialogue sequences start with a control-out information transfer, followed by a data transfer. Accordingly, the signal ENO must be in its 1-state at the beginning of each dialogue sequence. The data transfer which then follows is initiated by either interface module 23 or device adapter 20, as specified by the control-out information.

The data-out information transfer initiated by interface module 23 is performed with the signal ENO in the 1-state. Such data-out transfer can be aborted instantaneously by device adapter 20 and replaced by a control-in information transfer when an error (parity or illegal code) is detected by device adapter 20 during the control-out information transfer. The data-out information transfer is always followed by a double data path reversal to denote the proper termination of the dialogue sequence. If an error is detected by device adapter 20 in the data transfer sequence, it may initiate a control-in information transfer instead of such double data path reversal. At the termination of each dialogue sequence, the signal ENI must be transferred to the 0-state by device adapter 20, which transfer, in turn, causes the transfer of the signal ENO to the 1-state.

The data-in information transfer initiated by device adapter 20, after the control-out information transfer provides the device adapter with the appropriate command, starts by transferring the signal ENI to the 1-state, which transfer, in turn, causes the transfer of the signal ENO to the 0-state. At the termination of the data-in information transfer, device adapter 20 transfers the signal ENI to the 0state, which transfer, in turn, causes the transfer of the signal ENO to the 1-state.

When the system is initialized, the signal ENO is placed in the 1-state.

Event No. 1 (EV1) - The Event No. 1 line provides notification from device adapter 20 to interface module 23 that a first group of asynchronous events is to occur at device adapter 20, such notification being provided when the signal EV1 is in the 1-state. The signal EV1 is transferred to the 0-state by device adapter 20 when interface module 23 transmits the appropriate response signal.

When device adapter 20 is initialized, the signal EV1 is placed in the 0-state.

The usual function of the signal EV1 is to denote that device adapter 20 is ready to transfer data. Signal EV1 is interpreted by interface module 23 as representing a request for a character transfer. Signal EV1 either may be in the 1-state for the entire time required to transfer several items of data or characters, or may be transferred to the 1-state and back to the 0-state for each character transfer, according to the particular type of peripheral unit involved in the data transfer.

The signal EV1 indirectly causes the generation of a signal in interface module 23, which latter signal will be designated herein as the signal INTB (such notation being consistent with that employed in the above-identified patent application). The signal INTB is interpreted by central processor 1 as an interrupt request (for a character transfer), and a preestablished priority level is allocated to such request.

Event No. 2 (EV2) - The EV2 line provides notification from device adapter 20 to interface module 23 that a second group of asynchronous events is to occur at device adapter 20, such notification being provided when the signal EV2 is in the 1-state. The signal EV2 is transferred to the 0-state by device adapter 20 when interface module 23 transmits the appropriate response signal.

When device adapter 20 is initialized, the signal EV2 is placed in the 0-state. The various events which cause the transfer of the signal EV2 to the 1-state are:
Asynchronous events such as device state changes and changes introduced from the operator panel;
Events which are not time-depentent;
A device adapter or peripheral unit incident; and
The termination of an order or an off-line phase.

Interface module 23 responds to signal EV2 in the 1-state to initiate a dialogue sequence. Accordingly, the signal EV2 is interpreted by central processor 1 as an interrupt request of a different type than that represented by signal EV1, and an appropriate priority level is allocated to such request.

Integrated Interface Dialogue Sequences

Four basic dialogue sequences occur in the integrated interface. These are identified as:
Write Without Error (for information transfer from the central processor);
Write With Error In Data (for information transfer from the central processor);
Read Without Error (for information transfer to the central processor);
Read or Write With Error In Conrol Information.

As will be shown hereinafter all such dialogue sequences, whether initiated by central processor 1 or by a peripheral unit through an interrupt request made by means of a signal EV1 or signal EV2, are always characterized by the preliminary transfer to device adapter 20 of control information or a "control character". If no error is found in such control character, central processor 1 next transmits or receives an information byte (data, command or peripheral unit status).

The conrol character comprises nine bits. One bit of the conrol character represents the direction of transfer ("read" or "write" in the sense described above). A seven-bit group of the control character usually represents, in coded form, the address of a register within the peripheral subsystem; for example, a register for storing commands or a status register from which information pertaining to the status of the peripheral subsystem may be retrieved. (A peripheral subsystem comprises a device adapter and the peripheral units coupled to such device adapter.) The ninth bit of the control character is employed as a parity control bit to ensure the integrity of the information transferred.

Some registers which are used exclusively to store data to be retrieved or to be written into (for example, a "write" data register and a "read" data register) are suitably addressed by a six-bit code. In such instance, as will be described hereinafter, the remaining seventh bit of the seven-bit group is employed to provide additional information of a different type.

A communication between central processor 1 and device adapter 20 comprises a plurality of particular kinds of dialogue sequences, which will be described in more detail hereainafter, but may be considered as comprising three phases:

1st Phase - Initiating the communication.

In this phase, dialogue sequences are initiated directly by the central processor, and not as a consequence of an interrupt request received from a device adapter and represented by signal EV1 or signal EV2. In the dialogue sequences of this phase, Central processor 1 transmits to the device adapter information pertaining to the particular peripheral unit to be selected commands and other control information.

2nd Phase - Data Transfer Phase.

Following the first phase, and when required, this phase may occur. In this phase the dialogue sequences are initiated by a signal EVI for both the write sequences and the read sequences. The signal EVI may be transferred to the 1-state and back to the 0-state by the device adapter for each character transfer (for each dialogue sequence) or may be maintained in the 1-state for the entire time required by this data transfer phase.

3rd Phase - Completing the Communication.

This phase is intiaited by the device adapter following termination of the second phase (or termination of the first phase) by transfer of the signal EV2 to the 1-state. This phase serves to notify central processor 1 of the completion of execution of the previously received commands and of the peripheral unit status.

Because the dialogue sequences do not differ, whether initiated by central processor 1 or by interrupt requests, signals EV1 and EV2 are not described or illustrated in the following description of these dialogue sequences, even though such signals may be in the 1-state.

Write Without Error

Figure 3:
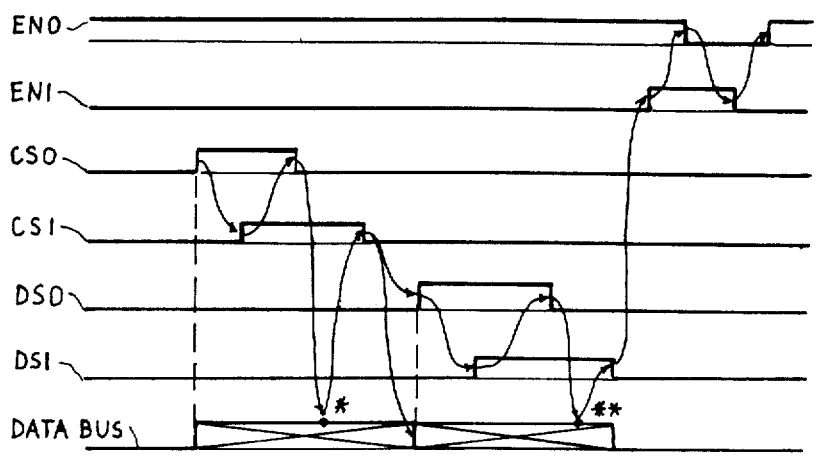
FIGS. 3–6 are timing diagrams of various types of dialogue sequences for the integrated interface.

In the timing diagram of FIG. 3, which illustrates the Write Without Error dialogue sequence, the temporal relationship between the signals illustrated therein is represented by chained arrows. Each signal transition is illustrated only as of the time at which it occurs at its source, and the time at which such transition is received at the opposite end of the interface line on which it is transmitted occurs after a delay that depends on the length of such line.

If the signal ENO is in the 1-state, interface module 23, in this dialogue sequence, transfers the signal CSO to the 1-state and simultaneously applies control information signals to the Data Bus. When device adapter 20 detects this transition in the state of the signal CSO, it transfers the signal CSI to the 1-state. Interface module 23 thereupon detects this transition in the state of the signal CSI and transfers the signal CSO to the 0-state. When device adapter 20 detects this next transition of the signal CSO, to the 0-state, it then accepts the control information signals from the Data Bus. Such acceptance is designated by the single asterisk in FIG. 3.

Device adapter 20 now suspends the dialogue sequence in order to check the parity and validity of the control information byte received, by delaying the transfer of the signal CSI to the 0-state. When the signal CSI is finally transferred to the 0-state, such transition is notification to interface module 23 that it can remove the control information signals from the Data Bus and apply other information signals thereto.

The control information so accepted by device adapter 20 is now stored by the device adapter, because such control information represents the destination or the source of the data that next is to be transferred over the interface. Such control information is then interpreted by device adapter 20 as an instruction and is decoded by the device adapter to determine the next step to occur in the dialogue sequence. In the Write Without Error dialogue sequence, this next step will be a data-out information transfer to be initiated by interface module 23.

Accordingly, interface module 23 next transfers the signal DSO to the 1-state and simultaneously applies data signals to the Data Bus. When device adapter 20 detects this transition in the state of the signal DSO, and if it is ready to receive such data, the device adapter transfers the signal DSI to the 1-state. Interface module 23 thereupon detects this transition in the state of the signal DSI and transfers the signal DSO to the 0-state. When device adapter 20 detects this next transition in the signal DSO, to the 0-state, it then accepts the data signal from the Data Bus. Such acceptance is designated by a double asterisk in FIG. 3.

Device adapter 20 can suspend the dialogue sequence in order to check the parity of the data received, by delaying the transfer of the signal DSI to the 0-state. When the signal DSI is finally transferred to the 0-state, such transition is notification to interface module 23 that it can alter the information signals being applied to the Data Bus.

Device adapter 20 next transfers the signal ENI to the 1-state which, in turn, causes interface module 23 to transfer the signal ENO to the 0-state. When device adapter 20 detects this transition in the state of the signal ENO, it transfers the signal ENI to the 0-state. Interface module 23 responds to such transfer of the signal ENI, to the 0-state, to transfer the signal ENO to the 1-state. The integrated interface is thereupon ready to initiate another dialogue sequence.

Write With Error In Data

Figure 4:
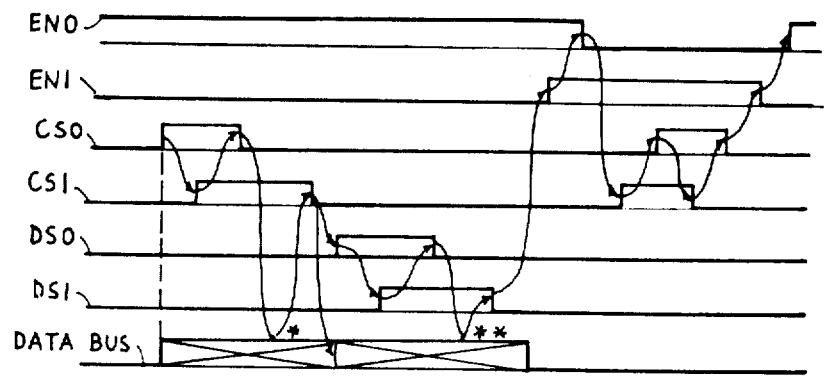

This dialogue sequence is initiated when interface module 23 transfers the signal CSO to the 1-state, FIG. 4, and simultaneously applies control information signals to the Data Bus, which initiation takes place only after the interface module has verified that the signal ENO is in the 1-state and the signal ENI is in the 0-state. When device adapter 20 detects this transition in the state of the signal CSO, it transfers the signal CSI to the 1-state. Interface module 23 thereupon detects this transition in the state of the signal CSI and transfers the signal CSO to the 0-state. When device adapter 20 detects this next transition of the signal CSO, to the 0-state, it then accepts the control information signals from the Data Bus. Such acceptance is designated by the single asterisk in FIG. 4.

Device adapter 20 now suspends the dialogue sequence in order to check the parity and validity of the control information byte received, by delaying the transfer of the signal CSI to the 0-state. When the signal CSI is finally transferred to the 0-state, such transition is notification to interface module 23 that it can remove the control information signals from the Data Bus and apply other information signals thereto.

The control informaton so accepted by device adapter 20 is now stored by the device adapter, because such control information represents the destination or the source of the data that next is to be transferred over the interface. Such control information is then interpreted by device adapter 20 as an instruction and is decoded by the device adapter to determine the next step to occur in the dialogue sequence. In the Write With Error In Data dialogue sequence, this next step will be a data-out information transfer to be initiated by interface module 23.

Accordingly, interface module 23 next transfers the signal DSO to the 1-state and simultaneously applies data signals to the Data Bus. When device adapter 20 detects this transition in the state of the signal DSO, and if it is ready to receive such data, the device adapter transfers the signal DSI to the 1-state. Interface module 23 thereupon detects this transition in the state of the signal DSI and transfers the signal DSO to the 0-state. When device adapter 20 detects this next transition in the signal DSO to the 0-state, it then accepts the data signals from the Data Bus. Such acceptance is designated by a double asterisk in FIG. 4.

Device adapter 20 can suspend the dialogue sequence in order to check the parity of the data received, by delaying the transfer of the signal DSI to the 0-state. When the signal DSI is finally transferred to the 0-state, such transition is notification to interface module 23 that it can alter the information signals being applied to the Data Bus.

In the instant dialogue sequence, a parity error has been detected in the data received. Therefore, device adapter 20 first transfers the signal ENI to the 1-state, which, in turn, causes interface module 23 to transfer the signal ENO to the 0-state. When device adapter 20 detects this transition in the state of the signal ENO, it transfers the signal CSI to the 1-state. When interface module 23 detects this transition in the state of the signal CSI, it transfers the signal CSO to the 1-state. The device adapter thereupon detects this transition in the signal CSO and transfers the signal CSI to the 0-state which, in turn, causes the interface module to transfer the signal CSO to the 0-state. Such signal exchange with the signal ENO in the 0-state and the signal ENI in the 1-state provides notification to interface module 23 that a parity error has been detected by device adapter 20.

After the device adapter detects this latest transition of the signal CSO to the 0-state, it transfers the signal ENI to the 0-state which, in turn, causes interface module 23 to transfer the signal ENO to the 1-state, thereby permitting the integrated interface to initiate a new dialogue sequence.

The error notification signalling provided by the device adapter, as described above, is not required, and if ssuch error signalling is not performed, the device adapter simply initiates the double data path reversal signalling described above in connection with the Write Without Error dialogue sequence.

Read Without Error

Figure 5:
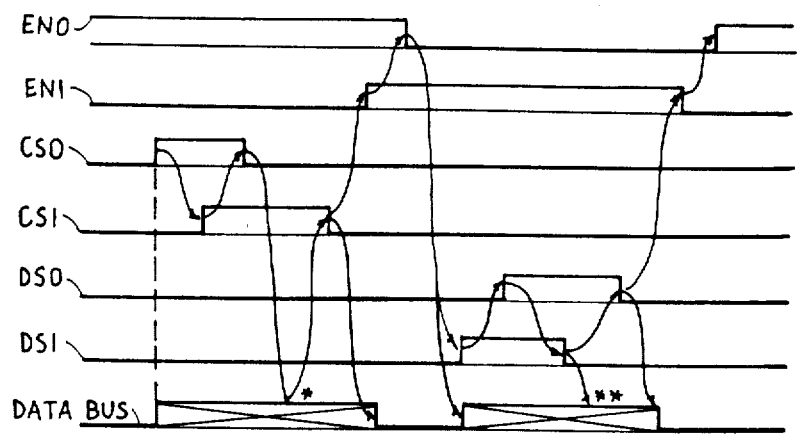

This dialogue sequence is initiated when interface module 23 transfers signal CSO to the 1-state, FIG. 5, and simultaneously applies control information signals to the Data Bus, which initiation takes place only after the interface module has verified that the signal ENO is in the 1-state and the signal ENI is in the 0-state. When device adapter 20 detects this transition in the state of the signal CSO, it transfers the signal CSI to the 1-state. Interface module 23 thereupon detects this transition in the state of the signal CSI and transfers the signal CSO to the 0-state. When device adapter 20 detects this next transition of the signal CSO, to the 0-state, it then accepts the control information signals from the Data Bus. When the signal CSI is subsequently transferred to the 0-state by device adapter 20, such transition is notification to interface module 23 that it can remove the control information signals from the Data Bus.

The control information so accepted by device adapter 20 is now stored by the device adapter, because such control information represents the destination or the source of the data that next is to be transferred over the interface. Such control information is then interpreted by device adapter 20 as an instruction and is decoded by the device adapter to determine the next step to occur in the dialogue sequence. In the Read Without Error dialogue sequence, this next step will be a data-in information transfer to be initiated by device adapter 20.

Accordingly, device adapter 20 next transfers the signal ENI to the 1-state. When interface module 23 detects this transition in the state of the signal ENI, it transfers the signal ENO to the 0-state. When device adapter 20 detects this transition in the state of the signal ENO, it transfers the signal DSI to the 1-state and simultaneously applies data signals to the Data Bus. When interface module 23 detects this transition in the state of the signal DSI, it transfers the signal DSO to the 1-state. Device adapter 20 thereupon detects this transition in the state of the signal DSO and transfers the signal DSI to the 0-state. When interface module 23 detects this next transition in the state of signal DSI, to the 0-state, it then accepts the data signals from the Data Bus and transfers the signal DSO to the 0-state.

Upon detecting the transition of the state of the signal DSO to the 0-state, device adapter 20 thereupon transfers the signal ENI to the 0-state, which, in turn, causes interface module 23 to transfer the signal ENO to the 1-state. The integrated interface is thereupon ready to initiate another dialogue sequence.

Read or Write With Error In Control Information

Figure 6:
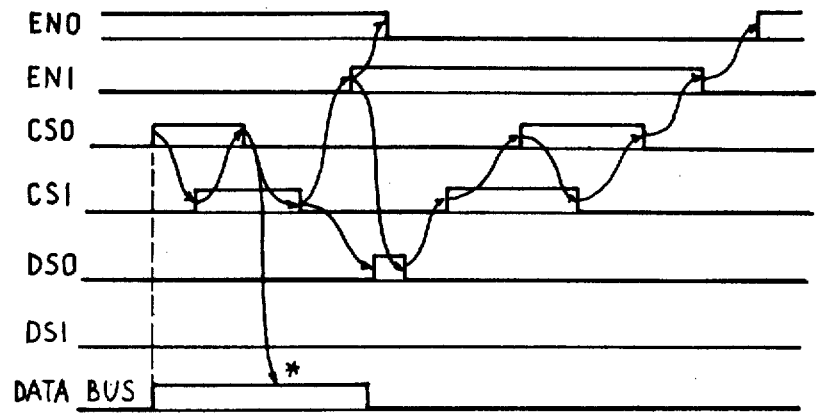

This dialogue sequence is initiated when interface module 23 transfers the signal CSO to the 1-state, FIG. 6, and simultaneously applies control information signals to the Data Bus, which initiation takes place only after the interface module has verified that the signal ENO is in the 1-state and the signal ENI is in the 0-state. When device adapter 20 detects this transition in the state of the signal CSO, it transfers the signal CSI to the 1-state. Interface module 23 thereupon detects this transition in the state of the signal CSI and transfers the signal CSO to the 0-state. When device adapter 20 detects this next transition of the signal CSO, to the 0-state, it then accepts the control information signals from the Data. Bus. Such acceptance is designated by the single asterisk in FIG. 6.

Device adapter 20 now suspends the dialogue sequence in order to check the parity and validity of the control information byte received, by delaying the transfer of the signal CSI to the 0-state. When the signal CSI is finally transferred to the 0-state, such transition is notification to interface module 23 that it can remove the control information signals from the Data Bus and apply other information signals thereto.

The control information so accepted by device adapter 20 is now stored by the device adapter. Such control information is then interpreted by device adapter 20 as an instruction and is decoded by the device adapter to determine the next step to occur in the dialogue sequence.

In the instant dialogue sequence, device adapter 20 has detected an error in the control information byte received. Therefore, device adapter 20 now initiates a control-in information transfer.

Accordingly, device adapter 20 next transfers the signal ENI to the 1-state. When interface module 23 detects this transition in the state of the signal ENI, it transfers the signal ENO to the 0-state and also transfers the signal DSO to the 0-state if it had been in the 1-state. When device adapter 20 detects this transition in the state of signal ENO, it transfers the signal CSI to the 1-state. When interface module 23 detects this transition in the state of signal CSI, it transfers the signal CSO to the 1-state. The device adapter thereupon detects this transition in the state of signal CSO and transfers the signal CSI to the 0-state which, in turn, causes the interface module to transfer the signal CSO to the 0-state.

After the device adapter detects this latest transition of signal CSO, to the 0-state, it transfers the signal ENI to the 0-state which, in turn, causes interface module 23 to transfer the signal ENO to the 1-state, thereby permitting the integrated interface to initiate a new dialogue sequence.

GENERAL CONSIDERATIONS

The preceding functional descriptions of the various dialogue sequences of the integrated interface illustrate certain characteristics. Thus, the dialogue sequences evolve differently, with asynchronous timing that depends both on the length of the lines of the interface and on the operations performed by the device adapter, which timing and operations are representative of the integrated interface but differ, as will be described hereinafter, from those of the standard interface.

To enable the central processor to engage in dialogue sequences with a particular peripheral unit through either an integrated interface or a standard interface, it is necessary to provide within integrated interface module 23 those circuits that enable the execution of the dilogue sequences unique to the integrated interface, while at the same time providing between module 23 and the central processor, i.e., at the point of plug 23A in FIG. 1B, an internal universal interface common to both the integrated interface and the standard interface. Such a construction provides the capability of converting an interface from the integrated to the standard forms by the replacement of the interface module.

Circuits for Integrated Interface

Figure 7:
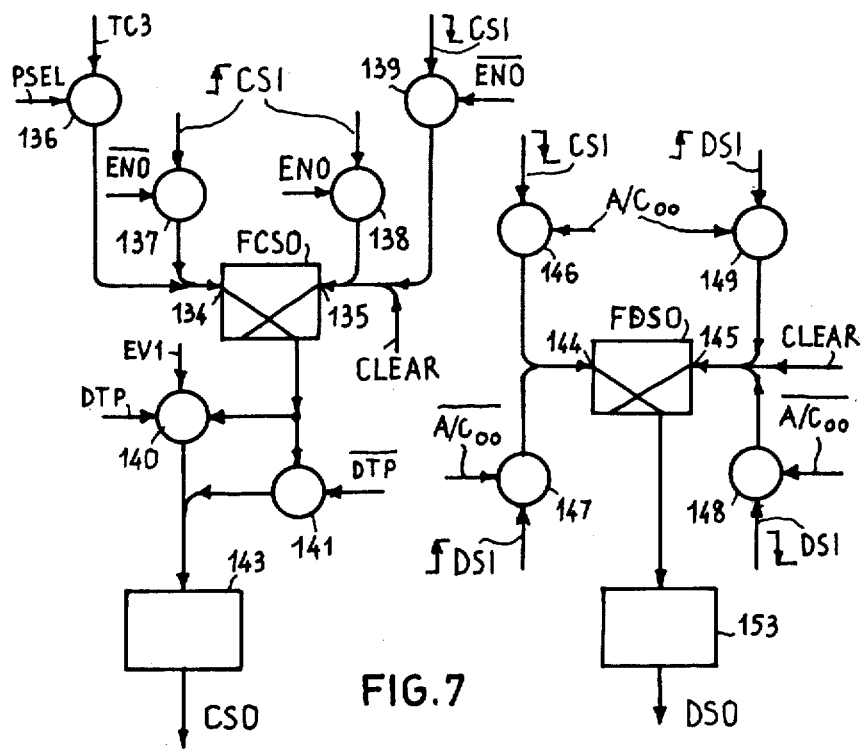
FIGS. 7-9 are logical block diagrams of a preferred form of integrated interface module.
Figure 8:
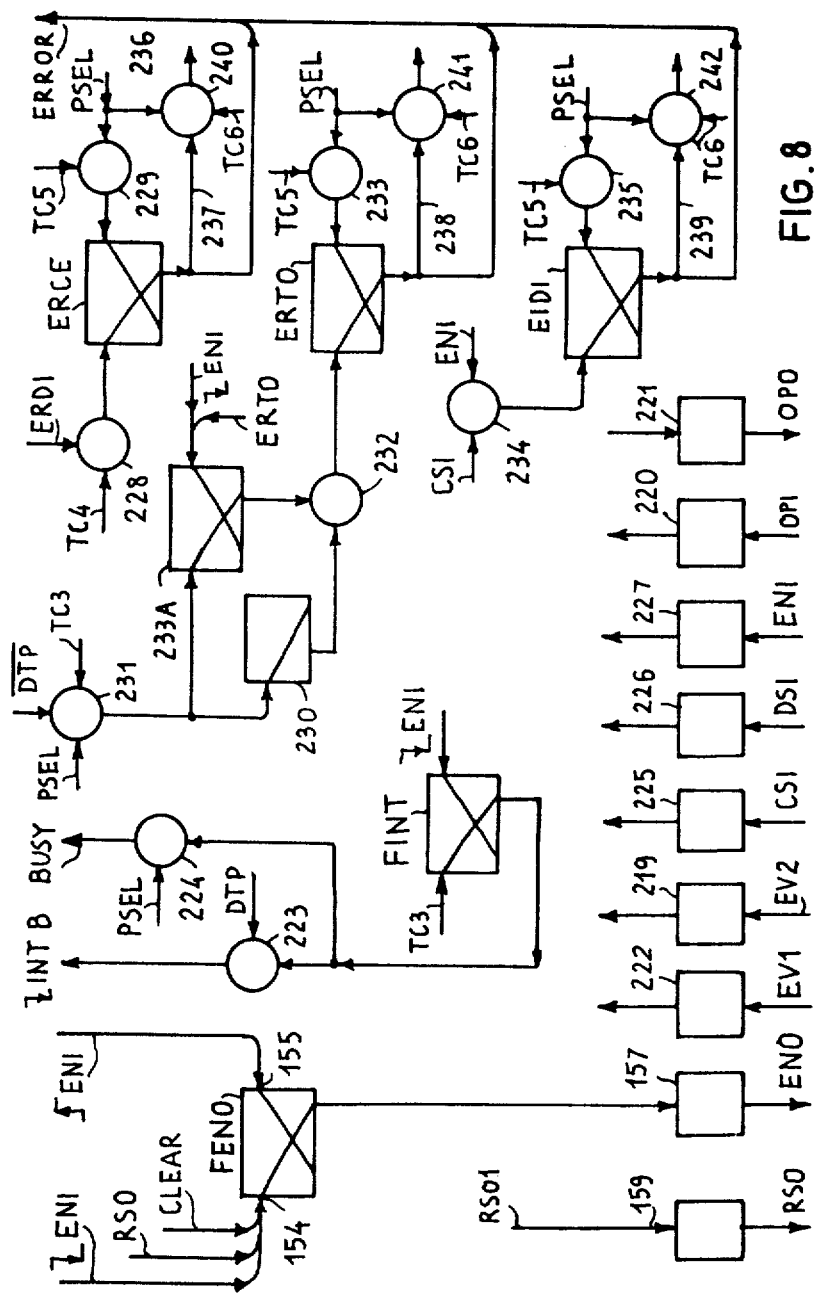
Figure 9:
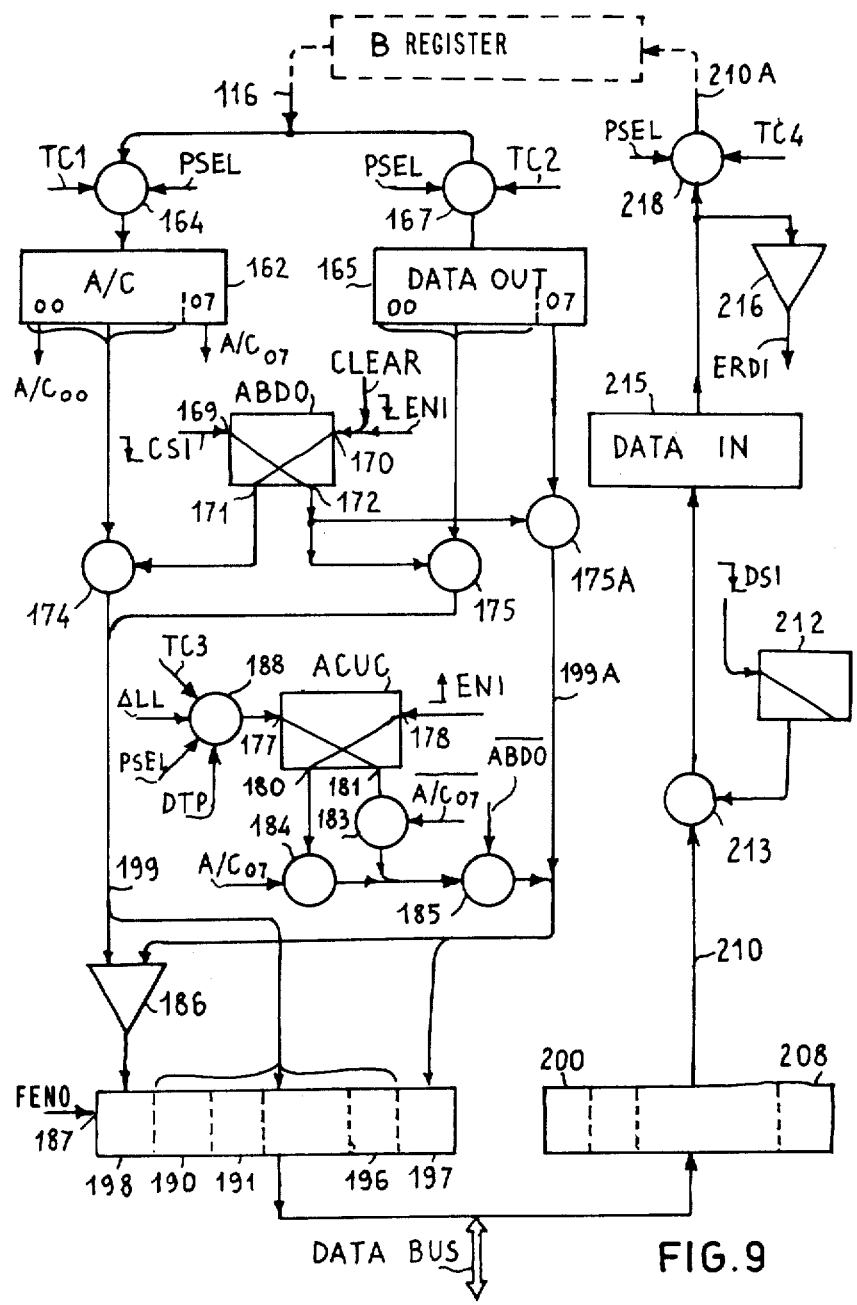

A preferred form of integrated interface module 23 is illustrated in the logical block diagrams of FIGS. 7-9. In these figures a circle represents a logical AND-gate or set of AND-gates.

The symbol illustrated as a rising arrow opposite the input lead of an AND-gate represents that such AND-gate delivers a high-level output signal, representing a binary 1 and being the 1-state of such signal, at the time of occurrence of the leading (or rising) edge of the signal applied to such input lead, if all other input leads of such AND-gate are properly enabled. (An example of such a symbol is that shown opposite the upper input lead of AND-gate 137 in FIG. 7.) The symbol illustrated as a falling arrow opposite the input lead of an AND-gate represents that such AND-gate delivers a high-level output signal, the 1-state of such signal, at the time of occurrence of the trailing (or falling) edge of the signal applied to such input lead, if all other input leads of such AND-gate are properly enabled. (An example of such a symbol is that shown opposite the upper input lead of AND-gate 139 in FIG. 7.) Normally herein, when a signal is said to occur or to be present, it is in the 1-state.

A horizontal bar above a signal identifier or mnemonic represents the logical negation, or inversion, of the signal represented by such identifier without such bar. Such an inverted signal may be obtained from the uninverted, or direct, signal by means of a logical inverting circuit, or the equivalent, normally not illustrated.

When two or more signals are applied to a single line, an OR-gate is usually employed; however, for simplicity of illustration, such OR-gates have been omitted from the logical block diagrams of FIGS. 7-9.

Generally, the interface circuits receive microcommands from central processor 1, as well as signals under timing control of the internal timer of the central processor. Such interface circuits transmit to the central processor information signals which, with few exceptions, are also under timing control of the internal timer of the central processor.

In FIGS. 7-9, for clarity, the interface circuits are illustrated in separated groups; however, the circuits of such groups are actually interconnected. Such interconnection is accomplished by lines which transmit a particular identified signal from one circuit group, as an output signal therefrom, to another circuit group, as an input signal thereto.

When not otherwise specified, the same identifier is used for a circuit element as for the output signal delivered by such element.

The signal CSO is generated by circuits which comprise, FIG. 7, a flip-flop (bistable) FCSO. Flip-flop FCSO is provided with a 1-input (set) lead 134 and a 0-input (reset) lead 135. When a signal representing a binary 1 is applied to the 1-input lead of a flip-flop, the state of the flip-flop is transferred to represent a binary 1, the 1-state of the flip-flop; and when a signal representing a binary 1 is applied to the 0-input lead, the state of the flip-flop is transferred to represent a binary 0, the 0-state of the flip-flop. The output leads of AND-gates 136 and 137 are coupled to 1-input lead 134 and the output leads of AND-gates 138 and 139 are coupled to 0-input lead 135. The 1-output (direct) lead of flip-flop FCSO (the output lead illustrated) is coupled to respective input leads of AND-gates 140 and 141. (The 1-output lead of a flip-flop delivers an output signal representing a binary 1 when the flip-flop is in the 1-state.)

The output leads of AND-gates 140 and 141 are coupled to the input lead of a line driver 143.

Flip-flop FCSO is transferred to the 1-state (set) by a microcommand TC3, applied to one input lead of AND-gate 136, when a signal PSEL (PORT SELECT), an interface channel selection signal, applied to the other input lead of AND-gate 136, is present to enable such gate. (The signal PSEL is generated by central processor 1.) Flip-flip FCSO is also transferred to the 1-state by the leading edge of the signal CSI, applied to one input lead of AND-gate 137, when a signal $\overline{ENO}$, applied to the other input lead of AND-gate 137 is present to enable such gate. Accordingly, AND-gate 137 delivers an output signal to transfer flip-flop FCSO to the 1-state when the leading edge of signal CSI occurs while signal ENO is in the 0-state which, as described above, takes place during a dialogue sequence wherein an error is detected by the device adapter.

Flip-flop FCSO is transferred to the 0-state (reset) by a signal CLEAR generated by central processor 1 during an initialization process. Flip-flop FCSO is also transferred to the 0-state by the leading edge of the signal CSI, applied to one input lead of AND-gate 138, when signal ENO, applied to the other input lead, of AND-gate 138, is present to enable such gate. Accordingly, AND-gate 138 delivers an output signal to transfer flip-flop FCSO to the 0-state when the leading edge of signal CSI occurs while signal ENO is in the 1-state, which takes place during a dialogue sequence wherein there is a transfer of information from the central processor to a peripheral unit. Flip-flop FCSO is also transferred to the 0-state by the trailing edge of signal CSI, applied to one input lead of AND-gate 139, when the signal $\overline{ENO}$, applied to the other input lead of AND-gate 139, is present to enable such gate. Accordingly, AND-gate 139 delivers an output signal to transfer flip-flop FCSO to the 0-state when the trailing edge of signal CSI occurs while signal ENO is in the 0-state, which takes place during a dialogue sequence wherein an error is detected by the device adapter.

The output signal FCSO delivered by the 1-output lead of flip-flop FCSO is transmitted to line driver 143, through two alternate paths. One such path, comprises AND-gate 140, which transmits signal FCSO when both a signal DTP ("Data Transfer Phase") generated by the central processor, applied to one input lead of AND-gate 140, and signal EV1, applied to another input lead of AND-gate 140, are present to enable such gate. Accordingly, AND-gate 140 passes the signal FCSO in the presence of an interrupt request from device adapter 20 for a character transfer, as represented by the signal EV1. The other path for transmittal of signal FCSO comprises AND-gate 141, which transmits signal FCSO when the signal $\overline{DTP}$ (present in non-data transfer phases), applied to one input lead of AND-gate 141, is present to enable such gate. Accordingly, AND-gate 141 passes the signal FCSO without delay during phases which are not data transfer phases. Line driver 143 delivers signal CSO upon receipt of signal FCSO.

The signal DSO is generated by circuits which comprise, FIG. 7, a flip-flop FDSO. Flip-flop FDSO is provided with a 1-input lead 144 and a 0-input lead 145. The output leads of AND-gates 146 and 147 are coupled to 1-input lead 144 and the output leads of AND-gates 148 and 149 are coupled to 0-input lead 145. The 1-output lead of flip-flop FDSO is coupled to the input lead of a line driver 153.

Flip-flop FDSO is transferred to the 1-state by the trailing edge of the signal CSI, applied to one input lead of AND-gate 146, when a signal $A/C_{00}$, applied to the input lead of AND-gate 146, is present to enable such gate. Signal $A/C_{00}$ will be shown hereinafter to correspond to bit 00 of the previously-mentioned control character, and is the bit of such character which represents the direction of transfer. Flip-flop FDSO is also transferred to the 1-state by the leading edge of the signal DSI, applied to one input lead of AND-gate 147, when a signal $\overline{A/C_{00}}$ applied to the other input lead of AND-gate 147, is present to enable such gate.

Flip-flop FDSO is transferred to the 0-state by the signal CLEAR. Flip-flop FDSO is also transferred to the 0-state by the trailing edge of the signal DSI, applied to one input lead of AND-gate 148, when the signal $\overline{A/C_{00}}$ applied to the other input lead of AND-gate 148, is present to enable such gate. Flip-flop FDSO is also transferred to the 0-state by the leading edge of the signal DSI, applied to one input lead of AND-gate 149, when signal $A/C_{00}$, applied to the other input lead of AND-gate 149, is present to enable such gate. Accordingly, AND-gates 146-149 deliver output signals to transfer flip-flop FDSO between its 0-state and its 1-state as the direction of information transfer is designated as being toward the device adapter, indicated by signal $A/C_{00}$ or toward the central processor, indicated by signal $\overline{A/C_{00}}$.

Line driver 153 delivers signal DSO when the signal FDSO is in the 1-state.

The signal ENO is generated by circuits which comprise, FIG. 8, a flip-flop FENO. Flip-flop FENO is provided with a 1-input lead 154 and a 0-input lead 155. The 1-output lead of flip-flop FENO is coupled to the input of a line driver 157.

In direct implementation of the conditions for the presence of the signal ENO and its interrelationship with the signal ENI, flip-flop FENO is transferred to the 1-state by the initializing, or clearing, signals RSO and CLEAR, and by the trailing edge of the signal ENI, all applied directly to the 1-input lead 154, and is transferred to the 0-state by the leading edge of signal ENI, applied directly to the 0-input lead 155.

Line driver 157 delivers signal ENO when the signal FENO is in the 1-state.

Circuits for controlling the transfer of information between the Data Bus and a B Register in central processor 1 (referred to in the above-mentioned patent application) are illustrated in FIG. 9. These circuits comprise an A/C Register 162 for storing a control character. An AND-gate set 164 is coupled to receive signals representing the information held in the B Register and to transfer such signals to the A/C Register upon receipt of a microcommand TC1, applied to one input lead of AND-gate set 164, when the signal PSEL (PORT SELECT), applied to the other input lead of AND-gate set 164, is present to enable such a gate set.

The A/C Register holds the eight control bits of a control character in respective bit positions 00-07 thereof. Signal $A/C_{00}$ representing bit 00 stored in the A/C Register, is employed, as described above, to control the changes of state of flip-flop FDSO, FIG. 7.

A DATA OUT Register 165 holds eight bits, FIG. 9. An AND-gate set 167 is coupled to receive signals representing the information held in the B Register and to transfer such signals to the DATA OUT Register upon receipt of a microcommand TC2, applied to one input lead of AND-gate set 167, when the signal PSEL, applied to the other input lead of AND-gate set 167, is present to enable such gate set.

The transfer of signals representing the contents of the A/C Register and the DATA OUT Register is controlled by AND-gate sets 174 and 175, by AND-gate 175A and by a flip-flop ABDO. Flip-flop ABDO is provided with a 1-input lead 169 and a 0-input lead 170. Flip-flop ABDO is provided with a 1-output lead 172, which delivers the signal ABDO, and a 0-output lead 171, which delivers the signal $\overline{ABDO}$. Output lead 171 is connected to one input lead of AND-gate set 174 and output lead 172 is connected to one input lead of AND-gate set 175, whereby the complementary output signals ABDO and $\overline{ABDO}$ alternately enable AND-gate sets 175 and 174. Output lead 172 is also connected to one input lead of AND-gate 175A to enable such gate when flip-flop ABDO is in the 1-state. Flip-flop ABDO is transferred to the 1-state by the trailing edge of signal CSI, applied directly to the 1-input lead 169. Flip-flop ABDO is transferred to the 0-state by the signal CLEAR and by the trailing edge of the signal ENI, both applied directly to the 0-input lead 170.

AND-gate set 174 is coupled to receive signals representing bits 00-06 held in the A/C Register and AND-gate set 175 is coupled to receive signals representing bits 00-06 held in the DATA OUT Register. Seven line drivers 190-196 are coupled by a channel 199 to the output leads of both of AND-gate sets 174 and 175. Therefore, according to the state of flip-flop ABDO, either AND-gate set 174 or AND-gate 175 is enabled to pass through channel 199 to line drivers 190-196 signals representing bits 00-06 of either the contents of the A/C Register or of the DATA OUT Register. The signals applied to line drivers 190-196 are transferred therethrough to the Data Bus.

One input lead of AND-gate 175A is coupled to an output lead of the DATA OUT Register to receive a signal representing bit 07 stored in the DATA OUT Register. The input lead of a line driver 197 is coupled by a lead 199A to the output lead of AND-gate 175A. Accordingly, AND-gate 175A is enabled to pass a signal representing bit 07 in the DATA OUT Register to line driver 197 when flip-flop ABDO is in the 1-state.

Bit 07 of the control character held in the A/C Register is transferred through the interface in a different manner from the transfer of bit 07 in the DATA OUT Register. Signals $A/C_{07}$ and $\overline{A/C_{07}}$, which represent respectively bit 07 in the A/C Register and the logical inverse, or complement, of such bit 07, are selectively transferred under control of a flip-flop ACUC.

Flip-flop ACUC is provided with a 1-input lead 177 and a 0-input lead 178. Flip-flop ACUC is provided with a 1-output lead 181, which delivers the signal ACUC, and a 0-output led 180, which delivers the signal $\overline{ACUC}$. Output lead 180 is connected to one input lead of an AND-gate 184 and output lead 181 is connected to one input lead of an AND-gate 183. The other input lead of AND-gate 184 receives the signal $A/C_{07}$ and the other input lead of AND-gate 183 receives the signal $\overline{A/C_{07}}$.

One input lead of an AND-gate 185 is coupled to the output leads of both AND-gates 183 and 184. The other input lead of AND-gate 185 is coupled to receive the signal $\overline{ABDO}$. The output lead of AND-gate 185 is coupled to lead 199A and, therefore, to the input lead of line driver 197. Therefore, according to the state of flip-flop ACUC, and when AND-gate 185 is enabled by the presence of the signal $\overline{ABDO}$, either AND-gate 183 or 184 is enabled to pass the respective signal $\overline{A/C_{07}}$ or $A/C_{07}$ to line driver 197.

The 1-input lead of flip-flop ACUC is connected to the output lead of AND-gate 188. Flip-flop ACUC is transferred to the 1-state by a combination of signals applied to AND-gate 188, as will be described more fully hereinafter. Flip-flop ACUC is transferred to the 0-state by the leading edge of signal ENI applied directly to 0-input lead 178.

Finally, the circuits for controlling the transfer of information from the B Register to the Data Bus comprise a parity bit generation network 186. Network 186 may comprise, for example, a plurality of Exclusive-OR logical elements, appropriately cascaded and interconnected. Network 186 is coupled to receive the signals transmitted by channel 199 and line 199A, such signals collectively representing the eight information bits of a control character or an item of data, and to respond to such signals to deliver an output signal representing a parity bit for such eight information bits. A line driver 198 is coupled to the output lead of network 186 to receive therefrom the signal representing the parity bit of the information represented by the eight signals transmitted by line drivers 190-197.

Because the Data Bus is bidirectional, line drivers 190-198 are provided with an enabling input lead 187, whereby such line drivers are enabled to apply signals to the Data Bus only when information is required to be transferred from interface module 23 to device adapter 20. Accordingly, lead 187 is coupled to receive the signal FENO, FIG. 8.

The circuits of FIG. 9 which control the transfer of information from the Data Bus to the B Register comprise line receivers 200-208 and a DATA IN Register 215. Line receivers 200-208 are coupled to receive the signals transferred over the Data Bus and to apply such signals to a channel 210.

An AND-gate set 213 is coupled, at one input lead thereof, to receive the signals transmitted by channel 210 and to transfer such signals to the DATA IN Register when enabled by the output signal of a one-shot 212, which is applied to the other input lead of AND-gate set 213. One-shot (monostable or univibrator) 212 is provided with a trigger input lead, which is coupled to receive the signal DSI. One-shot 212 is triggered by the trailing edge of signal DSI to deliver an output signal of predetermined duration. Accordingly, when the trailing edge of signal DSI triggers one-shot 212, gate set 213 is enabled to transfer signals representing the information on the Data Bus to the DATA IN Register for storage therein.

An AND-gate set 218 controls the transfer of signals from the DATA IN Register to the B Register. AND-gate set 218 is coupled, at one input lead thereof, to receive signals representing the information held in the DATA IN Register and to transfer such signals to the B Register, over a channel 210A, upon receipt of a microcommand TC4, applied to another input lead of AND-gate set 218, when the signal PSEL, applied to the other input lead of AND-gate set 218, is present to enable such gate set. Both microcommand TC4 and signal PSEL are supplied by central processor 1.

A parity check network 216 is coupled to receive signals representing the contents of DATA IN Register and to generate an output signal ERDI when such network detects a parity error in the information represented by such signals.

Certain circuits in interface module 23 are provided simply to transfer signals through the module. Such circuits comprise line receivers 219 and 220, and line drivers 159 and 221. Line driver 159 is coupled to receive a microcommand RSO1 from central processor 1 and to transfer such signal over the interface as the signal RSO. Line driver 221 is coupled to receive the signal OPO from central processor 1 and to transfer such signal over the interface. Line receiver 219 is coupled to receive the signal EV2 from the integrated interface and to transfer such signal to the central processor. Line receiver 220 is coupled to receive the signal OPI from the integrated interface and to transfer such signal to the central processor.

On the other hand, line receivers 222, 225, 226 and 227, coupled to receive the respective signals EV1, CSI, DSI and ENI from the integrated interface, do not transfer such signals directly to the central processor, but instead, deliver these signals for employment within interface module 23.

As has been described previously herein, the signal EV1 indirectly generates an interrupt request for a character transfer by indirectly causing generation of the signal INTB. As has been described above in connection with the generation of signal CSO, FIG. 7, certain previously described dialogue sequences commence with the generation of signal CSO which, in turn, is caused by the receipt of signal EV1. At the conclusion of such dialogue sequences, the transfer of the signal ENI to the 0-state is interpreted as a data transfer phase, by the consequent generation of signal INTB, which denotes an interrupt request for a character transfer.

The signal INTB is generated by circuits which comprise, FIG. 8, a flip-flop FINT. Flip-flop FINT is transferred to the 1-state by the microcommand TC3, applied directly to the 1-input lead of flip-flop FINT. Flip-flop FINT is transferred to the 0-state by the trailing edge of the signal ENI, applied directly to the 0-input lead of flip-flop FINT. The 1-output lead of flip-flop FINT is coupled to one input lead of each of AND-gates 223 and 224. The other input lead of AND-gate 223 is coupled to receive the signal DTP and the other input lead of AND-gate 224 is coupled to receive the signal PSEL. Accordingly, AND-gate 224 delivers an output signal, designated as the signal BUSY, for the entire duration of a dialogue sequence. The signal BUSY represents to central processor 1 that interface module 23 is occupied in executing a dialogue sequence.

The output signal of AND-gate 223 is designated as the signal INTB. The trailing edge of signal INTB is delivered by AND-gate 223 when flip-flop FINT is transferred to the 0-state by the trailing edge of signal ENI, when AND-gate 223 is enabled by the signal DTP. Such trailing edge of signal INTB represents an interrupt request signal and is applied to a priority network in the central processor where a pre-established priority level is allocated and stored for such request (more fully described in the above-identified patent application).

Circuits are also provided in interface module 23, FIG. 8, for detecting and providing notification of errors. Such circuits comprise flip-flops ERCE, ERTO and EIDI, designated herein as diagnostic flip-flops.

Flip-flop ERCE provides notification of a parity error in signals received from the Data Bus. The 1-input lead of flip-flop ERCE is connected to the output lead of an AND-gate 228 and the 0-input lead of the flip-flop is connected to the output lead of an AND-gate 229. Flip-flop ERCE is transferred to the 1-state by signal ERDI, applied to one input lead of AND-gate 228, when the microcommand TC4 is applied to the other input lead of AND-gate 228. Signal ERDI is described above as being generated by parity check network 216, FIG. 9, when a parity error is detected in information received from the Data Bus, and microcommand TC4 has been described as enabling the transfer of information from the Data Bus to the B Register. Flip-flop ERCE is transferred to the 0-state by a microcommand TC5 (ERROR RESET), applied to one input lead of AND-gate 229, FIG. 8, when the signal PSEL (PORT SELECT), applied to the other input lead of AND-gate 229, is present to enable such gate. Accordingly, the signal ERCE delivered by the 1-output lead of flip-flop ERCE provides notification that a parity error is detected on signals received by interface module 23 from the Data Bus.

Flip-flop ERTO provides a "time-out" error notification; i.e., a notification that a dialogue sequence has failed to be completed within a predetermined interval, which is a requirement in certain phases such as command transmitting or status receiving phases. A measure of this predetermined maximum interval permitted a dialogue sequence is provided by a one-shot 230. The trigger input lead of one-shot 230 is coupled to the output lead of an AND-gate 231. Accordingly, one-shot 230 is triggered by microcommand TC3, applied to one input lead of AND-gate 231, when the signals $\overline{DTP}$ and PSEL, applied to the respective other input leads of AND-gate 231, are present to enable such gate. Such microcommand TC3 is the microcommand which initiates generation of the signal CSO, FIG. 7, to initiate a dialogue sequence.

A flip-flop 233A is employed to suppress the "time-out" error notification when the dialogue sequence is completed within the allotted time. The 1-input lead of flip-flop 233A is coupled to the output lead of AND-gate 231. Accordingly, at the same time that the output signal of AND-gate 231, delivered in response to microcommand TC3, triggers one-shot 230, it also transfers flip-flop 233A to the 1-state. Flip- flop 233A is transferred to the 0-state by the signal ERTO and by the trailing edge of the signal ENI, both applied directly to the 0-input lead of flip-flop 233A.

One input lead of an AND-gate 232 is connected to the output lead of one-shot 230 and the other input lead of such AND-gate is connected to the 1-output lead of flip-flop 233A. The 1-input lead of flip-flop ERTO is connected to the output lead of AND-gate 232, and the 0-input lead of flip-flop ERTO is connected to the output lead of an AND-gate 233. Accordingly, at the termination of the output signal of one-shot 230, which occurs at a predetermined time after the one-shot is triggered, a time determined by the parameters of the one-shot, AND-gate 232 delivers an output signal to transfer flip-flop ERTO to the 1-state, provided that AND-gate 232 is enabled by the 1-output signal of flip-flop 233A, which enabling occurs if flip-flop 233A is still in the 1-state. Accordingly, the ERTO flip-flop is transferred to the 1-state only if a dialogue sequence is not completed prior to the end of the termination of the output signal of one-shot 230. Therefore, the signal ERTO delivered by the 1-output lead of flip-flop ERTO provides notification that the dialogue sequence has not been completed within the appropriate time. Flip-flop ERTO is transferred to the 0-state by microcommand TC5, applied to one input lead of AND-gate 233, when the signal PSEL, applied to the other input lead of AND-gate 233, is present to enable such gate.

Flip-flop EIDI provides notification that a "dialogue inversion" has occurred as a consequence of the detection by the device adapter of a parity error, a logical error, or an illegal code. Such dialogue inversion has been described previously herein in connection with dialogue sequences in which errors occur and in which, as a result, the device adapter transfers the signal ENI and then the signal CSI to the 1-state. The 1-input lead of flip-flop EIDI is connected to the output lead of an AND-gate 234 and the 0-input lead of the flip-flop is connected to the output lead of an AND-gate 235. Flip-flop EIDI is transferred to the 1-state by the presence of the signal CSI, applied to 1-input lead of AND- gate 234, when the signal ENI, applied to the other input lead of AND-gate 234, is present to enable such gate. Thus, the signal EIDI delivered by the 1-output lead of flip-flop EIDI provides notification that such a dialogue inversion has occurred. Flip-flop EIDI is transferred to the 0-state by the microcommand TC5, applied to one input lead of AND-gate 235, when the signal PSEL, applied to the other input lead of AND-gate 235, is present to enable such gate.

The 1-output leads of diagnositc flip-flops ERCE, ERTO and EIDI are coupled to a single line 236 which, in turn, is coupled to central processor 1. The signals transmitted on line 236 are designated collectively as the signal ERROR. Accordingly, whenever an error occurs which causes one of flip-flops ERCE, ERTO or EIDI to be transferred to the 1-state, the output signal of such flip-flop provides a signal on line 236 that represents generically an error.

A lead 237 connects the 1-output lead of flip-flop ERCE to one input lead of AND-gate 240, a lead 238 connects the 1-output lead of flip-flop ERTO to one input lead of an AND-gate 241, and a lead 239 connects the 1-output lead of flip-flop EIDI to one input lead of an AND-gate 242. The output leads of AND-gates 240, 241 and 242 are coupled to channel 210A, FIG. 9. Accordingly, when any one of flip-flops ERCE, ERTO, or EIDI is in the 1-state, as the result of an error condition, the respective one of AND-gates 240, 241 and 242 trasmits the output signal of such flip-flop on channel 210A to Register B of the central processor when microcommand TC6 is applied to one input lead of such AND-gate and the signal PSEL, applied to the other input lead of such AND-gate, is present to enable such gate, FIG. 8. Microcommand TC6 is a signal provided by the central processor for the purpose of transferring signals representing errors to the B Register.

Operation of Intergrated Interface Module

The operation of integrated interface module 23 will now be described with reference to the logical block diagrams of the circuits of the module, FIGS. 7-9, and the timing diagrams of the dialogue sequences of the integrated interface, FIGS. 3-6.

A command phase is initiated when central processor 1 generates the signal PSEL and the microcommands TC1 and TC2, which function to load the A/C Register with a control character and the DATA OUT Register with a command. The control character specifies the direction of the information transfer and the destination of such information. At this time, the central processor also generates the signal $\overline{DTP}$ which denotes that the integrated interface is not in a data transfer phase and, therefore, is in a command or status transfer phase. The signals PSEL and $\overline{DTP}$ may be generated in the central processor by other microcommands or appropriate flip-flops.

The control character contents of the A/C Register are immediately transferred through AND-gate set 174, enabled by the 0-state of flip-flop ABDO, which is initially in such state, and line drivers 190-198 to the Data Bus.

Central processor 1 next generates the microcommand TC3, which transfers flip-flop FCSO to the 1-state through AND-gate 136, then enabled by signal PSEL. Because signal $\overline{DTP}$ is enabling AND-gate 141, immediately upon the transfer of flip-flop FCSOto the 1-state, line driver 143 delivers the signal CSO, which initiates a dialogue sequence and provides notification that the information then present on the Data Bus is control information.

The dialogue sequence then proceeds in the manner described above, the device adapter responding to the transition in the signal CSO to transfer the signal CSI to the 1-state. The interface module 23 responds to the transition in the signal CSI, which passes through AND-gate 138, enabled by the signal ENO to transfer flip-flop FCSO and, resultingly, signal CSO to the 0-state. The device adapter thereupon accepts the control character from the Data Bus and subsequently transfers signal CSI to the 0-state.

This last-mentioned transition of signal CSI passes through AND-gate 146, enabled by signal $A/C_{OO}$ which is in the 1-state because the control character in the A/C Register specifies the direction of information transfer to be toward the device adapter to transfer the FDSO flip-flop to the 1-state. Accordingly, line driver 153 now delivers the DSO signal. Such trailing edge of the signal CSI also transfers flip-flop ABDO to the 1-state. The resulting ABDO signal enables AND-gate set 175 and AND-gate 175A to pass the command held in the DATA OUT Register to line drivers 190-198 and the Data Bus. The dialogue sequence now concludes, as described previously, by the exchange between interface module 23 and device adapter 20 of the signals DSO, DSI, ENI and ENO. If an error is detected by the device adapter, there also takes place the additional exchange, described above, of the signals CSI and CSO with signal ENI in the 1-state.

During the duration of the dialogue sequence flip-flop FINT, which is transferred to the 1-state by microcommand TC3 at the beginning of the dialogue sequence, remains in the 1-state delivering the continuous signal BUSY through AND-gate 224, enabled by signal PSEL. The signal BUSY does not discontinue until the occurrence of the trailing edge of signal ENI, at the conclusion of the dialogue sequence, which transfers flip-flop FINT to the 0-state. The signal BUSY is employed to prevent the central processor from continuing to execute the mocroprogram beyond the point which started the command transfer phase. Such microprogram is suspended by inhibiting addressing of the store holding the microprogram, thus inhibiting the execution of new microinstructions until the dialogue sequence is completed. Upon such completion the microprogram may be resumed, or a new microinstruction sequence may be initiated to start a new dialogue sequence and transfer a new command to the device adapter.

A status transfer phase follows a similar dialogue sequence to that of the command phase, the differences being described hereinafter. After microcommand TC1 has functioned to load the A/C Register with a control character, the central processor generates the microcommand TC3, which effectively starts the dialogue sequence. The signals CSO and CSI are exchanged between interface module 23 and device adapter 20 and the control character transmitted on the Data Bus is received by the device adapter.

The device adapter thereupon generates the ENI signal which now functions to effectively reverse the direction of information transfer on the Data Bus. The device adapter then transfers the signal DSI to the 1-state and simultaneously applies data signals representing the required information on the Data Bus. This transition in the signal DSI passes through AND-gate 147, which is enabled by the signal $\overline{A/C_{OO}}$ because the control character in the A/C Register specifies the direction of information transfer to be toward the central processor, to transfer the flip-flop FDSO to the 1-state. The resulting transfer of the signal DSO to the 1-state is detected by the device adapter 20 which thereupon transfers signal DSI to the 0-state. The trailing edge of signal DSI triggers one-shot 212 thereupon enabling AND-gate set 213 to transfer information from the Data Bus to the DATA IN Register. The dialogue sequence is then terminated as described previously. Again, in this dialogue sequence, the microprogram in the central processor is suspended by the signal BUSY until the dialogue sequence is completed. At the end of this dialogue sequence the microprogram is once again permitted to resume and a new microinstruction generates microcommand TC4, which enables AND-gate set 218 to transfer the contents of the DATA IN Register to the B Register of the central processor.

If, during either of the dialogue sequences of the command or status transfer phases, an error is detected so as to transfer one of the diagnostic flip-flops ERCE, ERTO or EIDI to the 1-state, the signal ERROR is delivered by the interface module. It now becomes the task of central processor 1, through the execution of appropriate microprograms to determine next how to proceed by considering, for example, at the completion of the dialogue sequence, the status of the various diagnostic flip-flops in interface module 23. This is effected by a micro-instruction that generates microcommand TC6, which enables AND-gates 240, 241 and 242 to pass signals representing the states of respective flip-flops ERCE, ERTO and EIDI to the B Register. The microcommand TC5 may then be generated to transfer the diagnostic flip-flops to the 0-state.

A dialogue sequence initiated by the delivery of a signal EV2 by the device adapter does not differ from those described above. Once the central processor has acknowledged signal EV2 and accepted the interrupt request represented thereby, it is the central processor which initiates the dialogue sequence to provide the necessary information transfer.

The operation of the integrated interface will now be described for the instance in which the command phase requests a data transfer operation. The command phase first proceeds in one or more dialogue sequences of the type described above. At the conclusion of the command phase the address of the register into which data is to be written or from which data is to be read is loaded into the A/C Register and, if data is to be written into a register, the first data character is loaded into the DATA OUT Register.

The signal DTP is then transferred to the 1-state by a microcommand TC7 and microcommand TC3 next is generated. Microcommand TC3 transfers flip-flops FCSO and FINT to the 1-state, as described above in connection with the command phase. However, in this instance, although the signal DTP is present, it only partially enables AND-gate 140, so that the FCSO signal cannot be transferred through AND-gate 140 to line driver 143 to generate the signal CSO until device adapter 20 provides request signal EV1 to complete the enabling of AND-gate 140. Accordingly, the dialogue sequence commences only when signal EV1 is applied to the input lead of AND-gate 140.

At the conclusion of this dialogue sequence, the transition of signal ENI to the 0-state causes flip-flop FINT to transfer to the 0-state and the consequent transfer to the 0-state of signal INTB through AND-gate 223, which is enabled by the signal DTP. This trailing edge of signal INTB is detected by the priority network in the central processor and is accorded recognition after interrupt requests allocated higher priority have been satisified. The central processor thereupon causes a new data character to be loaded into the DATA OUT Register and microcommand TC3 is generated once again. A new dialogue sequence starts as soon as another signal EV1 is received, if it was not already present.

The dialogue sequence for data transfer is similar in the instance of data read from the device adapter. At the start of the data transfer, the central processor generates suitable commands and the A/C Register is loaded. Immediately after the signal DTP is transferred to the 1-state, microcommand TC3 is generated. When the signal EV1 becomes available, the dialogue sequence begins and the first character supplied by the device adapter is accepted from the Data Bus and loaded into the DATA IN Register.

At the conclusion of such dialogue sequence the ENI signal transfers flip-flop FINT to the 0-state, and the signal INTB transfers to the 0-state. This transition in signal INTB is detected by the priority network of the central processor which upon serving higher priority requests accords recognition to the request represented by signal INTB. The central processor thereupon causes the transfer of the contents of the DATA IN Register to the B Register, and from the B Register to an appropriate main memory location. When this operation is completed the central processor generates a new microcommand TC3 to once again transfer flip-flops FCSO and FINT to the 1-state to initiate a new dialogue sequence when the signal EV1 becomes available.

The dialogue sequence by which the central processor notifies the device adapter that the data transfer operation must terminate will now be described. For this purpose, the control character transmitted with the last data character to be written or which requests the last data character to be read is appropriately modified by transferring flip-flop ACUC to the 1-state. As has been described above the address, or identification, of the two types of device adapter registers, into which data is written or from which data is retrieved, is suitably expressed by a six-bit code rather than requiring the entire seven-bit code held in the A/C Register. Therefore, bit 07 in the A/C Register is not necessary for such address and may selectively be placed in the 1-state or 0-state.

Accordingly, a specific control function may be attributed to bit 07 of the A/C Register; i.e., if such bit 07 is in the 0-state it may represent that the data character to be transferred is not the last character of the series being transferred, but if in the 1-state it may represent that the data character to be transferred is the last one of the series.

When the central processor recognizes that the data transfer operation must conclude upon transfer of the last data character of a series, it transmits a signal ΔLL to interface module 23. One manner in which such a signal ΔLL may be generated, is by the central processor repeatedly decrementing a character representing the length of the character transfer series, expressed as the number of characters to be transferred. Such a character may be held in an appropriate working register, and is decremented by 1 in the processing network of the central processor upon each data character transfer. The processing network detects when the number represented by such character is reduced to a predetermined value (1 or 0) and thereupon generates signal ΔLL.

The signal ΔLL is applied to one input lead of AND-gate 188, FIG. 9. Accordingly, AND-gate 188 delivers an output signal to transfer flip-flop ACUC to the 1-state upon receipt of signal ΔLL, when microcommand TC3 and signals PSEL and DTP, applied to respective other input leads of AND-gate 188, are present to enable such gate. The output signal ACUC delivered on output lead 181 of flip-flop ACUC thereupon enables AND-gate 183 to pass signal $\overline{A/C_{07}}$ through AND-gate 185, enabled by signal $\overline{ABDO}$, to lead 199A and, ultimately, to the device adapter as control information. Such signal provides notification to the device adapter, by representing the logical inverse, or complement, of bit 07 of the control character, that the data transfer operation must be terminated. In this manner, central processor 1 transmits a notification to device adapter 20 of the end of a data transfer operation, utilizing the existing structure of the Data Bus and without requiring an additional line in the interface or Data Bus.

The preceding description has covered the structural, functional and operational characteristics of a module providing an integrated interface. The circuits of such module are preferably contained on a single printed circuit board, or a small number of such boards, in order to be easily replaceable.

Communications between the integrated interface module and the device adapter are performed over the line set illustrated in FIG. 2, which comprises the Data Bus and associated control lines. Communications between the integrated interface module and the central processor are performed over a set of leads which are included in a universal port, or universal interface. Such leads are the following (employing the same identifier or mnemonic for the lead as for the signal carried by such lead):

TC1-TC6; timing microcommands from central processor.
ΔLL; end of data transfer signal. PSEL; channel or port selection signal.
Data input channel.
Data output channel.
INTB; character transfer interrupt request from interface module.
EV2; service interrupt request.
CLEAR; initialization signal.
DTP; notification of data transfer phase.
OPO, OPI, RSO; three control signals directly transferred through the interface module.
ERROR; error notification.
BUSY notification of the occurrence of a dialogue sequence.

As will be described hereinafter, most of such leads and signals are also employed in the standard interface.

Channel Programs

Prior to describing the standard interface, the programs which manage the I/O operations of the computer system first will be briefly outlined.

In a digital computer system having a plurality of I/O channels and the capability of simultaneous operation of a plurality of peripheral units communicating with the central processor, the I/O operations are defined by channel programs. A channel program is a conventional computer program consisting of a set of macroinstructions, each of which specifies an operation to be performed by the computer system, the location for data to be written into or read from, numerical information pertaining to the length of data, etc. Some of such macroinstructions may consist simply of commands, simply of data characters, or of commands combined with data characters.

A channel program macroinstruction may be considered as a basic element of a channel program and, as such, is termed a "channel command entry" (CCE). A channel command entry may comprise, for example, a plurality of 8-bit characters organized into 4-character words which are termed "channel control words" (CCW). In the instance of the integrated interface, or central control of I/O programs, channel command entries are interpreted by the central processor and converted to a sequence of elemental commands and information, which are transferred through the integrated interface under the initiative and control of the central processor. However, in the instance of the standard interface, or control of a peripheral unit by a peripheral control unit, channel command entries are transferred to the peripheral control units, under the initiative and control of such peripheral control units, which thereupon interpret the received channel command entries and convert them to a sequence of elemental commands directed to the peripheral units involved.

The management of the various channel programs is performed by a supervisory program. Such supervisory program requests the initiation, the interruption and the termination of a channel program and, therefore, requires a means for forwarding appropriate instructions to the peripheral control units. Such means consists of a set of "service signals" and a set of "service instructions", which are defined input/output controller (IOC) instructions. Such service instructions are not part of a channel program, even though they can refer to such programs.

In the standard interface, the peripheral control unit (PUC) controls the information transfer through the interface by transmitting appropriate service codes to the central processor. A service code is, in effect, an instruction, transferred through the standard interface from the peripheral control unit to the central processor, which specifies tasks to be performed by the central processor and the meaning of the I/O operations to follow.

Therefore, although the central processor, through the supervisory program, has the task of organizing the various channel programs, maintaining an account of the status of the peripheral units, and notifying a peripheral control unit when a channel program must be initiated, interrupted or terminated, effectively, channel program call and execution is entirely under control of the peripheral control units.

Because a peripheral control unit has no information as to which channel programs must be executed, or where such programs reside, the supervisory program stores information to this effect in appropriate memory tables, examining such information from time to time and calling the required information by means of addresses or "pointers", which are also held in appropriate memory locations.

A "command pointer" (CMP) is an address for locating a command channel entry in a channel program. When a new channel program is placed in execution, the command pointer addresses the first channel command entry of such program. As the channel program proceeds, the command pointer is altered to address the channel command entry which next must be executed.

Although the presetting of the initial value of the command pointer and its updating are performed by the central processor, the peripheral control unit exclusively initiates control of such updating. The peripheral control unit utilizes the command pointer as a program sequence counter, enabling it to initiate a channel program, to execute the commands of the program in the desired order, to repeat a command if so required, or to return to a predetermined channel program location upon exploring, without executing, one or more following program commands.

A "control word pointer" (CWP) is an address for locating a particular channel command entry in a channel program, regardless of the state of execution of the channel program. The control word pointer may be altered and updated under control of the central processor or the peripheral control unit, to enable, for example, the peripheral control unit to explore and read a channel program without executing it.

Standard Interface

Figure 10:
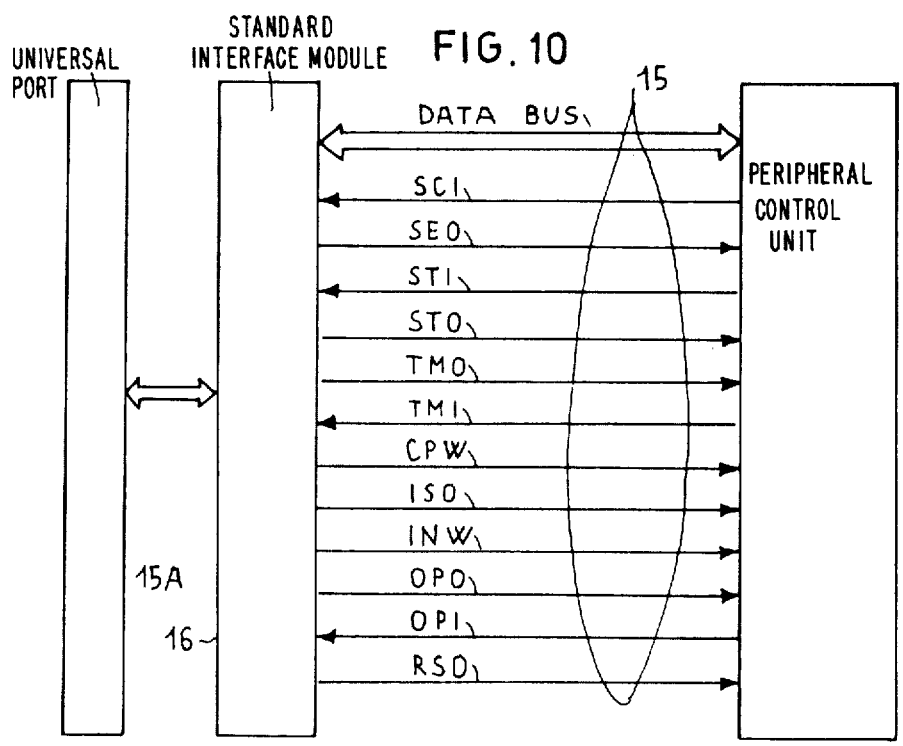
FIG. 10 is a schematic diagram of a standard interface.

The standard interface of FIG. 10, according to the invention, comprises channel 15, universal port 15A and standard interface module 16. Module 16 is adapted to be plugged into any one of the universal ports to convert such port to an integrated interface. Channel 15 comprises a plurality of data and control lines, as follows:

Data Bus - The Data Bus comprises a group of nine bidirectional lines, of which eight lines carry signals representing binary digital information and one line carries a signal representing a parity bit. Thus, the Data Bus provides a one-byte path through the interface. The information signals transferred over the Data Bus primarily represent a service code, a data character, a command, status information, an address of a peripheral unit, or an IOC (service) instruction.

The meaning to be attributed to the byte present on the Data Bus is defined by timing signals present concurrently on the interface, as follows (the same identifier or mnemonic is used for a signal and the line which carries the signal):

Service Code In (SCI) - The SCI line provides notification from the peripheral control unit to interface module 16 that the peripheral control unit is ready to transmit a service code to central processor 1.

Service Enable Out (SEO) - The SEO line provides notification from module 16 to the peripheral control unit that central processor 1 is ready to receive a service code, such signal representing a response to a signal SCT.

Strobe In (STI) - The STI line performs two functions: (1) transmits a timing signal from the peripheral control unit to interface module 16 which characterizes the byte then present on the Data Bus as information being transferred from the peripheral control unit to central processor 1; and (2) transmits a signal representing a response to a signal STO received from module 16 during the transfer of information from central processor 1 to the peripheral control unit.

Strobe Out (STO) - The STO line performs two functions: (1) transmits a timing signal from interface module 16 to the peripheral control unit which characterizes the byte then present on the Data Bus as information is being transferred from central processor 1 to the peripheral control unit; and (2) transmits a signal representing a response to a signal STI received from the peripheral control unit, to denote that module 16 is ready to receive the information made available by the peripheral control unit.

Terminate Out (TMO) - The TMO line provides a signal for terminating the current information transfer operation. Such signal is transmitted in lieu of a signal STO, but provides additional information with respect to the last character to be transferred. Two functions are performed: (1) during a write information transfer operation (transferring of information from the central processor to the peripheral control unit) provides notification that module 16 will transfer an information character which is the last of the series of characters to be transferred; and (2) during a read information transfer operation (transferring of information from the peripheral control unit to the central processor) provides notification either: (a) that during a data transfer operation, the data character being transferred is the last of the series, or (b) that during a service code transfer operation (when the signal SCI is present) the operation must be halted immediately, because an error has been detected or because the central processor cannot accept further information.

Terminate In (TMI) - The TMI line provides a signal for terminating the current information transfer operation. Such signal is transmitted in lieu of a signal STI, but provides additional information with respect to the last character to be transferred. Two functions are performed: (1) during a write information transfer operation provides notification either: (a) that the peripheral control unit will accept the next character to be transferred as the last character in the series and then will terminate the reception, at least temporarily, or (b) that during a command transfer operation the character being transferred is the last requested by the peripheral control unit; and (2) during the read information transfer operation provides notification that the character being transferred is the last of the series.

Channel Program Waiting (CPW) - The CPW line provides notification from module 16 to the peripheral control unit that a channel program is waiting to be initiated and that information pertinent thereto is resident in the central processor.

Illegal Sequence Out (ISO) - The ISO line provides notification from module 16 to the peripheral control unit that central processor 1 has detected an error (for example, a parity error or an illegal code). The peripheral control unit, as will be described hereinafter, must respond to a signal ISO by transferring an appropriate service code which requests the central processor to send an IOC instruction.

Instruction Waiting (INW) - The INW line provides notification from module 16 to the peripheral control unit that central processor 1 is ready to transmit an IOC instruction.

Operational Out (OPO), Operational In (OPI), and Reset Out (RSO) - The OPO, OPI and RSO lines and the respective signals transmitted thereby are the same and have essentially the same significance as the corresponding lines and signals in the integrated interface, described previously herein.

No lines are provided in the standard interface for transferring interrupt signals but, instead, such signals are generated indirectly by signals STI or TMI and, when present, by signal SCI. The interrupt signals so generated are, as in the instance of the integrated interface, of two types: (1) a service interrupt signal EV2, employed for starting and executing complex I/O services which require central processor check and execution operations that may evolve in different forms once the interrupt request is honored; and (2) a character transfer interrupt request signal INTB for executing repetitive operations, such as a character series transfer operation, which operation may be preset. These two types of interrupt signals may be assigned different priorities, or even variable priority levels, according to the current particular requirements of the system. In the latter instance, a priority level may be established by appropriate circuits controlled either from the central processor or from the peripheral control unit, as described in the U.S. patent application for *DYNAMICALLY VARIABLE PRIORITY ACCESS SYSTEM* by A. Bardotti et al, SN 419,312, filed November 27, 1973, and assigned to the assignee of the present application.

Service Codes

Prior to describing dialogue sequences which occur in the standard interface, types of service codes employed and their functions will first be described.

Input/Output operations are specified by channel programs, which comprise a series of macroinstructions designated as channel command entries (CCE). A peripheral control unit directs such an I/O operation (performed through a standard interface) in response to commands from these channel programs. However, the peripheral control unit must execute a channel program (through channel program pointers) by reading a command, initiating a data transfer, stepping to the next command, etc. The peripheral control unit obtains and executes a channel program by the employment of service codes, which comprise one byte and are transferred to the central processor over the Data Bus.

The format of a service code may comprise, for example:
  Bits 0-3; identification of the particular type of service code.
  Bits 4-7; auxiliary qualification information, the meaning of which depends on the particular type of service code involved, and which may be used, for example, to define a priority level or degree of urgency for the service being requested by the service code.

Specifically, bit 0 provides for distinguishing between two classes of service codes as follows: (1) in the 0-state, represents a service code which initiates an operation; and (2) in the 1-state represents a service code which controls the movement of pointers, which is the mechanism for addressing the next channel command entry (CCE) in the channel program being executed.

Service Codes for Initiating an Operation

This class of codes comprises primarily the following:
 (I-NPC) - initiate a new program;
 (I-DTC) - initiate a data transfer;
 (I-IOC) - initiate an IOC instruction;
 (I-DSC) - initiate a detailed status;
 (I-TPC) - initiate a termination procedure;
 (I-EVC) - initiate an event notification.

Service Codes for Moving Pointers

This class of codes comprises primarily the following:
 - move control word pointer (CWP) to next channel command entry (CCE);
 - move CWP to the CCE defined by command pointer (CMP);
 - move CWP and CMP to the next CCE;
 - move CWP to the preceding CCE.

A dialogue sequence is provided for each service code. The dialogue sequence for some of the service codes will be described hereinafter.

Standard Interface Dialogue Sequences

Many more different dialogue sequences occurs in the standard interface than in the integrated interface. This is primarily because the device intercommunicating across the standard interface both are, to a certain degree, "intelligent" devices and both are active rather than passive devices. Thus such devices do not participate passively during a dialogue sequence even though a responsive control function is assigned to the peripheral control unit.

As will be described hereinafter, a standard interface dialogue sequence is always characterized by a service code transferred from the peripheral control unit to the central processor, whether the dialogue sequence is initiated by a peripheral control unit or requested by the central processor (by means of signals CPW, INW or ISO). Following such transfer of the service code, other information is transferred in the direction and according to the mode specified by the service code.

Physically, standard interface dialogue sequence may be performed by two mechanisms:

1. A mechanism which provides interpretation, execution and control of the information transferred and, generally, performs complex operations. Such mechanism will be termed a "firmware mechanism" because it requires the execution of complex microprograms.

2. A mechanism which provides control of an information transfer operation in a repetitive manner, requiring the execution of only very simple and repetitive microprograms or, preferably, the utilization of simple circuits for generating a limited set of microcommands. Such mechanism will be termed a "hardware mechanism" or data transfer mechanism.

In dialogue sequences performed over a standard interface, it is possible, generally, upon the interpretation of the service code by means of the firmware mechanism, to preset the ensuing transfer operations for both the data and the commands or other service information, so that such operations can be performed by the hardware mechanism. Therefore, generally, it is possible to identify a firmware phase in the dialogue sequences, which phase always occurs, and a hardware, or data transfer, phase (DTP), which is unique for the data transfer operation. However, the latter phase does not always occur in a dialogue sequence.

Initiate a New Channel Program

Figure 11:
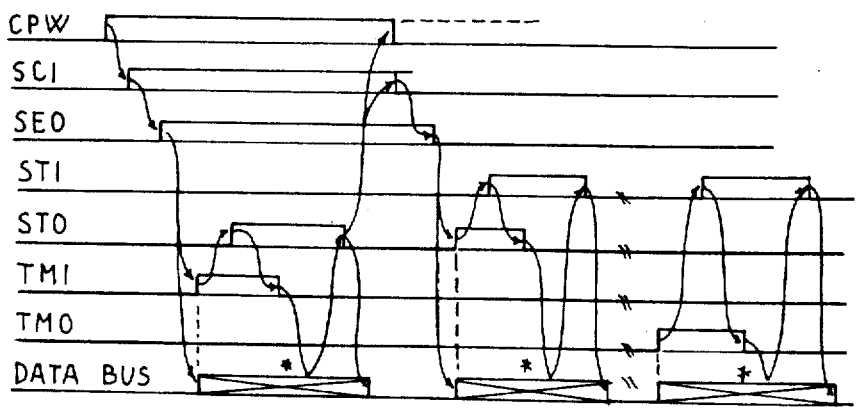

This dialogue sequence is initiated when the central processor determines, through the supervisory program, that a channel program must be initiated, and thereupon presets all pertinent parameters and transfers to the 1-state the signal CPW on the standard interface of the physical channel involved, FIG. 11. When the peripheral control unit detects this transition in the signal CPW, it responds by transferring signal SCI to the 1-state, which signal thereupon provides notification to interface module 16 that the peripheral control unit is ready to transmit a service code. Interface module 16 thereupon detects this transition in signal SCI and transfers the signal SEO to the 1-state, which signal provides notification to the peripheral control unit that the central processor is ready to receive a service code. When the peripheral control unit detects this transition in signal SEO, it applies signals representing the service code I-NPC to the Data Bus, and simultaneously transfers signal TMI to the 1-state, which signal provides notification that the character then being transferred is the last one in the series.

When interface module 16 detects this transition in signal TMI, it transfers the signal STO to the 1-state, which signal provides notification that module 16 is ready to receive the information on the Data Bus. The peripheral control unit thereupon detects this transition in signal STO and transfers signal TMI to the 0-state. When interface module 16 detects this next transition of the signal TMI, it transfers the service code signals from the Data Bus to an appropriate register and transfers signal STO to the 0-state. At this time interface module 16 generates an interrupt signal of appropriate priority level. When the central processor honors such interrupt request, it transfers signal CPW to the 0-state, unless another channel program, queued and detected by the supervisory program, is waiting to be initiated on the same physical channel.

When the peripheral control unit detects this next transition of the signal STO, to the 0-state, it transfers signal SCI to the 0-state which, in turn, causes interface module 16 to transfer signal SEO to the 0-state. The service code transfer phase thereby terminates.

The reception of the service code I-NPC by interface module 16 causes the module to transmit an interrupt request to the central processor. When such request is honored, the central processor analyzes the received service code. Bit 6 of the I-NPC service code denotes that a write information transfer operation is to be initiated, and bit 7 represents a priority level to be accorded the operation. Accordingly, the central processor performs certain control operations, including initiating a write transfer operation to transfer the waiting channel program to the peripheral control unit. To this end, on a command from the central processor, interface module 16 transfers signal STO to the 1-state, which provides notification that the control processor is ready to transfer a character, and simultaneously applies signals representing such character to the Data Bus. When the peripheral control unit detects this latest transition in signal STO, it transfers the signal STI to the 1-state as a response to the signal STO. Interface module 16 thereupon detects this transition in signal STI and transfers the signal STO to the 0-state. When the peripheral control unit detects this next transition of signal STO, to the 0-state, it transfers the character on the Data Bus to an appropriate register and transfers the signal STI to the 0-state. After interface module 16 detects this next transition of signal STI, to the 0-state, it applies signals representing another character to the Data Bus, and simultaneously transfers signal STO to the 1-state. The process of transferring characters from interface module 16 to the peripheral control unit thereupon continues repetitively in the manner described.

This transfer of characters from interface module 16 to the peripheral control unit results in the following channel program information being transferred in sequence to the peripheral control unit:

The logical channel number of the channel to be employed in the channel program. The first character of the first channel command entry (CCE) of the channel program. The second character of the first CCE, etc.

Thus, the transfer of the service code I-NPC from the peripheral control unit to the interface module causes the central processor to transfer a logical channel number and the first CCE of the channel program to the peripheral control unit.

If the peripheral control unit only requires a portion of the first CCE, it terminates the write information transfer operation when the required number of bytes have been transferred by transferring the signal TMI to the 1-state in response to the signal STO being transferred to the 1-state. However, if the interface module is transferring to the peripheral control unit the last character of the first CCE, the interface module simultaneously transfers signal TMO to the 1-state, instead of the signal STO, to terminate to transfer operation.

The CPW signal must be in the 1-state for the service code I-NPC to be valid on its transfer to the central processor. The service code transfer phase will be aborted if the signal CPW is in the 0-state, by providing an IOC instruction and transferring the signal ISO to the 1-state.

Initiate a Data Transfer

Figure 12:
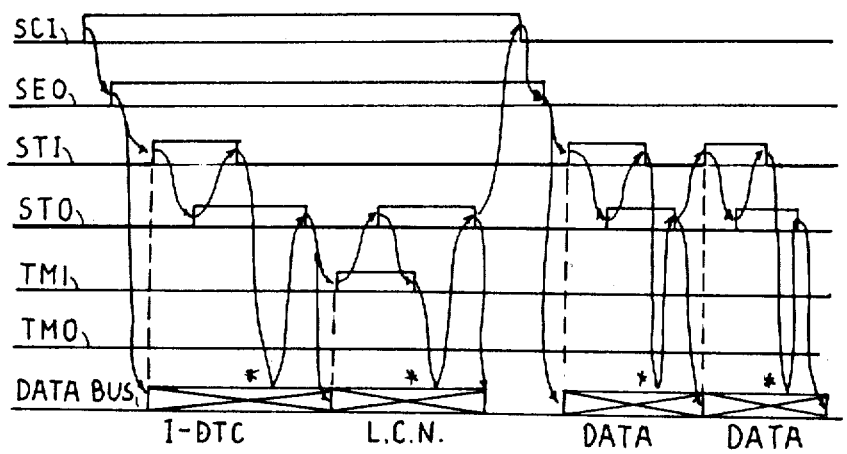

This dialogue sequence, FIG. 12, occurs when the peripheral control unit transmits an I-DTC service code directing the initiation of a data transfer operation through the interface pursuant to a previously executed channel program. A logical channel number (LCN) may be provided with the service code to specify the number of the logical channel to be employed in the data transfer operation. If the peripheral control unit has been performing an operation involving the same logical channel, a logical channel number is not required and the peripheral control unit terminates the firmware phase by transferring signal TMI to the 1-state instead of signal STI. However, if the logical channel number is required, the signal TMI is not transferred to the 1-state until the LCN is supplied.

The central processor then analyzes the received information. If errors or inconsistencies are detected the central processor transfers signal ISO to the 1-state and then supplies an IOC instruction. However, if the analysis reveals correct information, the central processor is preset for the specified data transfer operation by loading into appropriate registers thereof the control information required for the operation (address and character length of the data series) and the transfer operation may be initiated. The particular type of data transfer operation illustrated in FIG. 12 is a read data transfer operation.

The aforementioned description of FIG. 11 may be utilized for an understanding of the operation of the instant dialogue sequence. (It is to be noted that the arrows illustrated not only link the various signals shown in their temporal relationship, but also in their cause and effect relationship.)

In the dialogue sequence illustrated in FIG. 12, the firmware phase is completed when the signal SEO is transferred to the 0-state. At this point the data transfer phase is initiated which, being a read operation in the illustration, is initiated by the peripheral control unit.

Initiate an IOC Instruction

Figure 13:
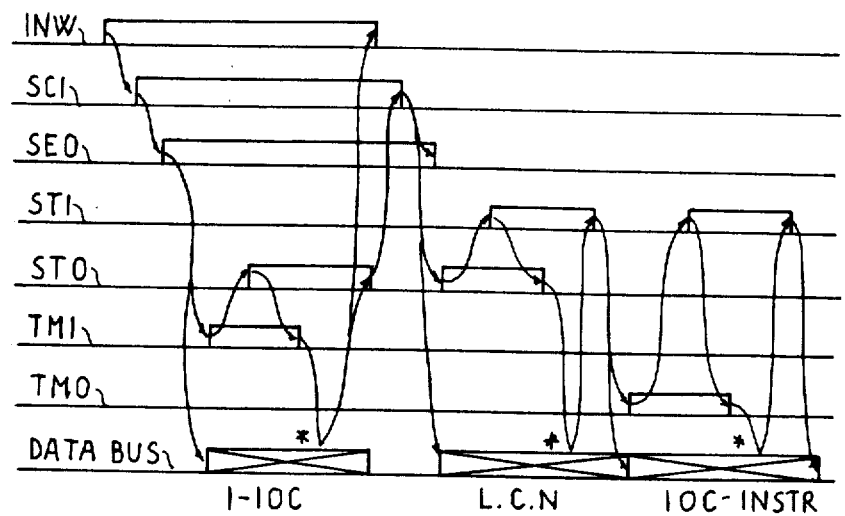

This dialogue sequence, FIG. 13, occurs when the peripheral control unit transmits an I-IOC service code in response to the generation of the signal ISO and INW, which together denote that the central processor has detected an error in information received from the peripheral control unit and is ready to transmit an IOC instruction. The I-IOC service code provides notification to the central processor that the peripheral control unit is ready to accept the IOC instruction.

In this dialogue sequence, a firmware phase, used to transmit the I-IOC service code and terminated by signal SEO, is followed by a data transfer phase, used to transfer the IOC instruction and preceded, if required, by the logical channel number to which the IOC instruction refers.

Initiate a Detailed Status

Figure 14:
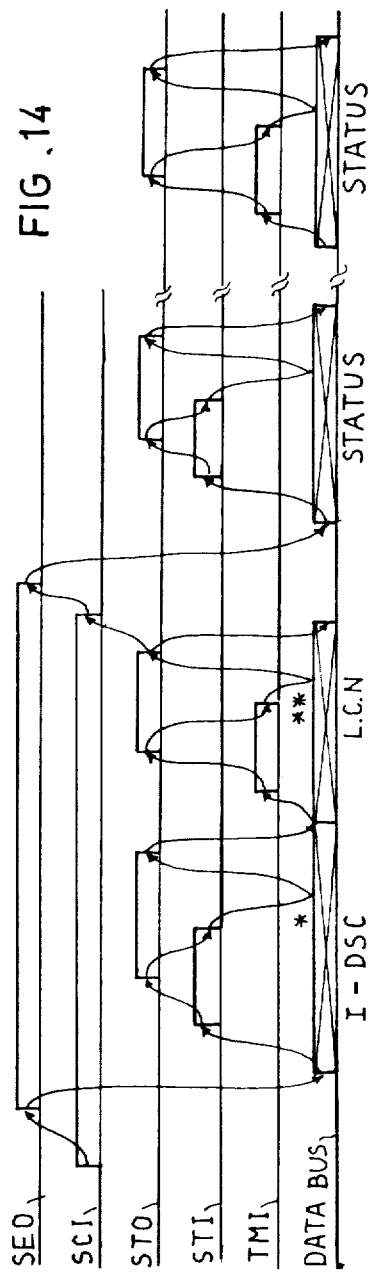

This dialogue sequence, FIG. 14, occurs when the peripheral control unit transmits an I-DSC service code, following the execution of a channel program but prior to termination thereof, in order to transfer detailed peripheral subsystem status information to the main memory. The dialogue sequence is similar to that described above, the service code being transferred during a firmware phase and accompanied, if required, by the logical channel number of the peripheral subsystem involved.

The firmware phase is followed by a data transfer phase during which information pertaining to the peripheral subsystem status is transferred from the peripheral control unit to the central processor.

Initiate a Termination Procedure

Figure 15:
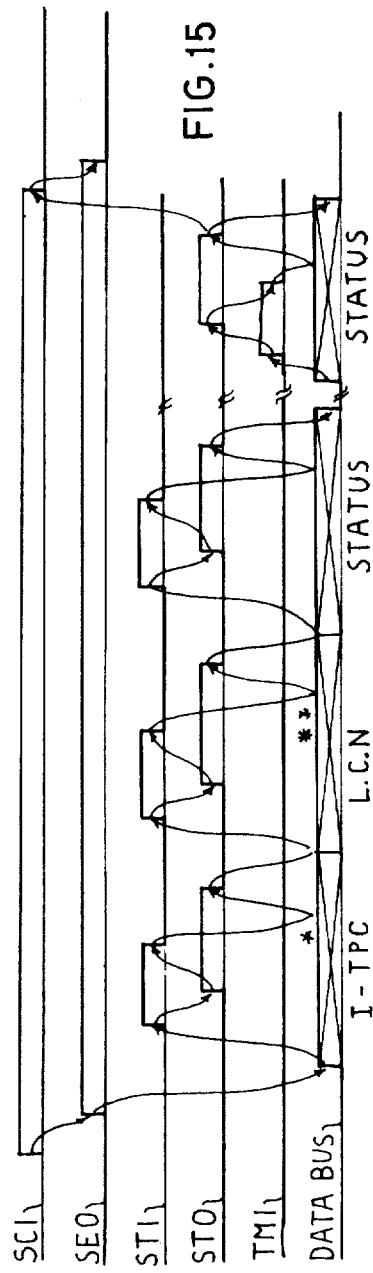

This dialogue sequence, FIG. 15, occurs when the peripheral control unit transmits an I-TPC service code to terminate a channel program. Such service code may or may not be accompanied by a logical channel number and status characters. This dialogue sequence is entirely performed within a firmware phase.

Initiate an Event Notification

This dialogue sequence, FIG. 16, occurs when the perpiheral control unit transmits an I-EVC service code to provide notification to the program whenever certain asynchronous events occur. Such service code is always followed by a predetermined number of status characters. This dialogue sequence is entirely performed within the firmware phase and is substantially identical to the Initiate a Termination Procedure dialogue sequence.

Service Codes for Moving Pointers

This dialogue sequence, FIG. 17, occurs when the peripheral control unit transmits a service code requiring the moving of one or more channel program pointers. The service code transmitted is designated as the MVSC service code.

The service code provides a branch in the channel program to one of several different locations, according to the particular conditions in the peripheral unit, when employed in connection with a branch argument (BA). A branch argument is a byte that specifies a relative branch in a channel program, such argument being generated by a peripheral control unit as the result of a conditional branch channel command entry (CCE). The branch argument specifies a channel program branch relative to the absolute address of such CCE of from 0 to 225 CCEs. If the newly addressed CCE represents an absolute branch, it is possible through the branch argument in combination with this new CCE, to branch to any location in the channel program.

These service codes make possible retrieving from the ordered CCEs which form a channel program the same CCE more that once and re-executing the same data transfer.

The dialogue sequence for these service codes may comprise the transfer of simply a service code, the transfer of a service code and a logical channel number, or the transfer of a service code, a logical number and a branch argument. The service code may require, in addition to the pointer movement, the transfer of the newly addressed CCE to the peripheral control unit so that the peripheral control unit may employ such CCE in the channel program in execution. In the particular example illustrated in FIG. 17, the service code requests such a CCE transfer, so that the firmware phase is followed by a data transfer phase to provide the CCE transfer.

Circuits for Standard Interface

A preferred form of standard interface module 16 is illustrated in the logical block diagrams of FIGS. 18–21. In these FIGS. the same conventions are employed as in FIGS. 7–9 for the integrated interface.

Again, the standard interface circuits receive microcommands from central processor 1, as well as signals under control of the internal timer of the central processor. Such standard interface circuits transmit to the central processor information signals which, with few exceptions, are also under timing control of the internal timer of the central processor.

In FIGS. 18–21, for clarity, the interface circuits are illustrated in separated groups; however, the circuits of such groups are actually interconnected. Such interconnection is established by lines which transmit a particular identified signal for one circuit group, as an output signal therefrom, to another circuit group, as an input signal thereto.

When not otherwise specified, the same identifier is used for a circuit element as for the output signal delivered by such element.

Figure 18:
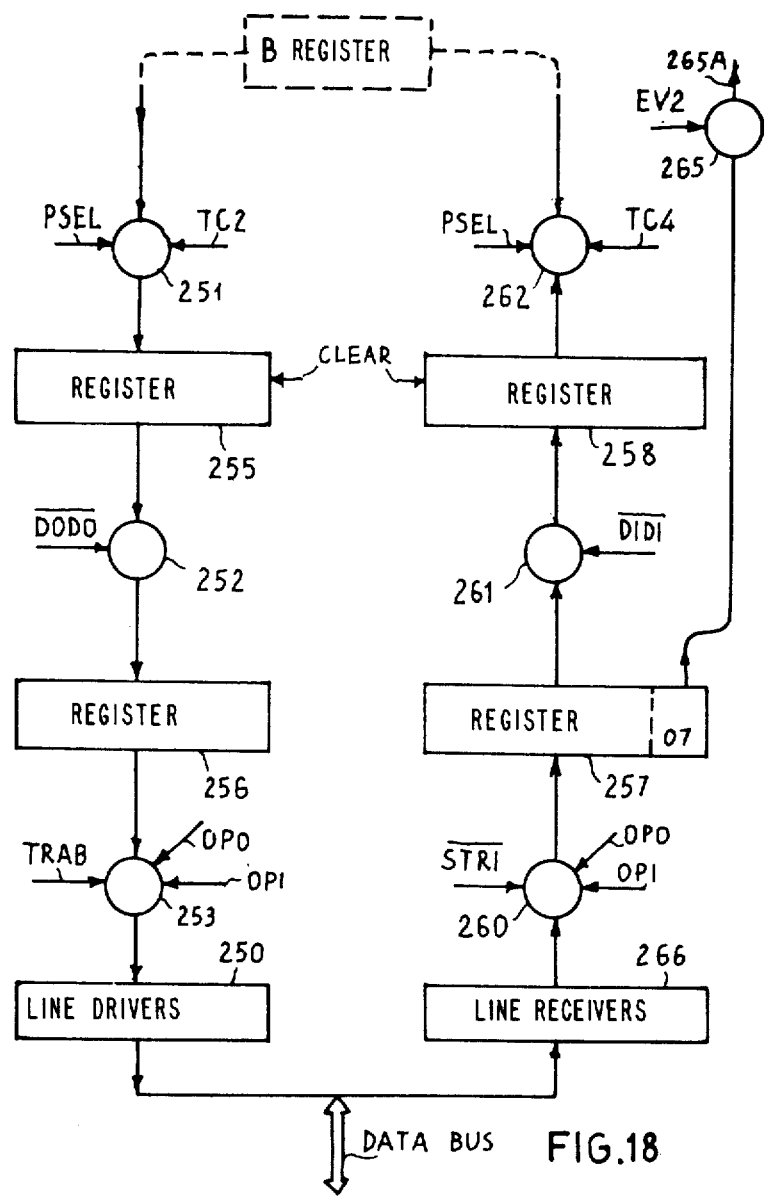
FIGS. 18-21 are logical block diagrams of a preferred form of standard interface module.

The output portion of standard interface module 16, FIG. 18, comprises output registers 255 and 256, each adapted to hold nine bits; AND-gate sets 251, 252 and 253; and nine output line drivers, collectively designated by the reference numeral 250, which apply information signals to the Data Bus.

The input portion of standard interface module 16 comprises input registers 257 and 258, each adapted to hold nine bits; AND-gate sets 260, 261 and 262; and nine input line receivers, collectively designated by the reference numeral 266, which receive information signals from the Data Bus. This input portion also comprises an AND-gate 265, one input lead of which is coupled to receive a signal EV2. The other input lead of AND-gate 265 is coupled to receive a signal representing bit 07 of register 257. Accordingly, AND-gate 265 is enabled by signal EV2 to pass bit 07 of register 257 to the central processor over a lead 265A, which is coupled to the output lead of AND-gate 265.

Figure 19:
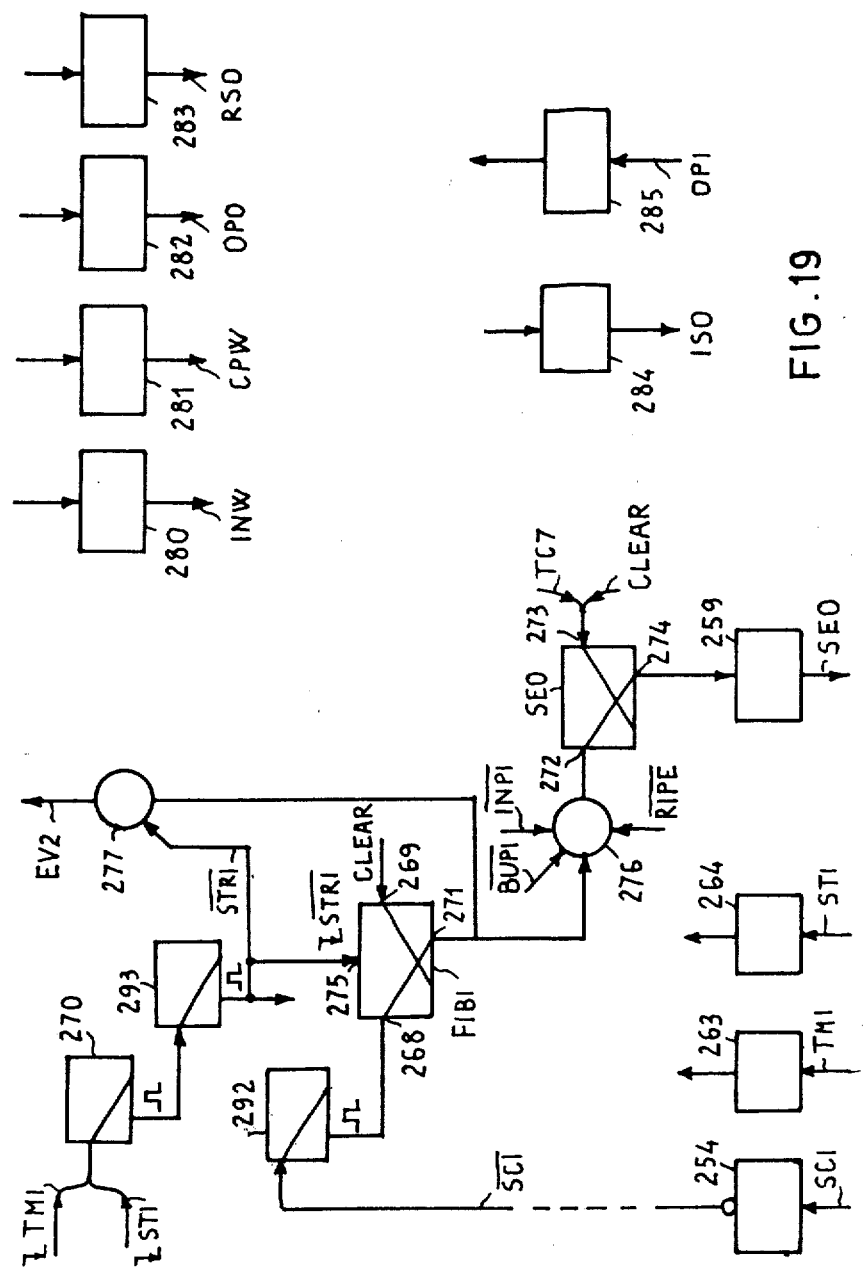

The primary logic circuits of standard interface module 16 for controlling the flow of information signals over the Data Bus are shown in FIG. 19. A flip-flop FIBI is provided with a 1-input lead 268, a 0-input lead 269 and a 1-output lead 271. The signal FIBI delivered on lead 271 is employed to control a flip-flop SEO. Flip-flop SEO is provided with a 1-input lead 272, a 0-input lead 273, and a 1-output lead 274. Lead 274 is coupled to the input lead of an output line driver 259. Therefore, line driver 259 passes the signal SEO provided by flip-flop SEO to the peripheral control as the Service Enable Out signal.

Flip-flop FIBI is transferred to the 1-state upon the occurrence of the trailing edge of a signal $\overline{SCI}$. A line receiver and inverter 254 is coupled to receive the signal SCI and to apply the logical inverse signal $\overline{SCI}$ to the trigger input lead of a one-shot 292. The trailing edge of signal $\overline{SCI}$ (corresponding to the leading edge of signal SCI) triggers one-shot 292 to deliver an output signal of predetermined duration, which signal is applied to the 1-input lead of flip-flop FIBI. The leading edge of the output signal delivered by one-shot 292 transfers flip-flop FIBI to the 1-state.

The 1-input lead of flip-flop SEO is coupled to the output lead of an AND-gate 276. Accordingly, flip-flop SEO is transferred to the 1-state by signal FIBI, applied to one input lead of AND-gate 276, when the signals $\overline{BUPI}$, $\overline{INPI}$ and $\overline{RIPE}$, applied to respective other input leads of AND-gate 276, are present to enable such gate. The signal RIPE is supplied by the central processor to provide notification that the central processor is already performing a service operation on that channel so that it cannot honor a new service request until the current operation has been completed. Accordingly, signal $\overline{RIPE}$ enables the receipt of a new service request. The signals $\overline{BUPI}$ and $\overline{INPI}$ are generated by the standard interface module and will be described hereinafter.

One input lead of an AND-gate 277 is coupled to receive the signal FIBI. Thus, the signal FIBI enables AND-gate 277 to generate a service interrupt request signal, which is designated as the signal EV2, because such signal in the standard interface is equivalent to the signal EV2 of the integrated interface.

Flip-flop FIBI is transferred to the 0-state by the initializing signal CLEAR, applied directly to 0-input lead 269, or by the trailing edge of the pulse $\overline{STRI}$, applied directly to the clock input lead 275, of flip-flop FIBI.

Flip-flop SEO is transferred to the 0-state by the signal CLEAR or by a reset microcommand TC7, both applied directly to the 0-input lead 273.

The pulse $\overline{STRI}$ is generated by two cascaded one-shots 270 and 293. The trigger input lead of one-shot 270 is coupled to receive both the TMI and STI signals delivered by line receivers 263 and 264. Line receivers 263 and 264 are coupled to receive respective signals TMI and STI from the standard interface and to deliver these signals for employment with interface module 16. The trailing edge of either a TMI or STI signal triggers one-shot 270 to deliver a positive pulse signal of relatively short duration. The trigger input lead of one-shot 293 is connected to the output lead of one-shot 270. Accordingly, the trailing edge of the pulse delivered by one-shot 270 triggers one-shot 293 to deliver a position pulse of relatively short duration, which pulse signal is designated as signal $\overline{STRI}$. The pulse $\overline{STRI}$ is coupled to transfer the FIBI flip-flop to the 0-state, as described above, and is passed by AND-gate 277 if such gate is enabled by the 1-state of flip-flop FIBI.

Certain circuits in interface module 16 are provided simply to transfer signals through the module. Such circuits comprise line drivers 280-284 which are coupled to receive the respective signals INW, CPW, OPO, RSO and ISO from central processor 1 and to transfer such signals over the standard interface. A line receiver 285 is coupled to receive the signal OPI from the standard interface and to transfer such signal to the central processor.

Figure 20:
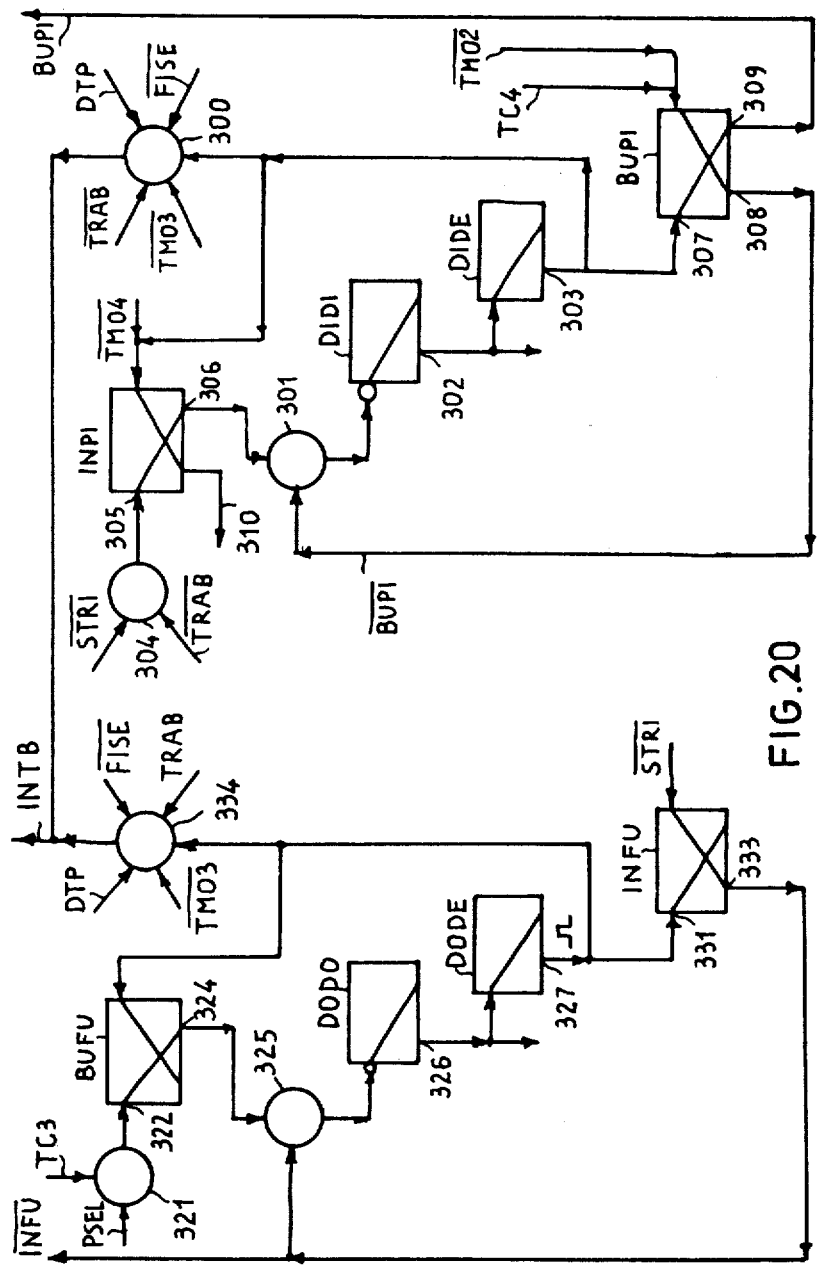

Certain circuit shown in FIG. 20 control the transfer of information signals from register 255 to register 256, FIG. 18, and also provide an indication of the status of such registers. These circuits comprise the flip-flops BUFU and INFU and one-shots DODO and DODE.

The 1-input lead 322 of flip-flop BUFU is connected to the output lead of an AND-gate 321. Accordingly, flip-flop BUFU is transferred to the 1-state by microcommand TC3, applied to one input lead of AND-gate 321, when the channel selection signal PSEL, applied to the other input lead of AND-gate 321, is present to enable such gate. The 1-output lead 324 of flip-flop BUFU is connected to one input lead of an AND-gate 325. The output lead of AND-gate 325 is connected, through an inverter, to the trigger input lead of one-shot DODO. The other input lead of AND-gate 325 is coupled to the 0-output lead 333 of flip-flop INFU to receive the signal $\overline{INFU}$. Accordingly, when flip-flop BUFU is transferred to the 1-state, if AND-gate 325 is then enabled by the signal $\overline{INFU}$, one-shot DODO is triggered to deliver a positive pulse signal of relatively short duration, which pulse signal is designated as the signl $\overline{DODO}$.

The output lead 326 of one-shot DODO is connected to the trigger input lead of one-shot DODE. Accordingly, the trailing edge of the pulse delivered by one-shot DODO triggers one-shot DODE to deliver a positive pulse signal of relatively short duration, which pulse signal is designated as the signal $\overline{DODE}$.

The 1-input lead 331 of flip-flop INFU is coupled to the output lead 327 of one-shot DODE. Accordingly, the pulse $\overline{DODE}$ delivered on lead 327 transfers flip-flop INFU to the 1-state. Flip-flop INFU is transferred to the 0-state by the signal $\overline{STRI}$ applied directly to the 0-input lead of flip-flop INFU.

The 0-input lead of flip-flop BUFU is coupled to output lead 327 of one-shot DODE, whereby the pulse $\overline{DODE}$ transfers flip-flop BUFU to the 0-state.

One input lead of an AND-gate 334 is also coupled to output lead 327 of one-shot DODE. Accordingly, AND-gate 334 passes the pulse $\overline{DODE}$ when the signals DTP, TRAB, $\overline{FISE}$ and $\overline{TMO3}$, applied to respective other input leads of AND-gate 334, are present to enable such gate. The output signal delivered by AND-gate 334, designated as the INTB signal, is transmitted to the central processor, where it is interpreted as a character transfer interrupt request. The signals DTP and TRAB are supplied by the central processor, signal DTP providing notification that a data transfer operation is taking place, and signal TRAB providing notification that the data transfer operation taking place is a write operation, with data being transferred from the central processor to the peripheral control unit. The signals $\overline{TMO3}$ and $\overline{FISE}$ are generated by circuits of the standard interface module and will be described hereinafter.

Output lead 326 of one-shot DODO is also coupled to one input lead of AND-gate set 252, FIG. 18, for enabling such gate set to transfer information therethrough.

The signal $\overline{INFU}$ delivered by flip-flop INFU, is transferred through the universal interface to the central processor, where it provides a condition signal to be examined when required.

The state of flip-flops BUFU and INFU are respectively related to the status of registers 255 and 256 of FIG. 18. Microcommands TC2 and TC3, supplied simultaneously, provide simultaneously for loading information into register 255 and transferring flip-flop BUFU to the 1-state, provided the signal PSEL is present to enable AND-gate set 251 and AND-gate 321. The consequent signal BUFU triggers in succession one-shots DODO and DODE which, in turn, transfer flip-flop INFU to the 1-state. The resulting pulse $\overline{DODO}$ enables AND-gate set 252 to transfer the contents of register 255 into register 256. The immediately following pulse $\overline{DODE}$ transfers flip-flop BUFU back to the 0-state. Thus, only when register 255 holds information not yet transferred out is flip-flop BUFU in the 1-state. Therefore, the 1-state of flip-flop BUFU denotes that register 255 is loaded. Similarly, the 1-state of flip-flop INFU denotes that register 256 is loaded. Thus, when flip-flop INFU is subsequently transferred to the 0-state by signal $\overline{STRI}$, the information held in register 256 has been received by the peripheral control unit from the Data Bus.

And-gate set 253 transmits the contents of register 256 through output drivers 250 to the Data Bus when enabled by the presence of signals TRAB, OPO and OPI, applied to respective input leads of AND-gate set 253.

During a data transfer operation (signal DTP present) for a write operation (signal TRAB present), and immediately following transfer of the contents of register 255 to register 256, denoted by the transfer of the flip-flop INFU to the 1-state, interrupt request INTB is delivered to the central processor by AND-gate 334 providing a request to the central processor to load register 255 with new information. In this manner the interface dialogue sequence and the loading of register 255 are overlapped, so that the data transfer rate is increased. However, such technique is employed only in data transfer operations, and instead, when service information is being transferred, the two operations are performed in sequence.

Thus, when service information is to be transferred an appropriate microprogram examines the conditions represented by the signal $\overline{INFU}$, and when such signal is present it represents that the contents of registers 255 and 256 have been transmitted to the Data Bus and such registers may be reloaded. The microcommands TC2 and TC3 are thereupon generated and the information to be forwarded to the peripheral control unit is loaded into register 255 through AND-gate set 251 and then transferred to register 256 by the transfer of flip-flop BUFU to the 1-state, which also causes the flip-flop INFU to be transferred to the 1-state. Once the information applied to the Data Bus has been received by the peripheral control unit, the signal $\overline{STRI}$ is generated to transfer flip-flop INFU to the 0-state and and signal INFU to the 1-state, thereby notifying the central processor that another information character may be transmitted.

The signals $\overline{FISE}$ and $\overline{TMO3}$, applied to input leads of AND-gate 334, FIG. 20, are normally in the 1-state, being in the 0-state only in the instance of a transfer operation termination request made by the peripheral control unit or central processor.

Other circuits shown in FIG. 20 control the transfer of information signals from register 257 to register 258, FIG. 18, and also provide an indication of the status of such registers. These circuits comprise the flip-flops INPI and BUPI and the one-shots DIDI and DIDE.

The 1-input lead 305 of flip-flop INPI is connected to the output lead of an AND-gate 304. Accordingly, flip-flop INPI is transferred to the 1-state by a pulse $\overline{STRI}$, applied to one input lead of AND-gate 304, when the signal $\overline{TRAB}$, applied to the other input lead of AND-gate 304, is present to enable such gate. Signal TRAB denotes that the operation taking place is a write information transfer operation. The 1-output lead 306 of flip-flop INPI is connected to one input lead of an AND-gate 301. The output lead of AND-gate 301 is connected, through an inverter, to the trigger input lead of one-shot DIDI. The other input lead of AND-gate 301 is coupled to the 0-output lead 308 of flip-flop BUPI to receive the signal $\overline{BUPI}$. Accordingly, when flip flop INPI is transferred to the 1-state, if AND-gate 301 is then enabled by the signal $\overline{BUPI}$, one-shot DIDI is triggered to deliver a positive pulse signal of relatively short duration, which pulse signal is designated as the signal $\overline{DIDI}$.

The output lead 302 of one-shot DIDI is connected to the trigger input lead of one-shot DIDE. Accordingly, the trailing edge of the pulse delivered by one-shot DIDI triggers one-shot DIDE to deliver a positive pulse signal of relatively short duration, which pulse signal is designated as the signal $\overline{DIDE}$.

The 1-input lead 307 of flip-flop BUPI is coupled to the output lead 303 of one-shot DIDE. Accordingly, the pulse $\overline{DIDE}$ delivered on lead 303 transfers flip-flop BUPI to the 1-state. The 1-output lead 309 is coupled to transmit the signal BUPI to the central processor. Flip-flop BUPI is transferred to the 0-state by the signal $\overline{TMO2}$ and the microcommand TC4, both applied directly to the 0-input lead of flip-flop BUPI. Microcommand TC4 also controls the transfer of the contents of register 258, FIG. 18, to the central processor.

The 0-input lead of flip-flop INPI is coupled to output lead 303 of one-shot DIDE, whereby the pulse $\overline{DIDE}$ transfers flip-flop INPI to the 0-state. Flip-flop INPI is also transferred to the 0-state by the signal $\overline{TMO4}$, applied directly to the 0-input lead of such flip-flop.

One input lead of an AND-gate 300 is also coupled to output lead 303 of one-shot DIDE. Accordingly, AND-gate 300 passes the pulse $\overline{DIDE}$ when the signals DTP, $\overline{FISE}$, $\overline{TRAB}$ and $\overline{TMO3}$, applied to respective other input leads of AND-gate 300, are present to enable such gate. The output signal delivered by AND-gate 300, designated as the INTB signal, is transmitted to the central processor, where it is interpreted as a character transfer interrupt request. Output lead 302 of one-shot DIDI is also coupled to one input lead of AND-gate set 261, FIG. 18, for enabling such gate set to transfer information therethrough.

The state of flip-flops INPI and BUPI are respectively related to the status of registers 257 and 258 of FIG. 18. Pulse $\overline{STRI}$ provides simultaneously for loading information into register 257, provided the signals OPI and OPO are present to enable AND-gate set 260, and for transferring flip-flop INPI to the 1-state, privided signal TRAB is present to enable AND-gate 304. The consequent signal INPI triggers in succession one-shots DIDI and DIDE which, in turn, transfer flip-flop BUPI to the 1-state. The resulting pulse $\overline{DIDI}$ enables AND-gate set 261 to transfer the contents of register 257 into register 258. The immediately following pulse $\overline{DIDE}$ transfers flip-flop INPI back to the 0-state. Thus, only when register 257 holds information not yet transferred out is flip-flop INPI in the 1-state. Similarly, the 1-state of flip-flop BUPI denotes that register 258 is loaded. Thus, when flip-flop BUPI is subsequently transferred to the 0-state by microcommand TC4, the information held in register 258 has been received by the central processor.

During a read data transfer operation (signals DTP and $\overline{\text{TRAB}}$ present), and immediately following transfer of the contents of register 257 to register 258, denoted by the transfer of the flip-flop BUPI to the 1-state, an interrupt request signal INTB is delivered to the central processor by AND-gate 300, providing a request to the central processor to unload register 258. At this same time, as soon as the contents of register 257 have been transferred to register 258, the dialogue sequence is resumed to enable loading of new information into register 257, as will be described hereinafter. In this manner the interface dialogue sequence and the unloading of register 258 are overlapped, so that the data transfer rate is increased. However, such technique is employed only in data transfer operations and, instead, when service information is being transferred, the two operations are performed in sequencce.

Thus, when service information is to be transferred an appropriate microprogram examines the condition represented by the signal BUPI, and when such signal is present, it represents that register 258 is loaded and its contents are ready to be transferred to the central processor. Then when microcommand TC4 transfers flip-flop BUPI to the 0-state, the information held in register 258 is simultaneously transferred through AND-gate set 262 to the central processor. Only after such transfer is the dialogue sequence which provided for the information transfer through the interface terminated, and a new dialogue sequence for the transfer of service information permitted to be initiated.

Figure 21:
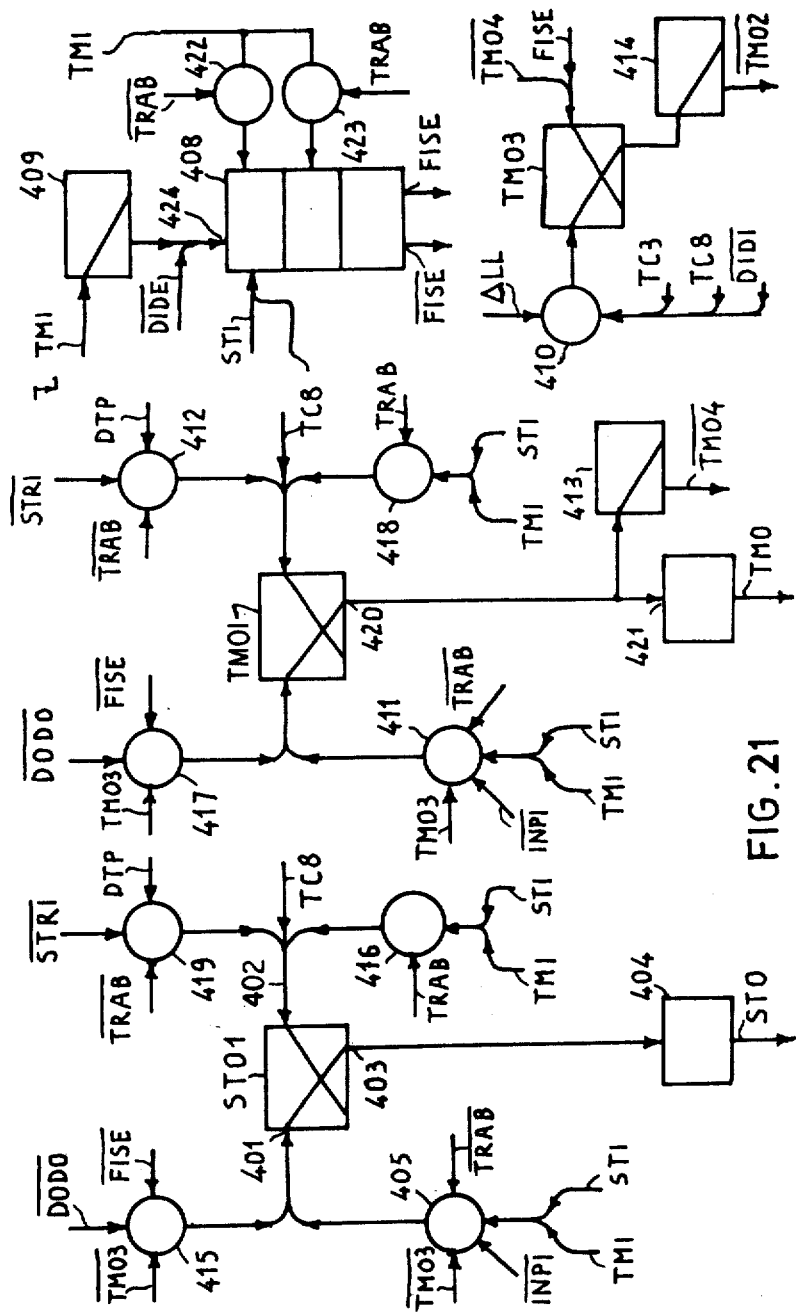

The signal STO is generated by circuits which comprise, FIG. 21, a flip-flop STO1. The 1-input lead 401 of flip-flop STO1 is coupled to the output leads of AND-gates 405 and 415. The 0-input lead 402 of flip-flop STO1 is coupled to the output leads of AND-gates 416 and 419. The input lead of a line driver 404 is coupled to the 1-output lead 403 of flip-flop STO1.

Flip-flop STO1 is transferred to the 1-state during a write information transfer operation by the pulse $\overline{\text{DODO}}$, applied to one input lead of AND-gate 415, when the signals $\overline{\text{TMO3}}$ and $\overline{\text{FISE}}$, applied to respective other input leads of AND-gate 415, are present to enable such gate. Signal $\overline{\text{TMO3}}$ denotes that the information character to be transferred is not the last in the series, as will be described hereinafter. Signal $\overline{\text{FISE}}$ denotes that no signal TMI has been received by the interface, so that the peripheral control unit will not terminate the present dialogue sequence.

One input lead of AND-gate 405 is coupled to receive the signals TMI and STI. Accordingly, flip-flop STO1 is also transferred to the 1-state during a read information transfer operation by either signal TMI or STI, when the signals $\overline{\text{TMO3}}$, $\overline{\text{INPI}}$ and $\overline{\text{TRAB}}$, applied to respective other input leads of AND-gate 405, are present to enable such gate. Signal $\overline{\text{INPI}}$ denotes that any information present in register 257, FIG. 18, has been transferred therefrom. Signal $\overline{\text{TRAB}}$ denotes that the information transfer operation taking place is a read operation.

One input lead of AND-gate 416 is coupled to receive the signals TMI and STI. Accordingly, flip-flop STO1 is transferred to the 0-state during a write information transfer operation by either signal STI or signal TMI, when the signal TRAB, applied to the other input lead of AND-gate 416, is present to enable such gate. Flip-flop STO1 is also transferred to the 0-state during a read information transfer operation by the signal STRI, applied to one input lead of AND-gate 419, when the signals $\overline{\text{TRAB}}$ and DTP, applied to respective other input leads of AND-gate 419, are present to enable such gate, this transfer of the state of flip-flop STO1 occurring during a hardware phase. Flip-flop STO1 is also transferred to the 0-state by a microcommand TC8, applied directly to the 0-input lead of flip-flop STO1, which occurs during a read information transfer operation during the firmware phase.

Line driver 404 delivers signal STO over an interface control line when flip-flop STO1 is in the 1-state.

The signal TMO is generated by circuits which comprise a flip-flop TMO1. The 1-input lead of flip-flop TMO1 is coupled to the output leads of AND-gates 411 and 417. The 0-input lead of flip-flop TMO1 is coupled to the output leads of AND-gates 412 and 418. The input lead of line driver 421 is coupled to the 1-output lead 420 of flip-flop TMO1.

Flip-flop TMO1 is transferred to the 1-state during a write information transfer operation by the pulse $\overline{\text{DODO}}$, applied to one input lead of AND-gate 417, when the signals TMO3 and FISE, applied to respective other input leads of AND-gate 417, are present to enable such gate. Signal TMO3 denotes that the information character to be transferred is the last in the series, as will be described hereinafter.

One input lead of AND-gate 411 is coupled to receive the signals TMI and STI. Accordingly, flip-flop TMO1 is transferred to the 1-state during a read information transfer operation by either signal TMI or STI, when the signals TMO3, $\overline{\text{TRAB}}$ and $\overline{\text{INPI}}$, applied to respective other input leads of AND-gate 411, are present to enable such gate.

One input lead of AND-gate 418 is coupled to receive signals TMI and STI. Accordingly, flip-flop TMO1 is transferred to the 0-state during a write information transfer operation by either signal TMI or STI, when the signal TRAB, applied to the other input lead of AND-gate 418, is present to enable such gate. Flip-flop TMO1 is transferred to the 0-state during a read information transfer operation by a pulse STRI, applied to one input lead of AND-gate 412, when the signals TRAB and DTP, applied to respective other input leads of AND-gate 412, are present to enable such gate. Flip-flop TMO1 is also transferred to the 0-state by the microcommand TC8, applied directly to the 0-input lead of flip-flop TMO1.

Line driver 421 delivers signal TMO over an interface control line when flip-flop TMO1 is in the 1-state.

The trigger input lead of a one-shot 413 is also coupled to the 1-output lead of flip-flop TMO1. Accordingly, when flip-flop TMO1 transfers to the 0-state, one-shot 413 is triggered to deliver a pulse signal of relatively short duration, which pulse signal is designated as the signal $\overline{\text{TMO4}}$. Pulse $\overline{\text{TMO4}}$ is employed for transferring flip-flops INPI and TMO3 to the 0-state.

The remaining circuits shown in FIG. 21 function primarily during the termination of a dialogue sequence. When the central processor determines that an information transfer operation should be terminated, it generates a signal ΔLL, which has the same significance and purpose as in the integrated interface. The manner of generation of a signal ΔLL has been described previously herein connection with the description of the integrated interface.

The signal ΔLL is coupled to one input lead of an AND-gate 410. The 1-input lead of a flip-flop TMO3 is connected to the output lead of AND-gate 410. Accordingly, AND-gate 410, enabled by signal ΔLL, passes the next-occurring one of microcommands TC3 or TC8, or signal $\overline{\text{DIDI}}$, to transfer flip-flop TMO3 to the 1-state. Flip-flop TMO3 is transferred to the 0-state by the signal FISE or the pulse $\overline{\text{TMO4}}$, both applied directly to the 0-input lead of flip-flop TMO3. The signals TMO3 and $\overline{\text{TMO3}}$ delivered by flip-flop TMO3 are employed primarily for enabling transfer of flip-flops STO1 and TMO1 to the 1-state.

The trigger input lead of a one-shot 414 is coupled to the 1-output lead of flip-flop TMO3. Accordingly, when flip-flop TMO3 transfers to the 0-state, one-shot 414 is triggered to generate a pulse signal of relatively short duration, which pulse signal is designated as the signal $\overline{\text{TMO2}}$. Pulse $\overline{\text{TMO2}}$ is employed for transferring flip-flop BUPI to the 0-state.

When a peripheral control unit determines that an information transfer operation should be terminated, it transmits the signal TMI in lieu of the signal STI. A shift register 408 is provided for notifying the central processor, at the appropriate time, of this action by the peripheral control unit. Shift register 408 is provided with three binary cells. The input lead of the first cell of register 408 is connected to the output lead of an AND-gate 422 and the input lead of the second cell of register 408 is coupled to the output lead of an AND-gate 423. During a read information transfer operation, denoted by the presence of signal $\overline{\text{TRAB}}$ which enables AND-gate 422, the first cell of register 408 is transferred to the 1-state by signal TMI. During a write data transfer operation, denoted by the presence of signal TRAB which enables AND-gate 423, the second cell of register 408 is transferred to the 1-state by the TMI signal.

The trigger input lead of a one-shot 494 is coupled to receive the signal TMI. Accordingly, the transition of signal TMI to the 0-state triggers one-shot 409 to generate a positive pulse signal of relatively short duration. The pulse generated by one-shot 409 is applied to the clock, or shift, input lead 424 of shift register 408 and causes a one-cell shift of the contents of such register. Input lead 424 of register 408 is also coupled to receive the pulse $\overline{\text{DIDE}}$, which pulse also causes a one-cell shift of the contents of the register.

Signal FISE represents the contents of the last cell of shift register 408. Upon the completion of a write or read information transfer operation, the last cell of register 408 is in the 1-state, instead of the 0-state which it is in at the beginning of and during the operation. Accordingly, the change of output signal FISE to the 1-state provides notification to the central processor of the termination of an information transfer operation. Signal FISE also is coupled to transfer flip-flop TMO3 to the 0-state. The complementary signal $\overline{\text{FISE}}$ enables a number of AND-gates in the standard interface module.

Shift register 408 is cleared, all cells thereof being transferred to the 0-state, by the signal STI or the microcommand TC8, both applied directly to the reset input lead of register 408.

Operation of Standard Interface Module

As has been described previously herein, a plurality of different dialogue sequences may be performed over the standard interface. However, generally, two operational phases may be distinguished in such dialogue sequences; namely, the firmware phase and the data transfer phase (DTP).

The operation of standard interface module 16 will now be described with reference to the logical block diagrams of the circuits of the module, FIGS. 18-21, and the timing diagrams of the dialogue sequences of the standard interface, FIGS. 11-17. To describe such operation it is not necessary to refer to a particular type of dialogue sequence but, instead, it is preferable to describe the following operations:

Read Firmware Phase - a read information transfer operation.

Write Firmware Phase - a write information transfer operation.

Read Data Transfer Phase - a read data transfer operation.

Write Data Transfer Phase - a write data transfer operation.

The last three of the above-named phases must always be preceded by a Read Firmware Phase in order to transfer a service code from the peripheral control unit to the central processor.

The Read Firmware Phase may be initiated either by the central processor, by its supplying of a signal CPW ("channel program waiting") or a signal INW ("instruction waiting") or by the peripheral control unit.

READ FIRMWARE PHASE

The Read Firmware Phase is primarily employed for the transfer of service codes and related information, such as logical channel number, branch argument, status, etc. This phase is initiated when the peripheral control unit transfers the signal SCI to the 1-state to provide notification that it is ready to transmit a service code. Signal SCI is transmitted through line receiver 254 to trigger one-shot 292 which, in turn, transfers flip-flop FIBI to the 1-state, FIG. 19. If signals $\overline{\text{BUPI}}$, $\overline{\text{INPI}}$ and $\overline{\text{RIPE}}$ are present to enable AND-gate 276, the transition of signal FIBI transfers flip-flop SEI to the 1-state, which thereupon transfers signal SEO to the 1-state. Signal SEO provides notification that the central processor is ready to receive the service code.

When the peripheral control unit detects this transition of signal SEO, it applies the first character to be transferred to the Data Bus, which is the service code, and simultaneously transfers signal STI to the 1-state to provide notification that it has placed a byte on the Data Bus.

Because signals $\overline{\text{TRAB}}$, $\overline{\text{INPI}}$ and $\overline{\text{TMO3}}$ are present, AND-gate 405 is enabled to pass signal STI to the 1-input lead of flip-flop STO1, which thereby is transferred to the 1-state, FIG. 21. The signal STO delivered by line driver 404 is correspondingly transferred to the 1-state to provide notification that module 16 is ready to receive the byte on the Data Bus. When the peripheral control unit detects this transition of signal STO, it transfers signal STI to the 0-state. This next transition of signal STI, to the 0-state, triggers one-shot 270 which, in turn, triggers one-shot 293 and pulse $\overline{\text{STRI}}$ is generated, FIG. 19.

Pulse $\overline{\text{STRI}}$ provides the following functions: Enables AND-gate set 260 to transfer the service code on the Data Bus to register 257, FIG. 18.

Passes through enabled AND-gate 277 to provide an interrupt signal EV2, which is transferred to the central processor and a representation thereof is stored in a priority netwark, FIG. 19. Signal EV2, in turn, enables AND-gate 265 to pass bit 07 of the service code in register 257 to the priority network, where it is stored in a register to provide an election of a high or low priority to be attributed to the interrupt request, FIG. 18.

Passes through AND-gate 304 to transfer flip-flop INPI to the 1-state, FIG. 20. Because flip-flop BUPI is in the 0-state, AND-gate 301 is enabled to pass the resulting transition of signal INPI to trigger one-shot DIDI, which, in turn, triggers one-shot DIDE. The consequent pulse $\overline{\text{DIDE}}$ transfers flip-flop BUPI to the 1-state and flip-flop INPI to the 0-state. The pulse $\overline{\text{DIDI}}$ enables AND-gate set 261 to transfer the service code from register 257 to register 258, FIG. 18.

The trailing edge of pulse $\overline{\text{STRI}}$ transfers flip-flop FIBI to the 0-state thereby terminating signal EV2, FIG. 19.

The interrupt request represented by signal EV2 is now stored in a priority network of the central processor, together with priority election bit 07 of the service code. Accordingly, the service code is now ready to be obtained from register 258. As soon as the central processor has completed tasks accorded higher priority, it honors the instant interrupt request and generates appropriate signals and microcommands. So generated are the signal PSEL, for selecting the interrupting channel, and a microcommand TC4, for controlling AND-gate set 262 to transfer the service code in register 258 to the B Register of the central processor, FIG. 18. At this time microcommand TC4 also transfers flip-flop BUPI to the 0-state, FIG. 20.

The central processor now interprets and checks the correctness of the service code by a microprogrammed procedure. If the service code is found correct and can be executed, the central processor then generates a microcommand TC8, which transfers flip-flop STO1 and signal STO to the 0-state, FIG. 21.

In the instant example, it will be assumed that the service code requires the transfer of additional information from the peripheral control unit to the central processor. Accordingly, when the peripheral control unit detects this next transition of signal STO, to the 0-state, it once again transfers signal STI to the 1-state and simultaneously applies a new character to the Data Bus, such new character being, for example, the number of a logical channel to handle the operation requested. Signal STI again transfers flip-flop STO1 and signal STO to the 1-state. The peripheral control unit detects this new transition in signal STO and transfers signal STI to the 0-state. This next transition in signal STI, to the 0-state, once again triggers generation of a pulse $\overline{\text{STRI}}$.

Pulse $\overline{\text{STRI}}$ now provides the following functions:
Enables AND-gate set 260 to transfer the logical channel number on the Data Bus to register 257, FIG. 18.
Passes through AND-gate 304 to transfer flip-flop INPI to the 1-state which, in turn, triggers in succession one-shots DIDI and DIDE and causes the consequent transfer of flip-flop BUPI to the 1-state, FIG. 20. Flip-flop INPI is then transferred to the 0-state and signal BUPI is transmitted to the central processor. The pulse $\overline{\text{DIDI}}$ enables AND-gate set 261 to transfer the logical channel number from register 257 to register 258, FIG. 18.

In this instance, however, flip-flop FIBI remains in the 0-state, disabling AND-gate 277 and preventing a new interrupt signal EV2 from being delivered.

The microprogram in execution now detects the condition represented by the concurrent presence of signals SCI and BUPI on the universal interface and generates a microcommand TC4 for transferring flip-flop BUPI to the 0-state, FIG. 20, and for transferring the logical channel number in register 258 through AND-gate set 262 to the B Register of the central processor.

The byte comprising the logical channel number is checked by the central processor and if verified as correct a microcommand TC8 is generated, which transfers flip-flop STO1 and signal STO to the 0-state. This latest transition of signal STO is detected by the peripheral control unit, which thereupon transfers signal STI to the 1-state and simultaneously applies to the Date Bus the next information character in the series to be transferred. The dialogue sequence and operation of the circuits of module 16 then continue in the manner described above.

However, when the last character of the series is to be transferred from the peripheral control unit to the central processor, the peripheral control unit transfers signal TMI, instead of signal STI, to the 1-state at the time such last character is applied to the Data Bus. The signal TMT is passed by AND-gate 405 and transfers flip-flop-STO1 and, consequently, signal STO to the 1-state, FIG. 21. Simultaneously signal TMI passes through AND-gate 422 to transfer the first cell of shift register 408 to the 1-state.

This latest transition to the 1-state of signal STO is detected by the peripheral control unit, which thereupon transfers signal TMI to the 0-state. This next transition of signal TMI triggers one-shot 270 which, in turn, triggers one-shot 293 dand a pulse $\overline{\text{STRI}}$ is generated, FIG. 19. Such transition of signal TMI also triggers one-shot 409, and the consequent pulse generated by one-shot 409 causes a one-cell shift of the contents of shift register 408.

Pulse $\overline{\text{STRI}}$ now provides the following functions:
Enables AND-gate set 260 to transfer the last character of the series from the Date Bus to register 257, FIG. 18.
Passes through AND-gate 304 to transfer fflip-flop INPI to the 1-state which, in turn, triggers in succession one-shots DIDI and DIDE and causes the consequent transfer of flip-flop BUPI to the 1-state, FIG. 20. Flip-flop INPI is then transferred to the 0-state and signal BUPI is forwarded to the central processor. The pulse $\overline{\text{DIDI}}$ enables AND-gate set 261 to transfer the last character from register 257 to register 258, FIG. 18. Pulse $\overline{\text{DIDE}}$ is applied to shift register 408 and causes another one-cell shift of the contents thereof, FIG. 21. Signal FISE representing the contents of the last cell of register 408 now transfers to the 1-state.

The microprogram in execution now detects the condition represented by the concurrent presence of signals SCI, BUPI and FISE and in response thereto generates a microcommand TC4. This microcommand TC4 transfers flip-flop BUPI to the 0-state and enables AND-gate set 262 to pass the last character, now in register 258, to the B Register of the central processor, FIG. 18.

This last character is checked by the central processor and if verified as correct a microcommand TC8 is generated, which transfers flip-flop STO1 and signal STO to the 0-state and restores the cells of shift register 408 to the 0-state, FIG. 21.

When the peripheral control unit detects this new transition of signal STO, to the 0-state, it transfers signal SCI to the 0-state. The central processor thereupon detects this transition of signal SCI, to the 0-state, and generates a microcommand TC7, which transfers flip-flop SEO and signal SEO to the 0-state, FIG. 19.

The central processor then commences processing in accordance with the information received from the peripheral control unit, initiating other phases; for example, transferring the characters of a channel command entry (CCE). However, before describing such other phases, the operation of the system during a Read Firmware Phase terminated on the initiative of the central processor will now be described.

If, for example, the microprogram detects the occurrence of improper or incorrect events, such as the transfer of an illegal service code or a nonexistent logical channel number, it may initiate the immediate termination of the information transfer operation being carried on. Assume, therefore, in the instant examle that the central processor detects the occurrence of such an event. The central processor thereupon generates the signal ΔLL, which is a signal for terminating an information transfer operation at the initiative of the central processor. Such signal ΔLL is generated upon the occurrence of several different events or conditions, which include the decrementing of a number to the value 0, a condition for the regular termination of a data transfer operation, or the detection of an improper or incorrect condition.

Signal ΔLL enables AND-gate 410 to pass the aforementioned microcommand TC8 to the 1-input lead of flip-flop TMO3, thereupon transferring flip-flop TMO3 to the 1-state, FIG. 21. Such microcommand TC8 also transfers flip-flop STO1 and signal STO to the 0-state. When the peripheral control unit detects such transition of signal STO, it automatically transfers signal STI to the 1-state in order to transmit another character. However, in this instance, interface module 16 does not respond to this latest transition in signal STI, because AND-gate 405 is disabled by the 0-state of signal $\overline{TMO3}$, and flip-flop STO1 remains in the 0-state, FIG. 21. Instead, AND-gate 411 is enabled to pass signal STI, which thereupon transfers flip-flop TMO1 and signal TMO to the 1-state.

When the peripheral control unit detects this transition of signal TMO, it transfers signal STI to the 0-state. Such signal TMO also provides notification to the peripheral control unit that the information transfer operation must be halted immediately (unless the peripheral control unit elects to send another service code, which should be preceded once again by transmission of the signal SCI).

This transition of signal STI, to the 0-state, causes generation of a pulse $\overline{STRI}$, FIG. 19, which now provides the following functions:

Enables AND-gate set 260 to transfer the character then on the Date Bus to register 257, FIG. 18.

Passes through AND-gate 304 to transfer flip-flop INPI to the 1-state which, in turn, triggers in succession one-shots DIDI and DIDE and causes the consequent transfer of flip-flop BUPI to the 1-state, FIG. 20. Flip-flop INPI is then transferred to the 0-state by pulse $\overline{DIDE}$. Pulse $\overline{DIDI}$ enables AND-gate set 261 to transfer the character in register 257 to register 258, FIG. 18.

Passes through AND-gate 412 to transfer flip-flop TMO1 and signal TMO to the 0-state, FIG. 21. This change of the state of flip-flop TMO1 triggers one-shot 413 to generate pulse $\overline{TM04}$, which, in turn, transfers flip-flop TMO3 and signal TMO3 to the 0-state. This transition of signal $\overline{TMO3}$ triggers one-shot 414 to generate pulse $\overline{TMO2}$. Pulse $\overline{TMO2}$ thereupon transfers flip-flop BUPI to the 0-state.

By such a sequence of operations, the interface dialogue sequence is terminated and the circuits of standard interface module 16 are left in their initialized condition, prepared to receive new information.

In the instance of a termination initiated both by a peripheral control unit and the central processor, the sequence of the operation of the circuits is substantially identical to that described, except that flip-flop TMO1 is transferred to the 1-state instead of flip-flop STO1, and flip-flops BUPI and TMO3 and shift register 408 may not be restored to their initialized condition.

Write Firmware Phase

This phase must be preceded by a Read Firmware Phase transferring the appropriate service code from the peripheral control unit to the central processor, and the central processor responding to such service code to establish preset conditions which include generation of the signals PSEL and TRAB.

The Write Firmware Phase proper commences when central processor then generates simultaneously microcommands TC2 and TC3. Microcommand TC2 enables AND-gate set 251 to transfer an information character from the central processor to register 255, FIG. 18. Enabled AND-gate 321 passes microcommand TC3 to the 1-input lead of flip-flop BUFU, which thereby is transferred to the 1-state, FIG. 20. Because flip-flop INFU is in the 0-state, AND-gate 325 is enabled to pass the resulting BUFU signal to trigger one-shot DODO which, in turn, triggers one-shot DODE.

The consequent pulse $\overline{DODE}$ transfers flip-flop INFU to the 1-state and flip-flop BUFU to the 0-state. The pulse $\overline{DODO}$ enables AND-gate set 252 to transfer the information character from register 255 to register 256, FIG. 18. From register 256 such information character is immediately transferred through enabled AND-gate set 253 and through output drivers 250 to the Data Bus. The pulse $\overline{DODO}$ passes through AND-gate 415 to transfer flip-flop STO1 and, consequently, signal STO to the 1-state, FIG. 21.

Flip-flop INFU now continues in the 1-state, so that signal $\overline{INFU}$, which is transmitted to the central processor, continues in the 0-state.

The central processor now will not transfer a new information character for application to the Data Bus until the present character on the interface has been effectively accepted by the peripheral control unit.

When the peripheral control unit detects the transition of signal STO to the 1-state, it transfers signal STI to the 1-state. Signal STI passes through AND-gate 416, enabled by signal TRAB, to transfer flip-flop STO1 and, consequently, signal STO to the 0-state, FIG. 21. When the peripheral control unit detects this transition of signal STO, to the 0-state, it accepts the information character present on the Data Bus, and after performing an appropriate analysis thereof, transfers signal STI to the 0-state.

This next transition of signal STI, to the 0-state, triggers one-shot 270 which, in turn, triggers one-shot 293 and a pulse $\overline{STRI}$ is generated, FIG. 19. Pulse $\overline{STRI}$ transfers flip-flop $\overline{INFU}$ to the 0-state, FIG. 20. When the central processor detects the transfer of signal INFU to the 1-state, it once again generates microcommands TC2 and TC3 to load a new information character into register 225, and the dialogue sequence described above is then repeated. However, if the information character to be transferred is the last character of the series, prior to generating microcommand TC3, the central processor generates signal ΔLL. Signal ΔLL may be generated by decrementing to the value 0 a number representing the number of information characters to be transferred.

Signal ΔLL enables AND-gate 410 to pass microcommand TC3 to the 1-input lead of flip-flop TMO3, thereupon transferring flip-flop TMO3 to the 1-state, FIG. 21. Microcommand TC3, as before in this Phase, transfers flip-flops BUFU and INFU to the 1-state, in which the latter flip-flop continues. Thus, the signal $\overline{TMO3}$ is transferred to the 0-state immediately prior to the generation of pulse $\overline{DODO}$, which generation is also initiated by microcommand TC3, FIG. 20. Accordingly, immediately prior to the occurrence of pulse $\overline{DODO}$, AND-gate 415 becomes disabled and the pulse $\overline{DODO}$ cannot pass therethrough, whereby flip-flop STO1 and signal STO remain in the 0-state. Instead, pulse $\overline{DODO}$ passes through AND-gate 417, now enabled by signal TMO3, to transfer flip-flop TMO1 and, consequently, signal TMO to the 1-state, FIG. 21.

When the peripheral control unit detects this transition of signal TMO, it transfers either signal STI or TMI to the 1-state. Such signal STI or TMI then passes through enabled AND-gate 418 to transfer flip-flop TMO1 and, consequently, signal TMO to the 0-state, FIG. 21. This change of the state of flip-flop TMO1 triggers one-shot 413 to generate pulse $\overline{TMO4}$ which, in turn, transfers flip-flop TMO3 and signal TMO3 to the 0-state.

When the peripheral control unit detects this transition of signal TMO, to the 0-state, it accepts the information character present on the Data Bus and transfers signal STI or TMI to the 0-state. This next transition of signal STI or TMI, to the 0-state, causes generation of a pulse $\overline{STRI}$, FIG. 19, which, in turn, transfers flip-flop INFU to the 0-state. The circuits of standard interface module 16 are now in their initialized condition.

The operation of this system during a Write Firmware Phase terminated on the initiative of the peripheral control unit will now be described. When the peripheral control unit detects the transition of a signal STO to the 1-state, which provides notification that a character is then present on the Date Bus from the central processor, it transfers signal TMI, instead of signal STI, to the 1-state. Signal TMI passes through AND-gate 423 to transfer the second cell of shift register 408 to the 1-state, FIG. 21. Simultaneously, signal TMI passes through AND-gate 416 to transfer flip-flop STO1 and, consequently, signal STO to the 0-state.

This transition of signal STO, to the 0-state, is detected by the peripheral control unit, which thereupon transfers signal TMI to the 0-state. This next transition of signal TMI triggers one-shot 270 which, in turn, triggers one-shot 293 and a pulse $\overline{STRI}$ is generated, FIG. 19. In addition, such transition of signal TMI also triggers one-shot 409, and the consequent pulse generated by one-shot 409 causes a one-cell shift of the contents of shift register 408. Signal FISE representing the contents of the last cell of register 408 now transfers to the 1-state. Pulse $\overline{STRI}$ transfers flip-flop INFU to the 0-state.

The microprogram in execution now detects the condition represented by the concurrent presence of signals $\overline{INFU}$ and FISE, each being in the 1-state, and in response thereto, terminates the information transfer while generating microcommand TC8, which restores the cells of register 408 to the 0-state, FIG. 21.

In the instance of a termination initiated both by a peripheral control unit and the central processor, the sequence of operation of the circuits is substantially identical to that described, except that signals TMO and TMI are exchanged instead of signals STO and STI, and flip-flops TMO3 and BUPI and shift register 408 may not be restored to their initialized condition.

Read Data Transfer Phase

This phase must be preceded by a Read Firmware Phase transferring the appropriate service code from the peripheral control unit to the central processor, the central processor responding to such service code to establish preset conditions. Such preset conditions include loading appropriate central processor registers with the address of the locations into which the received data is to be stored and a character representing the number of characters to be transferred; and transferring appropriate flip-flops to the 1-state to represent the mode and direction of data transfer. As a consequence of such preset conditions, the central processor generates the signals $\overline{TRAB}$ and DTP, which signals are maintained until a new service code is received by the central processor.

The Read Data Transfer Phase proper commences when the peripheral control unit transfers signal STI to the 1-state, to provide notification that it is ready to transmit a data character, and simultaneously applies such character to the Data Bus.

Because signals $\overline{TRAB}$, $\overline{INPI}$ and $\overline{TMO3}$ are present, AND-gate 405 is enabled to pass the signal STI to the 1-input lead of flip-flop STO1, which thereby is transferred to the 1-state, FIG. 21. The signal STO delivered by line driver 404 is correspondingly transferred to the 1-state to provide notification that module 16 is ready to receive the character on the Data Bus. When the peripheral control unit detects this transition of signal STO, it transfers STI to the 0-state. This next transition of signal STI, to the 0-state, triggers one-shot 270 which, in turn, triggers one-shot 293 and pulse $\overline{STRI}$ is generated, FIG. 19.

Pulse $\overline{STRI}$ provides the following functions:
Passes through enabled AND-gate 419 to transfer flip-flop STO1 and, consequently, signal STO to the 0-state, FIG. 21.
Enables AND-gate set 260 to transfer the data character on the Data Bus to register 257, FIG. 18.
Passes through enabled AND-gate 304 to transfer flip-flop INPI to the 1-state, FIG. 20.

If register 258 is effectively "empty"; i.e., the last information character received thereby has been transferred to the B Register of the central processor, flip-flop BUPI will be in the 0-state, whereby signal $\overline{BUPI}$ will be in the 1-state and enabling AND-gate 301. Accordingly, if register 258 is so "empty", AND-gate 301 is enabled to pass the resulting transition of signal INPI to trigger one-shot DIDI which, in turn, triggers one-shot DIDE. The consequent pulse $\overline{DIDE}$ transfers flip-flop BUPI to the 1-state and flip-flop INPI to the 0-state. The pulse $\overline{DIDI}$ AND-gate set 261 to transfer the data character in register 257 to register 258, FIG. 18.

The pulse $\overline{DIDE}$ also causes a one-cell shift to the contents of shift register 408, FIG. 21. However, because shift register 408 is in the 0-state; i.e., "empty" of any significant binary information, the shifting of the contents thereof provides no change in the status of such register.

In addition, pulse $\overline{\text{DIDE}}$ passes through enabled AND-gate 300 to provide a character transfer interrupt request signal INTB, and the representation thereof is stored in a priority network of the central processor, until honored.

When the peripheral control unit detects the transition to the 0-state of signal STO by pulse $\overline{\text{STRI}}$, and if another data character is to be transmitted, it transfers signal STI to the 1-state and applies the next data character to the Data Bus. Again, this transition of signal STI passes through AND-gate 405 to transfer flip-flop STO1 and signal STO1 to the 1-state. When the peripheral control unit detects this transition of signal STO, it transfers signal STI to the 0-state. This next transition of signal STI, to the 0-state, causes a pulse $\overline{\text{STRI}}$ to be generated, initiating the functions described above, which include transferring signal STO to the 0-state, transferring the data character on the Data Bus to register 257, and transferring flip-flop INPI to the 1-state. The triggering of one-shot DIDI is conditional on flip-flop BUPI being in the 0-state; i.e., register 258 being "empty".

As soon as the peripheral control unit detects the transition to the 0-state of signal STO, it may apply signals representing another data character to the Data Bus and transfer signal STI to the 1-state. However, signal STI will not be passed by AND-gate 405 to transfer flip-flop STO1 and signal STO to the 1-state if, at that moment, flip-flop INPI remains in the 1-state so that signal INPI is in the 0-state to disable AND-gate 405, FIG. 21. IN such instance, not until flip-flop $\overline{\text{INPI}}$ is restored to the 0-state, following the generation of pulses $\overline{\text{DIDI}}$ and $\overline{\text{DIDE}}$ which cause register 257 to be "emptied" by enabling AND-gate set 261 to transfer the contents thereof to register 258, will signal STI be passed through AND-gate 405 to enable the sequence to continue and the next data character to be loaded into register 257.

When the interrupt request represented by the signal INTB, delivered as described above, is honored by the central processor, a microcommand TC4 is generated, which transfers flip-flop BUPI to the 0-state, FIG. 20, and transfers the data character in register 258 to the B Register of the central processor, FIG. 18. From the B Register, the central processor transfers the data character to an appropriate memory location. The transfer of flip-flop BUPI to the 0-state enables AND-gate 301, FIG. 20. If, at such time, flip-flop INPI had been suspended in the 1-state, the enabling of AND-gate 301 immediately causes generation of pulses $\overline{\text{DIDI}}$ and $\overline{\text{DIDE}}$, the transfer again of flip-flop BUPI to the 1-state, and the transfer of flip-flop INPI to the 0-state. The character being held in register 257 is thereby transferred to register 258 and the dialogue sequence continues from its point of temporary suspension.

The above sequence of operations is repeated for each data character transferred, until the last character of the series being transferred is made available by the peripheral control unit.

When the peripheral control unit applies this last data character to the Data Bus, it transfers the signal TMI, instead of signal STI, to the 1-state.

Signal TMI passes through AND-gate 422 to transfer the first cell of shift register 408 to the 1-state, FIG. 21. Simultaneously, signal TMI passes through AND-gate 405, provided such gate is then enabled by the 0-state of flip-flop INPI, to transfer flip-flop STO1 and signal STO to the 1-state. This transition of signal STO, to the 1-state, is detected by the peripheral control unit, which thereupon transfers signal TMI to the 0-state. This next transition of signal TMI, to the 0-state, triggers one-shot 409, and the consequent pulse generated by one-shot 409 causes a one-cell shift of the contents of shift register 408, FIG. 21. In addition, such transition of signal TMI triggers one-shot 270 which, in turn, triggers one-shot 293 and a pulse $\overline{\text{STRI}}$ is generated, FIG. 19.

This pulse $\overline{\text{STRI}}$ enables AND-gate set 260 to transfer the last character on the Data Bus to register 257, FIG. 18. Such pulse also passes through AND-gate 304 to transfer flip-flop INPI to the 1-state, FIG. 20, and passes through AND-gate 419 to transfer flip-flop STO1 and, consequently, signal STO to the 0-state, FIG. 21.

As soon as the central processor has accepted the next-to-last data character from register 258, by generation of microcommand TC4, flip-flop BUPI simultaneously is transferred to the 0-state and AND-gate 301 becomes enabled. Because flip-flop INPI is then in the 1-state, one-shots DIDI and DIDE are immediately triggered. The consequent pulse $\overline{\text{DIDI}}$ enables AND-gate set 261 to transfer the last character, which is in register 257, to register 258. The pulse $\overline{\text{DIDE}}$ causes a second one-cell shift of the contents of shift register 408, FIG. 21. Signal FISE, which represents the contents of the last cell of register 408, now transfers to the 1-state. Pulse $\overline{\text{DIDE}}$ also transfers flip-flop INPI to the 0-state and flip-flop BUPI to the 1-state and passes through AND-gate 300 to cause a character transfer interrupt request signal INTB to be transmitted to the central processor.

When this interrupt request, on behalf of the last character, is honored, the central processor then detects the presence of signal FISE, which provides notification that the last character of the series is now available in register 258. Accordingly, the central processor prepares for such last character by generating a microcommand TC4, which transfers flip-flop BUPI to the 0-state and enables AND-gate set 262 to transfer the last character contents of register 258 to the B Register of the central processor.

This last character is checked by the central processor and if verified as correct, a microcommand TC8 is generated, which restores the cells of shift register 408 to the 0-state, FIG. 21.

The operation of the system during a Read Data Transfer Phase terminated on the initiative of the central processor will now be described. This may occur, for example, as a result of the central processor decrementing a character representing the number of data characters to be transferred each time a data character is transferred to the B Register from interface module 16. Such decrementing may be triggered, for example, by a microcommand TC4. When the decremented character reaches the value 0, signal $\Delta$LL is generated, which provides notification that the entire data character series has been transferred and no other characters will be accepted by the central processor.

If signal $\Delta$LL is generated after the last character has been forwarded, and the Read Data Transfer Phase has been terminated on the initiative of the peripheral control unit; i.e., by the transfer of signal TMI to the 1-state at the same time such last character is applied to the Data Bus, signal $\Delta$LL has no effect on the circuits of the interface module because such circuits are restored to their initialized condition upon the central processor's acceptance of this last character. However, if after signal $\Delta$LL is generated, the peripheral control unit applies a new data character to the Data Bus, simultaneously transferring either signal STI or TMI to the 1-state, the central processor's initiative action will prevent this new data character from being transferred.

After the sequential transfer of signal STO to the 1-state, the restoration of signal STI or TMI to the 0-state, the generation of pulse $\overline{\text{STRI}}$, and the transfer of this new data character to register 257, such character is then transferred from register 257 to register 258 through the enabling of AND-gate set 261 by pulse $\overline{\text{DIDI}}$, FIG. 18. At the same time, however, such pulse $\overline{\text{DIDI}}$ now passes through AND-gate 410, then enabled by signal ΔLL, to transfer flip-flop TMO3 to the 1-state. The pulse $\overline{\text{DIDE}}$, which immediately follows such pulse $\overline{\text{DIDI}}$, FIG. 20, causes a one-cell shift of the contents of shift register 408. However, signal FISE, which represents the contents of the last cell of register 408, is of no significance at this point.

Pulse $\overline{\text{DIDE}}$ also transfers flip-flop BUPI to the 1-state and flip-flop INPI to the 0-state. However, such pulse $\overline{\text{DIDE}}$ does not pass through AND-gate 300, which became disabled by the transfer of signal $\overline{\text{TMO3}}$ to the 0-state, in response to pulse $\overline{\text{DIDI}}$. Accordingly, the central processor receives no interrupt request signal INTB on behalf of the data character then in register 258 of the interface module. All circuits of the module are now in their initialized condition except for flip-flops TMO3 and BUPI and, possibly, register 408.

If now the peripheral control unit applies yet another data character to the Data Bus, accompanied of course by transfer of the signal STI or TMI to the 1-state, such signal will not pass through AND-gate 405 which is now disabled because flip-flop TMO3 is in the 1-state. Instead, such signal STI or TMI passes through AND-gate 411, then enabled by the 1-state of flip-flop TMO3, to transfer flip-flop TMO1 and signal TMO to the 1-state. When the peripheral conrol unit detects this transition of signal TMO, it transfers the appropriate signal STI or TMI to the 0-state. This next transition of signal STI or TMI, to the 0-state, causes generation of a pulse $\overline{\text{STRI}}$ which, in turn, transfers flip-flop INPI to the 1-state, FIG. 20.

Because flip-flop BUPI has continued in the 1-state, AND-gate 301 is disabled and one-shots DIDI and DIDE are not triggered by this transfer of flip-flop INPI to the 1-state.

However, the pulse $\overline{\text{STRI}}$ passes through AND-gate 412 to transfer flip-flop TMO1 and signal TMO to the 0-state. Such transition of flip-flop TMO1, to the 0-state, triggers one-shot 413 and a pulse $\overline{\text{TMO4}}$ is generated. Pulse $\overline{\text{TMO4}}$ transfers flip-flops INPI and TMO3 to the 0-state. This transition of flip-flop TMO3, to the 0-state, triggers one-shot 414 and a pulse $\overline{\text{TMO2}}$ is generated. Pulse $\overline{\text{TMO2}}$ thereupon transfers flip-flop BUPI to the 0-state and the circuits of module 16 are once again in their initialized states.

Write Data Transfer Phase

This phase must be preceded by a Read Firmware Phase transferring the appropriate service code from the peripheral control unit to the central processor, the central processor responding to such service code to establish preset conditions. Such preset conditions include loading appropriate registers with the address of the locations from which the data is to be retrieved and a character representing the number of data characters to be transferred, and transferring appropriate flip-flops to the 1-state to represent the mode and direction of the data transfer operation. As a consequence of such preset conditions, the central processor generates the signals TRAB and DTP, which signals are maintained until a new service code is received by the central processor.

The Write Data Transfer Phase proper commences when the central processor prepares the first data character to be transferred and simultaneously generates microcommands TC2 and TC3 and signal PSEL. Microcommand TC2 enables AND-gate set 251 to transfer the first data character from the central processor to register 255, FIG. 18. Enabled AND-gate 321 passes microcommand TC3 to the 1-input lead of flip-flop BUFU, which thereby is transferred to the 1-state, FIG. 20. Because flip-flop INFU is in the 0-state, AND-gate 325 is enabled to pass the resulting BUFU signal to trigger one-shot DODO which, in turn, triggers one-shot DODE.

The consequent pulse $\overline{\text{DODE}}$ transfers flip-flop INFU to the 1-state and flip-flop BUFU to the 0-state. The pulse $\overline{\text{DODO}}$ enables AND-gate set 252 to transfer the first data character in register 255 to register 256, FIG. 18. From register 256 such data character is immediately transferred through enabled AND-gate set 253 and through output drivers 250 to the Data Bus. The pulse $\overline{\text{DODO}}$ passes through AND-gate 415 to transfer flip-flop STO1 and signal STO to the 1-state, FIG. 21.

The pulse $\overline{\text{DODE}}$ also passes through enabled AND-gate 334 to transmit a character transfer interrupt request signal INTB to the central processor. When this interrupt request is subsequently honored, the central processor prepares the second data character of the series and simultaneously generates microcommands TC2 and TC3. These microcommands, as described above, transfer the second data character to register 255 and transfer flip-flop BUFU to the 1-state. However, at this time, and until flip-flop INFU is transferred to the 0-state, which occurs only after the peripheral control unit has accepted the first character from the Data Bus and thereby effectively "emptied" register 256, AND-gate 325 is disabled and one-shots DODO and DODE are not triggered.

When the peripheral control unit detects the transition of signal STO to the 1-state, it transfers signal STI to the 1-state. Signal STI passes through AND-gate 416, enabled by signal TRAB, to transfer flip-flop STO1 and signal STO to the 0-state. When the peripheral control unit detects this transition of signal STO, to the 0-state, it accepts the first data character then present on the Data Bus, and after performing an appropriate analysis thereof, transfers signal STI to the 0-state.

This next transition of signal STI, to the 0-state, triggers one-shot 270 which, in turn, triggers one-shot 293 and a pulse $\overline{\text{STRI}}$ is generated, FIG. 19. Pulse $\overline{\text{STRI}}$ transfers flip-flop INFU to the 0-state, FIG. 20, thereby enabling AND-gate 325. Because flip-flop BUFU is now in the 1-state, awaiting the enabling of AND-gate 325, one-shots DODO and DODE are triggered in succession and the dialogue sequence is repeated.

When the central processor determines that the last character of the series is being prepared for transfer and that the Write Data Transfer Phase should be terminated; for example, when the character representing the number of the characters to be transferred has been decremented to the value 0, it generates a signal ΔLL.

Signal ΔLL thereupon enables AND-gate 410, FIG. 21. When the next microcommand TC3 is generated by the central processor, at the time the last data character is transferred into register 255 by the simultaneously generated microcommand TC2, AND-gate 410 passes microcommand TC3 to the 1-input lead of flip-flop TMO3, which thereby is transferred to the 1-state, FIG. 21. Such microcommand TC3 also transfers flip-flop BUFU to the 1-state. When AND-state 325 then becomes enabled, permitting one-shots DODO and DODE to be triggered, the consequent pulse $\overline{\text{DODO}}$ transfers the last data character in register 255 to register 256. From register 256, the last character is immediately passed to the Data Bus.

However, because flip-flop TMO3 enters the 1-state prior to the generation of this latest pulse $\overline{\text{DODO}}$, AND-gate 415 is disabled from passing such pulse $\overline{\text{DODO}}$, whereby flip-flop STO1 and signal STO remain in the 0-state. Instead, pulse DODO passes through AND-gate 417, now enabled by signal TMO3, to transfer flip-flop TMO1 and signal TMO to the 1-state, FIG. 21. The pulse $\overline{\text{DODE}}$ transfers flip-flop INFU to the 1-state and flip-flop BUFU to the 0-state. Because flip-flop TMO3 is in the 1-state, AND-gate 334 is disabled and an interrupt request signal INTB is not generated at this time.

When the pheripheral control unit detects the transition of signal TMO, it transfers either signal STI or TMI to the 1-state. Such signal STI or TMI then passes through enabled AND-gate 418 to transfer flip-flop TMO1 and signal TMO to the 0-state. The transition of flip-flop TMO1 to the 0-state triggers one-shot 413 and pulse $\overline{\text{TMO4}}$ is generated. Pulse $\overline{\text{TMO4}}$ transfers flip-flop TMO3 to the 0-state.

When the peripheral control unit detects this transition of signal TMO, to the 0-state, it accepts the last data character on the Data Bus and transfers signal STI or TMI to the 0-state. This next transition of signal STI or TMI, to the 0-state, causes generation of a pulse $\overline{\text{STRI}}$, FIG. 19, which, in turn, transfers flip-flop INFU to the 0-state. The circuits of module 16 are thus transferred to their initialized condition.

The operation of the system during a Write Data Transfer Phase terminated on the initiative of the peripheral control unit will now be described. When a data character is being transferred through interface module 16 to the peripheral control unit, signal STO is transferred to the 1-state, which provides first notification to the peripheral control unit that a character is then present on the Data Bus from the central processor. Such transition in signal STO normally is followed by the generation of an interrupt request signal INTB and by the transfer of flip-flop BUFU to the 0-state. When such interrupt request is honored, flip-flop BUFU will once again be transferred to the 1-state and another data character transferred from the central processor into register 255. If, therefore, the peripheral control unit initiates termination of the Write Data Transfer Phase, it responds to signal STO in the 1-state, to transfer signal TMI, instead of signal STI, to the 1-state.

The signal TMI passes through AND-gate 416 to transfer flip-flop STO1 and signal STO to the 0-state, FIG. 21. Simultaneously signal TMI passes through AND-gate 423 to transfer the second cell of shift register 408 to the 1-state.

When the pheripheral control unit detects this next transition of signal STO, to the 0-state, it accepts the data character present on the Data Bus and, after performing an appropriate analysis thereof, transfers signal TMI to the 0-state. This next transition of signal TMI, to the 0-state, triggers one-shot 409, and the consequent pulse generated by one-shot 409 causes a one-cell shift of the contents of shift register 408. Signal FISE, representing the conents of the last cell of register 408, now transfers to the 1-state. Thus, signal $\overline{\text{FISE}}$ is in the 0-state whereby AND-gate 334 is disabled, so that no further character transfer interrupt request signal INTB can be generated. In addition, the 0-state of signal $\overline{\text{FISE}}$ disables AND-gate 415 and 417 from passing a pulse $\overline{\text{DODO}}$.

This transition of signal TMI to the 0-state also triggers one-shot 270 which, in turn, triggers one-shot 293 and a pulse $\overline{\text{STRI}}$ is generated. THe $\overline{\text{STRI}}$ pulse transfers flip-flop INFU to the 0-state, enabling AND-gate 325. If flip-flop BUFU is at such time in the 1-state, which would be the case after the central processor honored the previous interrupt request INTB, such enabling of AND-gate 325 triggers one-shots DODO and DODE in succession. The resulting pulse $\overline{\text{DODO}}$ enables AND-gate set 252 to transfer the data character then present in register 255 to register 256. However, because AND-gates 415 and 417 are disabled by the 0-state of signal $\overline{\text{FISE}}$, pulse $\overline{\text{DODO}}$ is not passed by such gates to transfer either flip-flop STO1 or flip-flop TMO1 to the 1-state and, consequently, neither signal STO nor signal TMO is transferred to the 1-state. Pulse $\overline{\text{DODE}}$ transfers flip-flop INFU to the 1state. However, the disabling of AND-gate 334 by the 0-state of signal $\overline{\text{FISE}}$ prevents pulse $\overline{\text{DODE}}$ from generating a new interrupt request signal INTB.

Accordingly, all circuits of module 16 are now in their initialized condition except for flip-flop INFU, which is in the 1-state, and the last cell of shift register 408, which also is in the 1-state. However, these residual 1-states of flip-flop INFU and shift register 408 cause no problem in any ensuing information transfer operation, because regardless of such operation, it will be preceded by the receipt of a new service code by the central processor, and the accompanying signal STI provided by the peripheral control unit will restore the cells of register 408 to the 0-state. On the other hand, if the signal TMI accompanies the service code, it will appropriately transfer the particular cell of shift register 408 to the 1-state. Flip-flop INFU will be transferred to the 0-state by the next pulse $\overline{\text{STRI}}$, generated upon the transfer to the 0-state of the signal STI or signal TMI. Such action by flip-flop INFU is of no significance, because the reception of a service code by interface module 16 does not involve circuits in which flip-flop INFU participates.

In the instance of a termination initiated both by a peripheral control unit and the central processor, the sequence of operation of the circuits is substantially identical to that described, except that shift register 408 and flip-flop INFU may not be restored to their initialized condition. However, the above considerations with respect to the immateriality of this condition apply to this instance.

Universal Interface

The immediately preceding description has covered the structural, functional and operational characteristics of a module providing a standard interface. The circuits of such module are preferably contained on a single printed circuit board, or a small number of such boards, in order to be easily replaceable.

Communications between the standard interface module and the peripheral control unit are performed over the line set illustrated in FIG. 10, which comprises the Data Bus and associated control lines. Communications between the standard interface module and the central processor are performed over a set of leads which are included in the universal port, or universal interface. Such leads are the following (employing the same identifier or mnemonic for the lead as for the signal carried by such lead):

TC2, TC3, TC4, TC7, TC8; timing microcommands from central processor.
ALL; end of data transfer signal.
PSEL; channel or port selection signal.
Data input channel.
Data output channel.
INTB; character transfer interrupt request from interface module.
EV2; service interrupt request.
CLEAR; initialization signal.
DTP; notification of data transfer phase. OPO, OPI, RSO; three control signals directly transferred through the interface module.
ISO; error signal directly transferred through the interface module.
CPW, INW; channel program and IOC instruction ready signals directly transferred through the interface module.
RIPE; notification that a service operation is busy on channel.
INFU; notification that output circuits of module are not busy.
BUPI; notification that input circuits of module are busy.
TRAB; representation of direction of information transfer.
Bit 07; priority level of service code.

Identifications of leads in the above list coincide with identifications of comparable leads in the earlier-described list for the universal port for the integrated interface. Thus, certain leads and signals are identified for signals and microcommands which are the same in each list.

Leads which must be provided for the integrated interface, but not for the standard interface, are:
TC1, TC5, TC6, BUSY, and ERROR.

Leads which must be provided for the standard interface, but not for the integrated interface, are:
TC7, TC8, ISO, CPW, INW, RIPE, INFU, BUPI, TRAB, and Bit 07.

Accordingly, an internal universal interface, or port, may be specified which comprises all of the leads necessary for communication between a peripheral unit and a central processor through either an integrated interface or through a standard interface.

By providing such a universal port, the number of leads used in either of the interface modes is limited in number. For either mode of interface, all timing and control functions unique to each interface are performed within the respective interface module, so that no modifications to the physical structure or circuits of the central processor are necessary to adapt it to the requirements of either the integrated interface or the standard interface, the only changes required being in the programs which manage the communications between the central processor and the peripheral units.

While the principles of the invention have now been made clear in an illustrative embodiment, there will be immediately obvious to those skilled in the art many modifications in structure, arrangements, the portions, the elements, materials and components used in the practice of the invention, and otherwise, which are particularly adapted for specific environments and operating requirements, without departing from those principles. The appended claims are therefore intended to cover any such modifications, within the limits only of the true spirit and scope of the invention.

What is claimed is:

1. In a digital computer system comprising a central processor, a first peripheral unit controlled by a peripheral control unit, and a second peripheral unit, the improved interface for providing for said central processor simultaneously to communicate with said peripheral control unit and to control directly and communicate with said second peripheral unit comprising:

first interface apparatus comprising a first universal port and a first module removably connectable to said first port and comprising a first circuit group and a first set of lines coupling said first circuit group to said peripheral control unit, said first circuit group for receiving control signals and data signals from said first port and from said peripheral control unit and in response to said signals received thereby transmitting appropriate and corresponding control and data signals to said first port and to said peripheral control unit; and second interface apparatus comprising a second universal port and a second module removably connectable to said second port and comprising a second circuit group and a second set of lines coupling said second circuit group to said second peripheral unit, said second circuit group for receiving control signals and data signals from said second port and from said second peripheral unit and in response to said signals received thereby transmitting appropriate and corresponding control and data signals to said second port and to said second peripheral unit;

wherein said first circuit group includes first control means for responding to a first plurality of control signals received from said peripheral control unit and for transmitting a second plurality of control signals to said peripheral control unit, said second circuit group includes second control means for responding to a third plurality of control signals received from said second peripheral unit and for transmitting a fourth plurality of control signals to said second peripheral unit, said first and third pluralities being different in number and said second and fourth pluralities being different in number; and said first control means transmits a subset of said second plurality of control signals in response to receipt of respective ones of a subset of said first plurality of control signals, said second control means transmits a subset of said fourth plurality of control signals in response to receipt of respective ones of a subset of said third plurality, said first and second circuit groups further including timing means for controlling the respective duration of said subset of said second plurality of signals to differ from the respective durations of said subset of said fourth plurality of signals, and for controlling the relative timing among the signals of said subset of said second plurality of signals to differ from the relative timing among said subset of said fourth plurality of signals; and wherein said first and second universal ports are identical, each of said ports comprising an equal number of lines coupled to said central processor for transmitting control signals and data signals between said central processor and the one of said modules coupled to said port.

2. The interface of claim 1, wherein said second peripheral unit transmits over one of the lines of said second line set a first control signal operable in either one of first and second states, said first state denoting that said second peripheral unit is prepared to transfer information to the central processor, and wherein said second circuit group comprises:
- a first register for storing a control information character representing the direction of information transfer over said second interface apparatus and the corresponding location of the source or destination of the information to be transferred;
- a second register for storing information characters to be transferred to said second peripheral unit;
- a third register for storing information characters received from said second peripheral unit;
- a first flip-flop coupled to be responsive to said first control signal for generating a second control signal operable in either one of first and second states, said first state denoting that said second circuit group is prepared to transfer information to said second peripheral unit, said flip-flop responding to the transfer of said first control signal to the first state thereof for transferring said second control signal to the second state thereof and responding to the transfer of said first control signal to the second state thereof for transferring said second control signal to the first state thereof;
- a second flip-flop for generating a third control signal for controlling the timing of the transfer of control information characters from said first register to said second peripheral unit; and
- a third flip-flop for generating a fourth control signal for controlling the timing of the transfer of information characters which are not control information characters from said second register to said second peripheral unit.

3. The interface of claim 2 wherein said second circuit group further comprises a circuit for transferring a signal representing one bit of said control information character held in said first register to said second peripheral unit and, when an information transfer operation is to terminate, for transferring a signal representing the logical inverse of said one bit to said second peripheral unit.

4. In a data processing system having a plurality of different kinds of peripheral devices, the combination comprising:
- a central processor provided with a plurality or universal ports for providing simultaneous communication with all of said peripheral devices, all of said ports being identical and comprising an equal number of lines and an identical first-type connector, all of the lines of each of said ports being coupled to a respective one of said first-type connectors, at least one group of said lines of each port transferring signals representing information characters between the respective connector and said central processor and others of said lines of each port transferring respective control signals between the respective connector and said central processor;
- a first module for enabling communication and control via one of said ports between said central processor and a first kind of said peripheral devices, said first module comprising a first circuit group for receiving signals representing information characters and control signals from said central processor and said first-kind peripheral device and in response to said received signals transferring appropriate and corresponding signals representing information characters and control signals to said central processor and said first-kind peripheral device;
- a second module for enabling communication and control via one of said ports between said central processor and a second kind of said peripheral devices, said second module comprising a second circuit group for receiving signals representing information characters and control signals from said central processor and said second-kind peripheral device and in response to said received signals transferring appropriate and corresponding signals representing information characters and control signals to said central processor and said second-kind peripheral device;
- a first set of lines coupled between said first circuit group and said first-kind peripheral device for transferring signals representing information characters and control signals therebetween;
- a second set of lines coupled between said second circuit group and said second-kind peripheral device for transferring signals representing information characters and control signals therebetween; and
- a second-type connector connected to each of said modules and coupled to the respective circuit group of said module for enabling communication between said module and said central processor, each of said second-type connectors being removably matable with any one of said first-type connectors;

each of said second-type connectors being mated with one of said first-type connectors;

wherein said first and second sets of lines differ from each other in the number of lines and wherein said first circuit group includes first control means for responding to a first plurality of control signals receives from said first-kind peripheral device and for transmitting a second plurality of control signals to said first-kind peripheral device, said second circuit group includes second control means for responding to a third plurality of control signals received from said second-kind peripheral device and for transmitting a fourth plurality of control signals to said second-kind peripheral device, said first and third pluralities being different in number and said second and fourth pluralities being different in number; and said first control means transmits a subset of said second plurality of control signals in response to receipt of respective ones of a subset of said first plurality of control signals, said second control means tramsmits a subset of said fourth plurality of control signals in response to receipt of respective ones of a subset of said third plurality, said first and second circuit groups further including means for controlling the respective duration of said subset of said second plurality of signals to differ from the respective durations of said subset of said fourth plurality of signals, and for controlling the relative timing among the signals of said subset of said second plurality of signals to differ from the relative timing among said subset of said fourth plurality of signals.

5. The data processing system of claim 4, wherein:

said first circuit group comprises first and second registers for holding respective first-type and second-type information characters, said first-type information character representing (i) the direction information is to be subsequently transferred between said first circuit group and said first peripheral device and (ii) an information character storage location in said first-kind peripheral device with respect to which a second-type information character is to be inserted from said second register or is to be retrieved for transfer to said second register.

6. The data processing system of claim 5, wherein:
said second circuit group comprises a third register for holding all information characters to be transferred from said second kind peripheral device to said central processor.

7. The data processing system of claim 6, wherein:
said first circuit group further comprises control elements for transferring a first-type information character from the respective second-type connector to said first register and subsequently from said first-kind register to said first peripheral device prior to the transfer of any second-type information character between said second register and said first peripheral device, during any complete operation sequence.

8. The data processing system of claim 7, wherein:
said second circuit group further comprises control elements for transferring a third-type information character from second-kind peripheral device to said third register prior to the transfer of any other information character between said central processor and said second-kind peripheral device, during any complete operation sequence.

9. The data processing system of claim 8, wherein:
said third-type information character represents a particular type of information transfer operation to be carried out by the mutual interaction of said central processor and said second-kind peripheral device.

10. For employment with a central processor provided with a plurality of universal ports for providing simultaneous communication with a plurality of peripheral devices, all of said ports being identical and comprising an equal number of lines coupled to said central processor, and each of said ports comprising a first-type connector to which all of the lines of said port are connected, at least one group of said lines of each port transferring signals representing information characters and others of said lines of each port transferring individuals control signals; the combination comprising:

a plurality of second-type connectors, each of said second-type connectors being removably matable with any one of said first-type connectors;

a first circuit group coupled to one of said second-type connectors;

a first set of lines coupling said first circuit group for communication with a first of said peripheral devices;

a second circuit group coupled to another of said second-type connectors; and a second set of lines coupling said second circuit group for communication with a second of said peripheral devices;

each of said sets of lines transmitting between the respective ones of said circuit groups and said peripheral devices a plurality of control signals and a plurality of data signals, wherein said first and second line sets differ from each other in the number of lines and wherein said first circuit group includes first control means for responding to a first plurality of control signals received from said first peripheral device and for transmitting a second plurality of conrol signals to said first peripheral device, said second circuit group includes second conrol means for responding to a third plurality of control signals received from said second peripheral device and for transmitting a fourth plurality of control signals to said second peripheral device, said first and third pluralities being different in number and said second and fourth pluralities being different in number; and said first control means transmits a subset of said second plurality of control signals in response to receipt of respective ones of a subset of said first plurality of control signals, said second control means transmits a subset of said fourth plurality of control signals in response to receipt of respective ones of a subset of said third plurality, said first and second circuit groups further including means for controlling the respective duration of said subset of said second plurality of signals to differ from the respective durations of said subset of said fourth plurality of signals, and for controlling the relative timing among the signals of said subset of said second plurality of signals to differ from the relative timing among said subset of said fourth plurality of signals; wherein each of said second-type connectors is mated with one of said first-type connectors.

* * * * *